(12) United States Patent
Depraete

(10) Patent No.: US 10,107,372 B2
(45) Date of Patent: Oct. 23, 2018

(54) TORSIONAL VIBRATION DAMPER AND LOCK-UP CLUTCH FOR HYDROKINETIC TORQUE-COUPLING DEVICE, AND METHOD FOR MAKING THE SAME

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 37 days.

(21) Appl. No.: 15/359,177

(22) Filed: Nov. 22, 2016

(65) Prior Publication Data

US 2018/0142769 A1 May 24, 2018

(51) Int. Cl.
F16H 45/02 (2006.01)
F16F 15/121 (2006.01)
F16D 13/26 (2006.01)

(52) U.S. Cl.
CPC ............ *F16H 45/02* (2013.01); *F16D 13/26* (2013.01); *F16F 15/1215* (2013.01); *F16F 2226/04* (2013.01); *F16H 2045/0221* (2013.01); *F16H 2045/0278* (2013.01)

(58) Field of Classification Search
CPC ............ F16H 45/02; F16H 2045/0221; F16H 45/0278; F16D 2300/22; F16F 15/1215
See application file for complete search history.

(56) References Cited

U.S. PATENT DOCUMENTS

| 2,551,718 | A | 5/1951 | Auten |
| 4,145,936 | A | 3/1979 | Vincent et al. |
| 5,697,261 | A | 12/1997 | Mokdad et al. |
| 5,893,355 | A | 4/1999 | Glover et al. |
| 2001/0011621 | A1* | 8/2001 | Bauer ............ F16H 45/02 192/3.29 |
| 2003/0106763 | A1 | 6/2003 | Kimura et al. |

(Continued)

FOREIGN PATENT DOCUMENTS

| DE | 19729421 A1 | 1/1998 |
| DE | 19919449 A1 | 11/1999 |
| DE | 102004024747 A1 | 12/2005 |

(Continued)

*Primary Examiner* — Huan Le
(74) *Attorney, Agent, or Firm* — Berenato & White, LLC

(57) ABSTRACT

A torsional vibration damper of a hydrokinetic torque-coupling device. The torsional vibration damper comprises a torque input member including first and second side plates axially spaced from and non-rotatably attached to one another, and a supporting member mounted therebetween, a unitary elastic member disposed between the first and second side plates and pivotable relative to and elastically coupled to the torque input member, and a resilient member disposed between the elastic member and the first side plate. The elastic member includes a core member rotatable relative the torque input member, and an elastic leaf integral with the core member and configured to elastically engage the supporting member. The elastic leaf has a proximal end non-moveably connected to the core member, a free distal end and a curved raceway portion disposed between the proximal and free distal ends of the at least one elastic leaf for bearing the supporting member.

27 Claims, 42 Drawing Sheets

(56) References Cited

U.S. PATENT DOCUMENTS

2009/0229938 A1* 9/2009 Kombowski ........... F16H 45/02
192/3.29
2015/0369296 A1 12/2015 Lopez-Perez

FOREIGN PATENT DOCUMENTS

| | | | |
|---|---|---|---|
| EP | 1048420 | A2 | 11/2000 |
| FR | 2339107 | A1 | 8/1977 |
| FR | 2493446 | A1 | 5/1982 |
| FR | 2499182 | A1 | 8/1982 |
| FR | 2628804 | A1 | 9/1989 |
| FR | 2714435 | A1 | 6/1995 |
| FR | 2828543 | A1 | 2/2003 |
| FR | 2938030 | A1 | 5/2010 |
| FR | 3000155 | A1 | 6/2014 |
| FR | 3008152 | | 1/2015 |
| GB | 1212042 | A | 11/1970 |
| GB | 2235749 | A | 3/1991 |
| GB | 2262795 | A | 6/1993 |
| GB | 2283558 | A | 5/1995 |
| GB | 2284875 | A | 6/1995 |
| GB | 2468030 | A | 8/2010 |
| JP | 09280317 | A | 10/1997 |
| WO | WO9914114 | A1 | 3/1999 |
| WO | WO2004016968 | A1 | 2/2004 |
| WO | WO2011006264 | A1 | 1/2011 |
| WO | WO2014128380 | A1 | 8/2014 |

\* cited by examiner

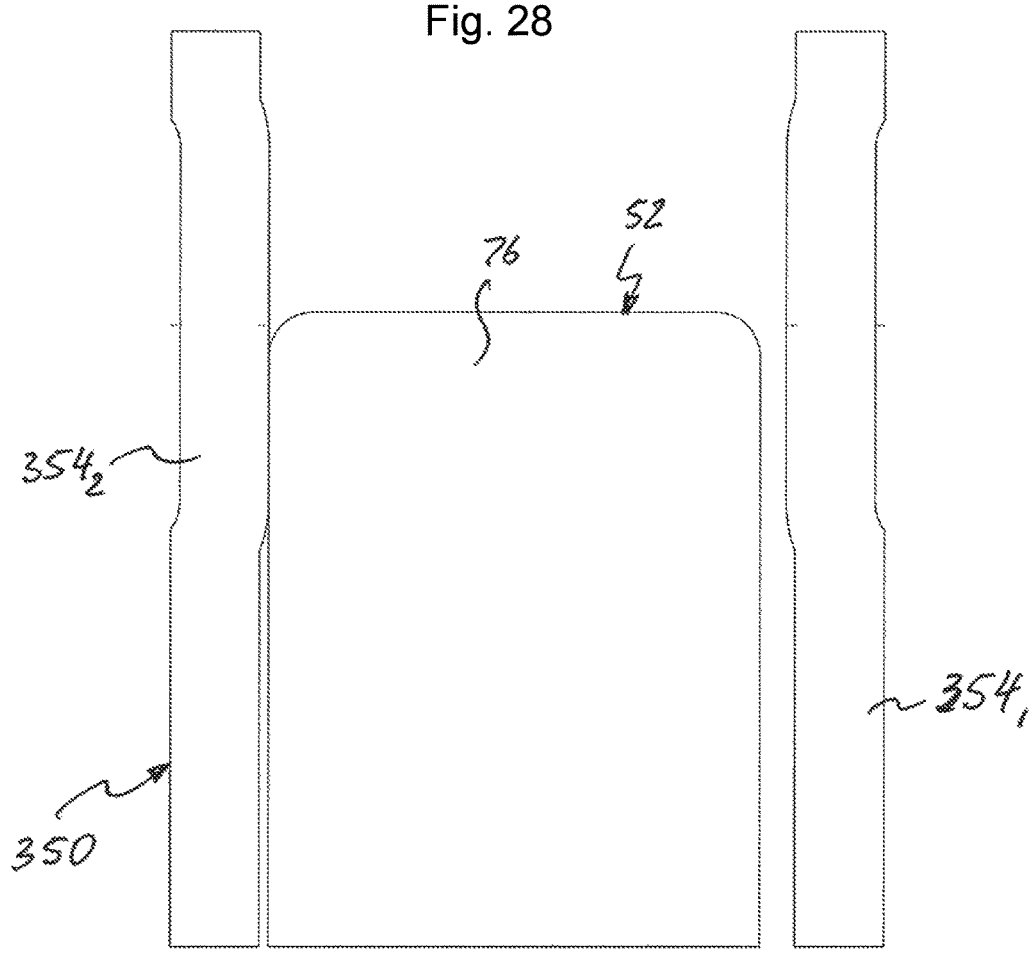

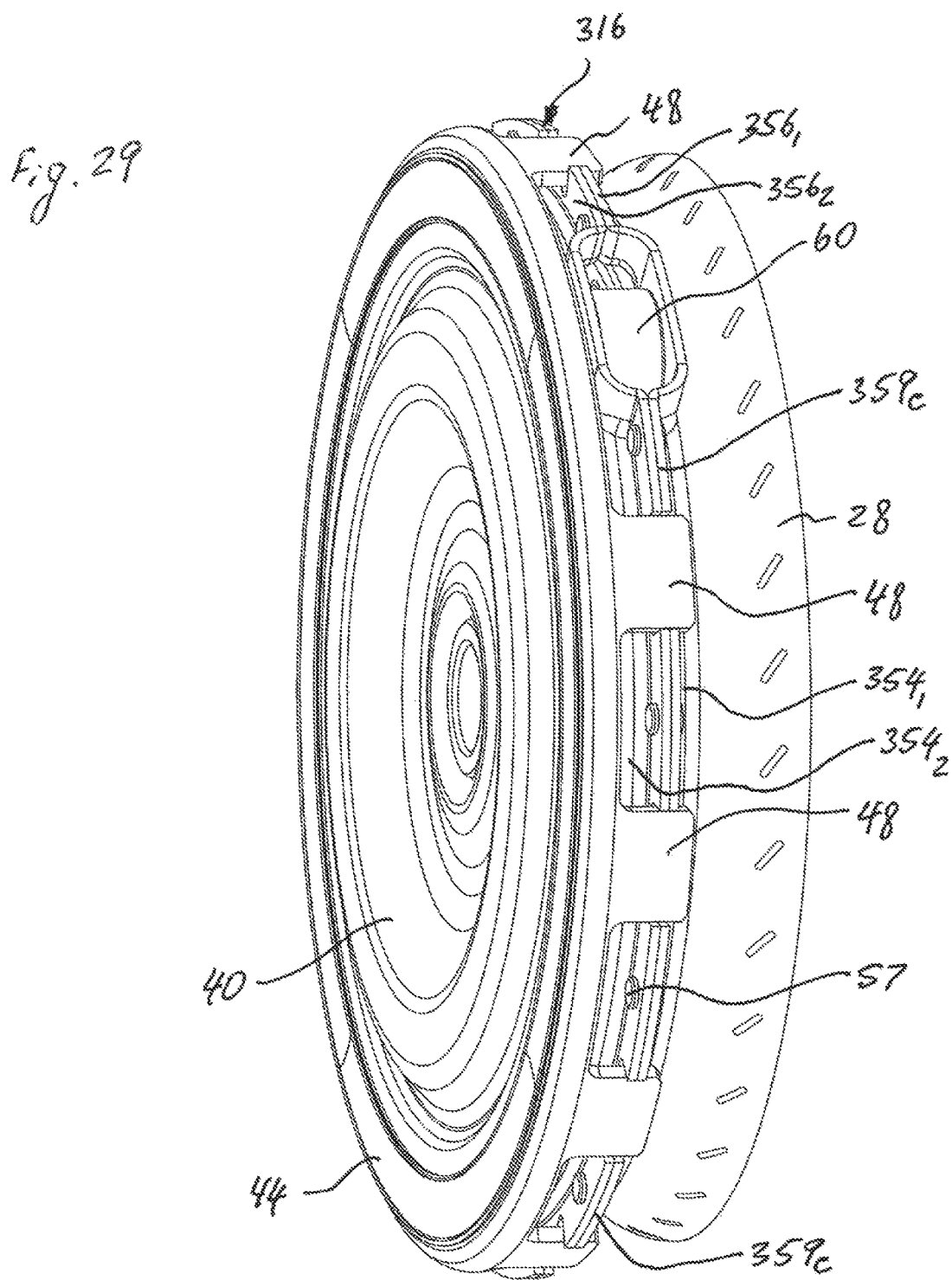

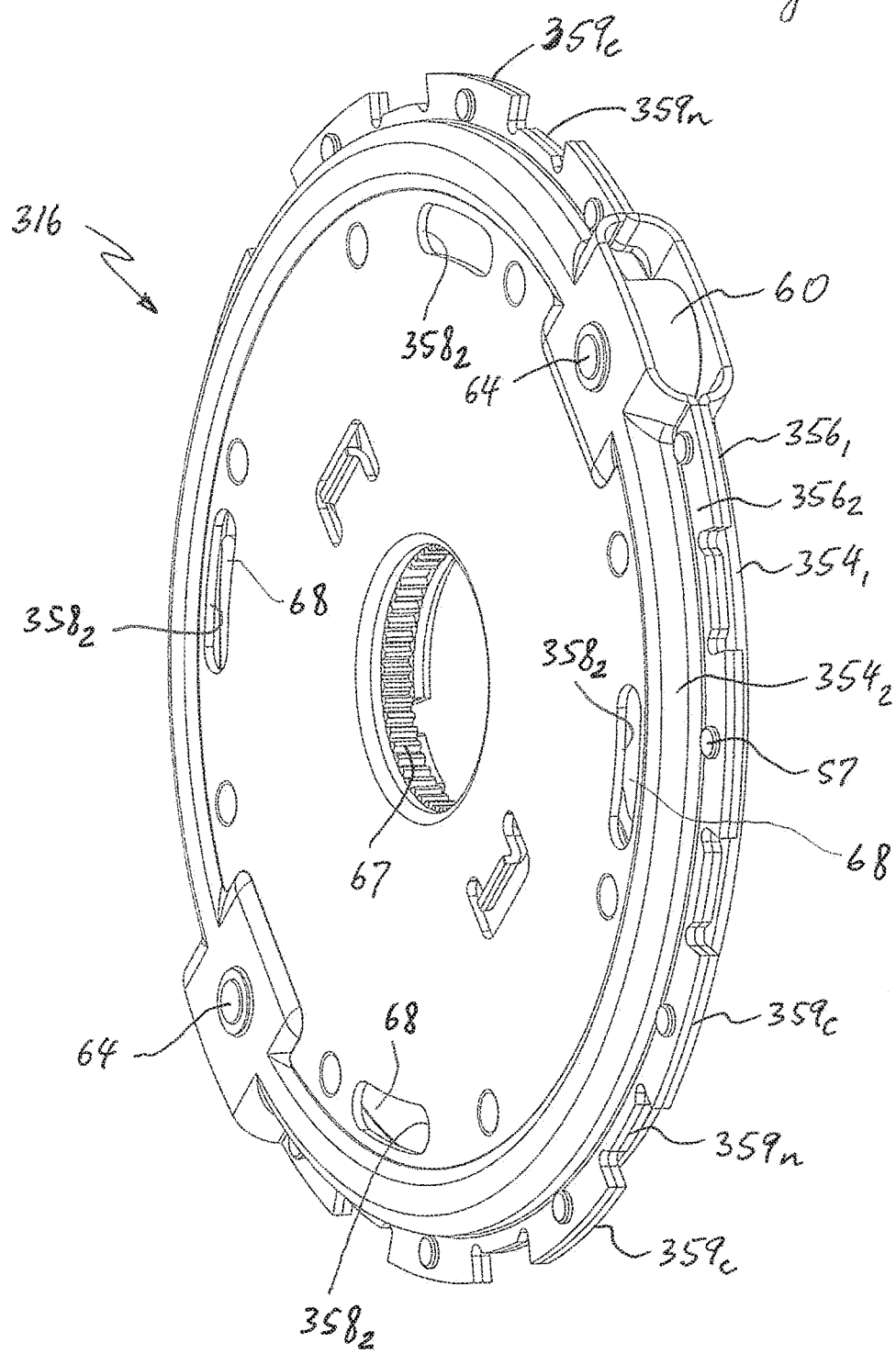

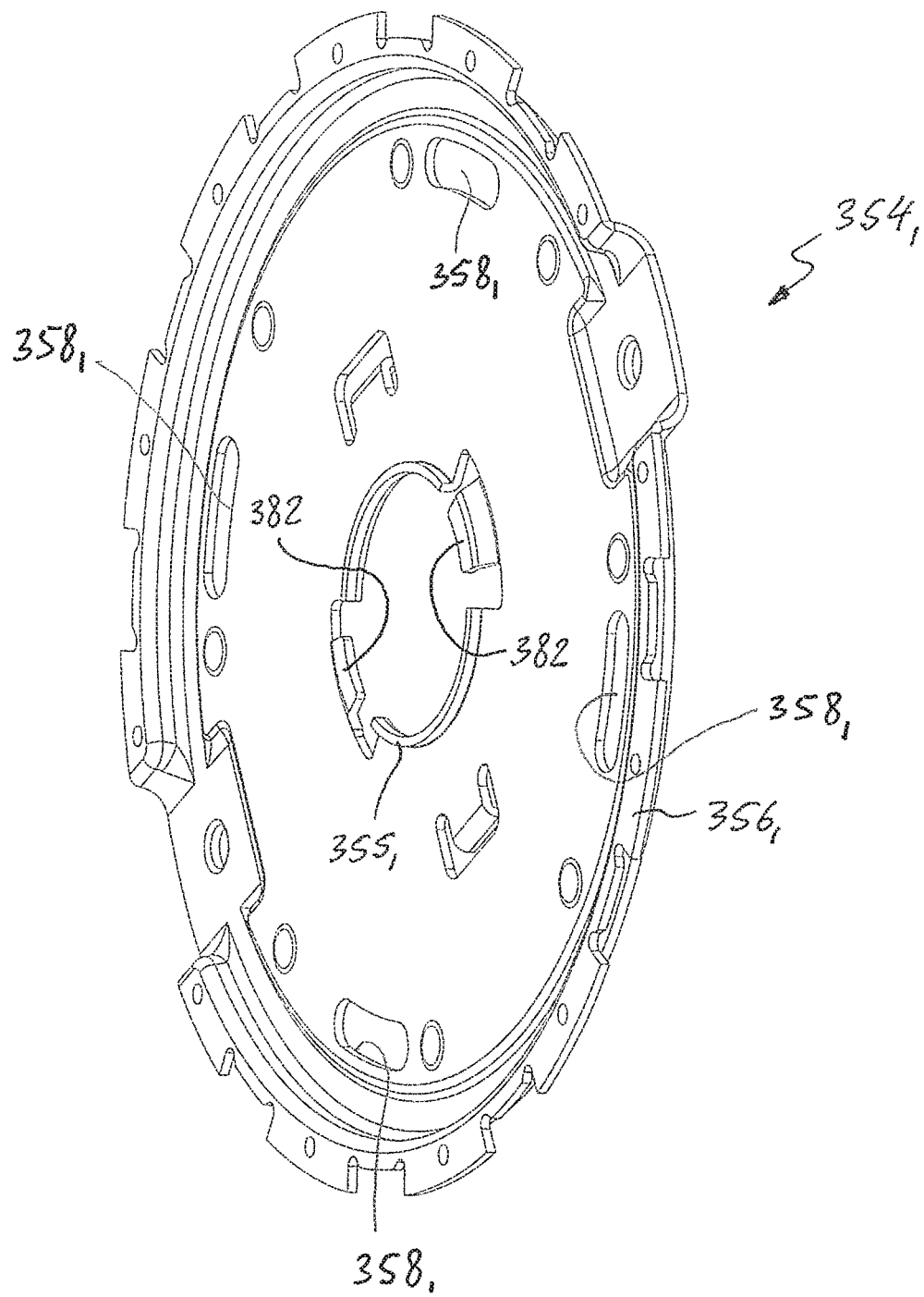

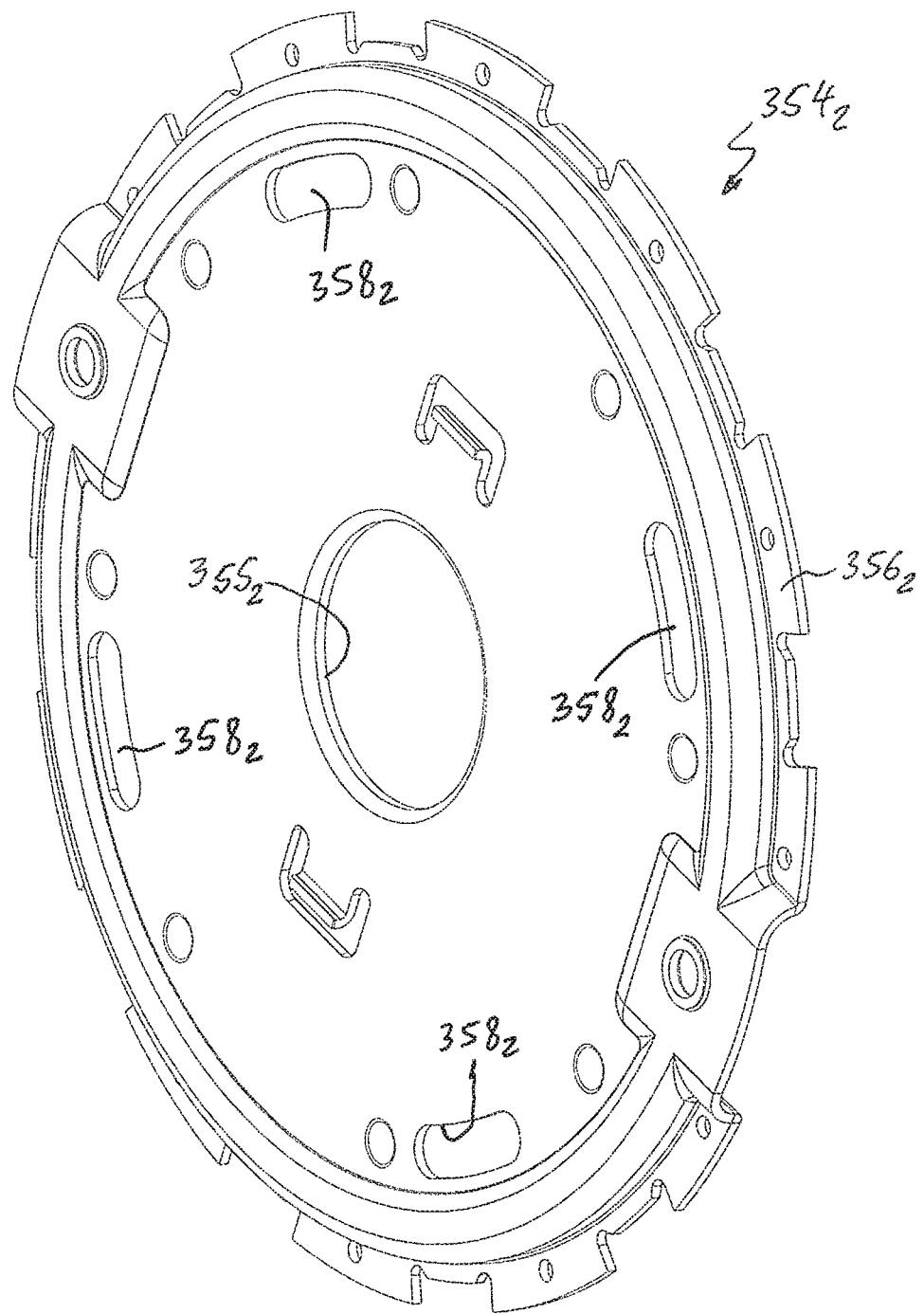

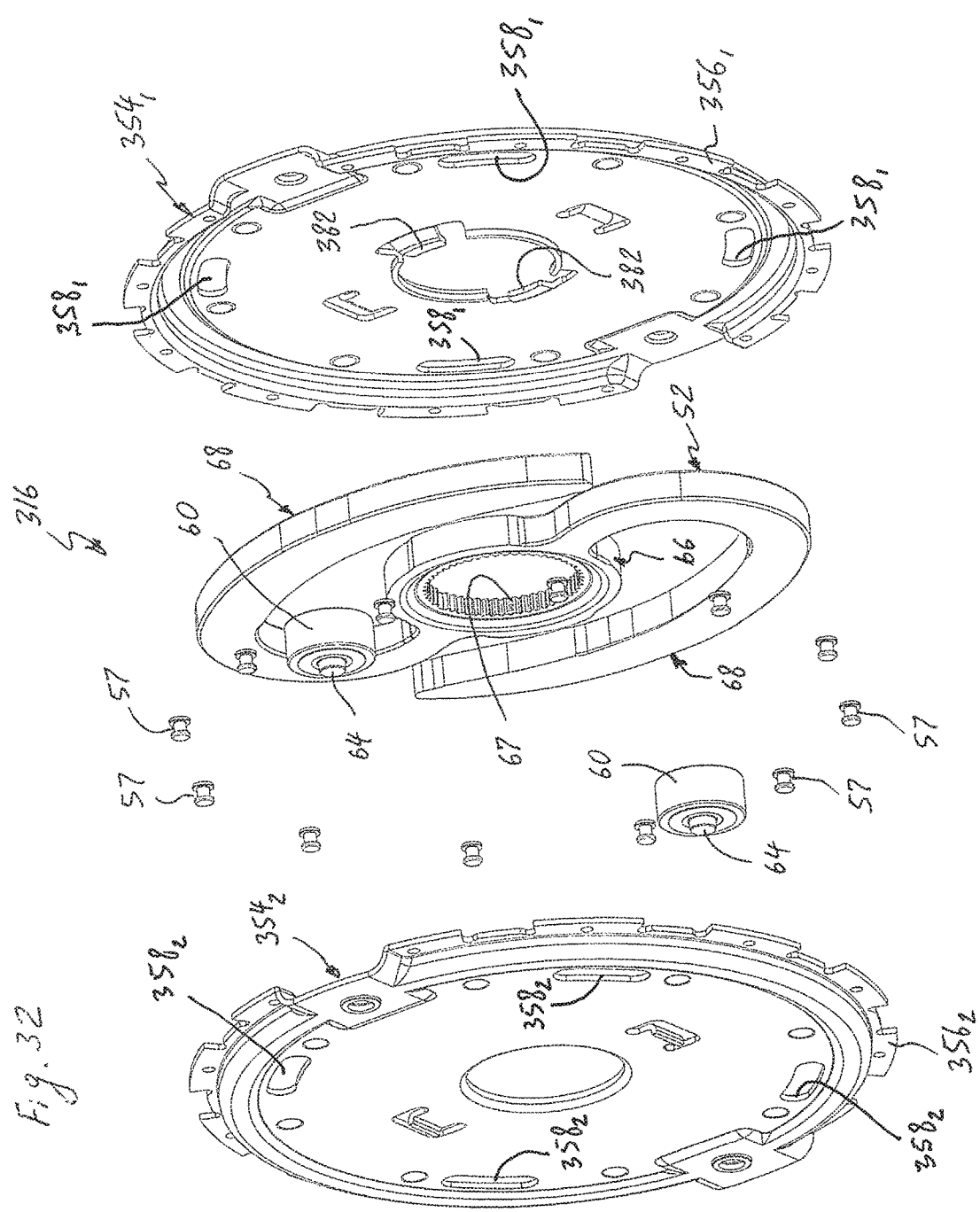

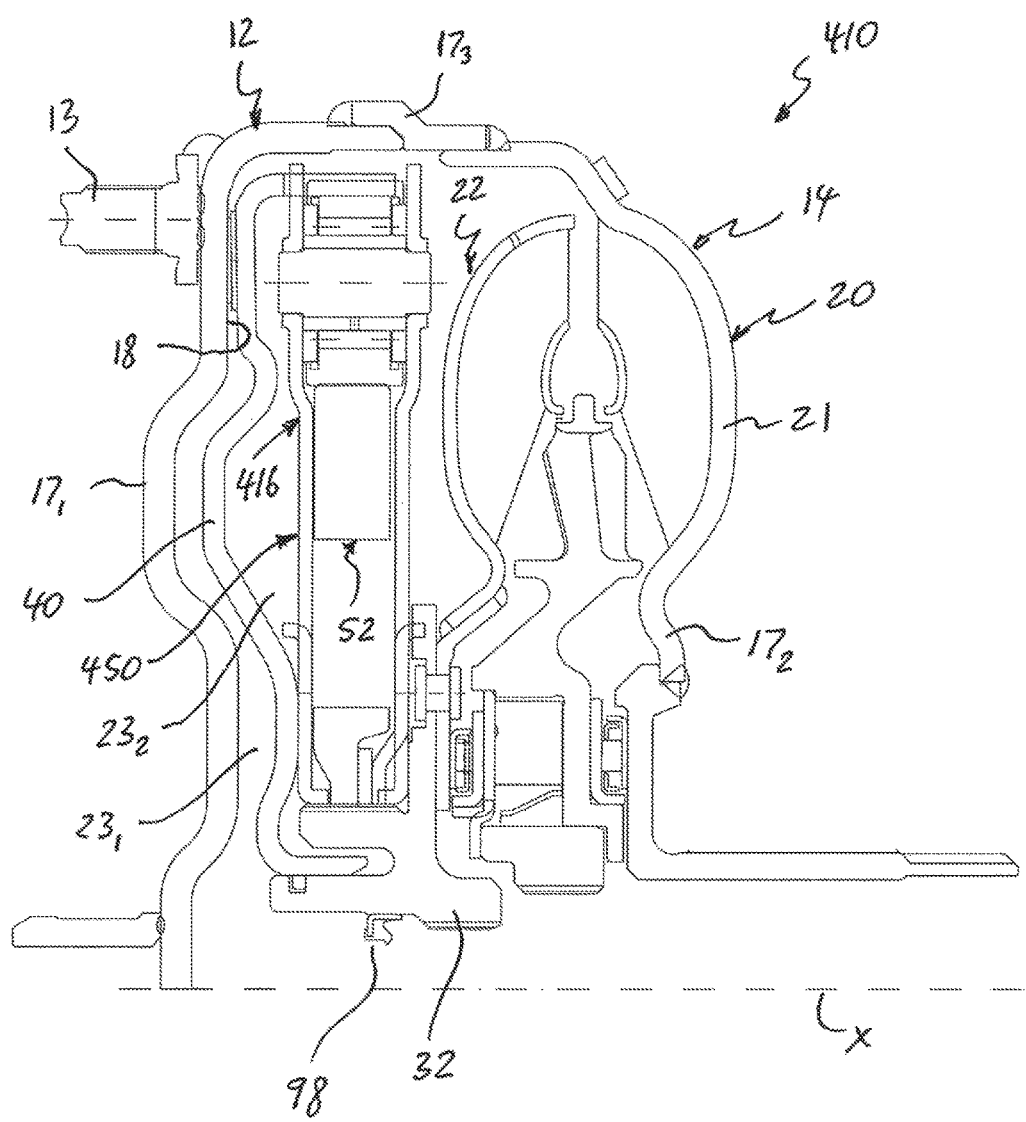

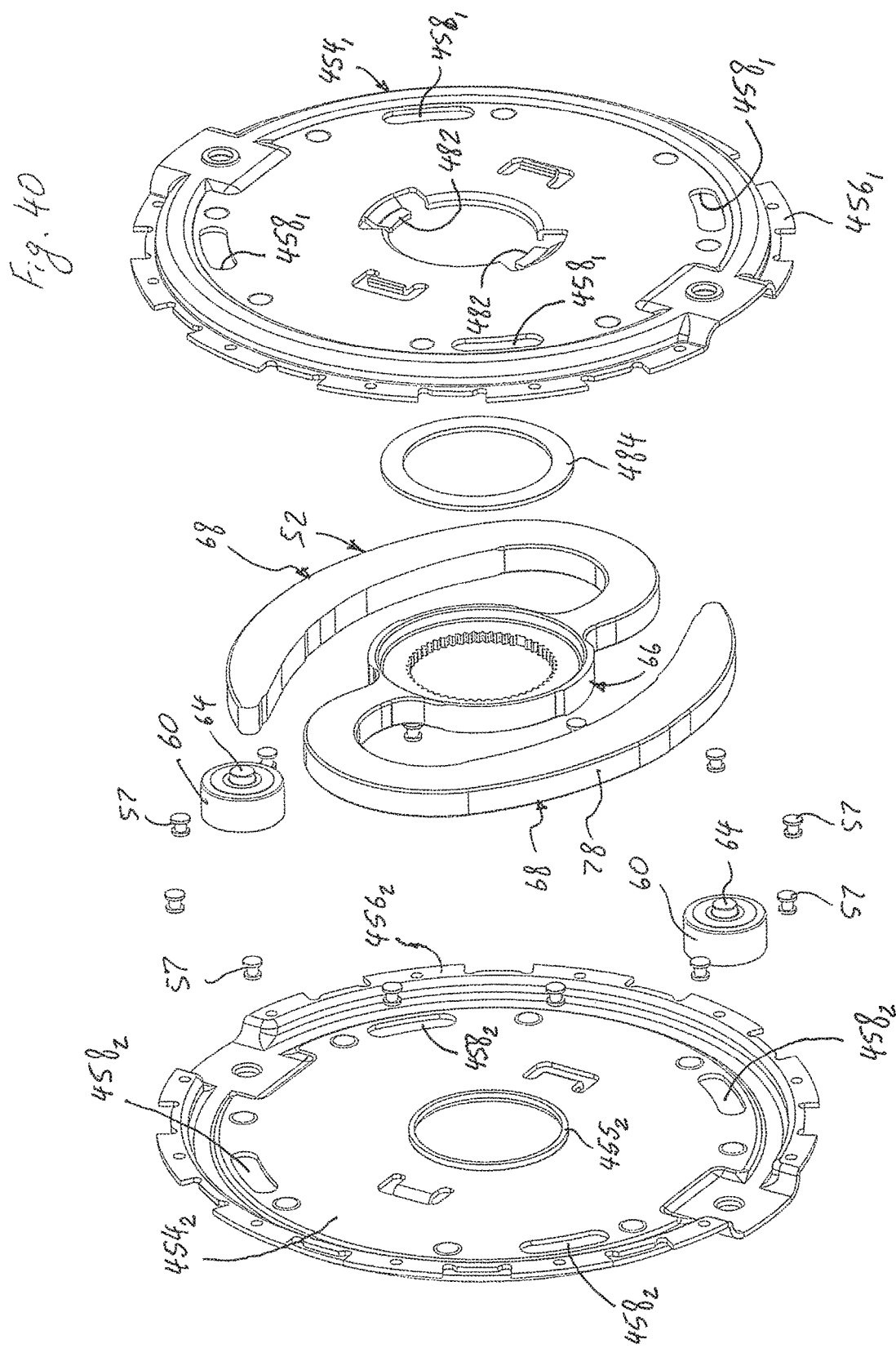

TORSIONAL VIBRATION DAMPER AND LOCK-UP CLUTCH FOR HYDROKINETIC TORQUE-COUPLING DEVICE, AND METHOD FOR MAKING THE SAME

BACKGROUND OF THE INVENTION

1. Field of the Invention

The present invention generally relates to fluid coupling devices, and more particularly to a torsional vibration damper for hydrokinetic torque-coupling devices, and a method for making the same.

2. Background of the Invention

A conventional hydrokinetic torque-coupling device 1 is schematically and partially illustrated in FIG. 1 and is configured to transmit torque from an output shaft of an internal combustion engine in a motor vehicle, such as for instance a crankshaft 2a, to a transmission input shaft 2b. The conventional hydrokinetic torque-coupling device comprises a hydrokinetic torque converter 4 and a torsional vibration damper 5. The hydrokinetic torque converter conventionally comprises an impeller wheel 4i, a turbine wheel 4t, a stator (or reactor) 4s fixed to a casing of the torque converter 4, and a one-way clutch for restricting rotational direction of the stator 8 to one direction. The impeller wheel 4i is configured to hydro-kinetically drive the turbine wheel 4t through the reactor 4s. The impeller wheel 4i is coupled to the crankshaft 1 and the turbine wheel 4t is coupled to a guide washer 6.

The torsional vibration damper 5 of the compression spring-type comprises a first group of coil springs 7a, 7b mounted between the guide washer 6 and an output hub 8 coupled to the transmission input shaft 2b. The coil springs 7a, 7b of the first group are arranged in series through a phasing member 9, so that the coil springs 7a, 7b are deformed in phase with each other, with the phasing member 9 being movable relative to the guide washer 6 and relative to the output hub 8. A second group of coil springs 7c is mounted with some clearance between the guide washer 6 and the output hub 8 in parallel with the first group of elastic members 7a, 7b, with the coil springs 7c being adapted to be active in a limited angular range, more particularly at the end of the angular travel of the guide washer 6 relative to the output hub 8. The angular travel, or the angular shift noted α, of the guide washer 6 relative to the output hub 8, is defined relative to a rest position (α=0) wherein no torque is transmitted through damping means formed by the coil springs 7a, 7b. The second group of coil springs 7c makes it possible to increase the stiffness of the damping means at the end of angular travel, i.e. for a significant a angular offset of the guide washer 6 relative to the output hub 8 (or vice versa).

The torque-coupling device 1 further comprises a lock-up clutch 3 adapted to transmit torque from the crankshaft 2a to the guide washer 6 in a determined operation phase, without action from the impeller wheel 4i and the turbine wheel 4t.

The turbine wheel 4t is integrally or operatively connected with the output hub 8 linked in rotation to a driven shaft, which is itself linked to an input shaft of a transmission of a vehicle. The casing of the torque converter 4 generally includes a front cover and an impeller shell which together define a fluid filled chamber. Impeller blades are fixed to an impeller shell within the fluid filled chamber to define the impeller assembly. The turbine wheel 4t and the stator 4s are also disposed within the chamber, with both the turbine wheel 4t and the stator 4s being relatively rotatable with respect to the front cover and the impeller wheel 4i. The turbine wheel 4t includes a turbine shell with a plurality of turbine blades fixed to one side of the turbine shell facing the impeller blades of the impeller wheel 4i.

The turbine wheel 4t works together with the impeller wheel 4i, which is linked in rotation to the casing that is linked in rotation to a driving shaft driven by an internal combustion engine. The stator 4s is interposed axially between the turbine wheel 4t and the impeller wheel 4i, and is mounted so as to rotate on the driven shaft with the interposition of the one-way clutch.

While conventional hydrokinetic torque-coupling devices, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a torsional vibration damper of a hydrokinetic torque-coupling device for coupling a driving shaft and a driven shaft together. The torsional vibration damper comprises a torque input member including radially oriented first and second side plates axially spaced from and non-rotatably attached to one another and at least one supporting member mounted therebetween, a unitary radially elastic member disposed between the first and second side plates and pivotable relative to and elastically coupled to the torque input member, and a first axially resilient member disposed between the radially elastic member and the first side plate for biasing the radially elastic member axially away from the first side plate. The radially elastic member includes an annular core member coaxial with the rotational axis and rotatable relative the torque input member, and at least one curved elastic leaf integral with the core member and configured to elastically and radially engage the at least one supporting member and to elastically bend (or deform) in the radial direction upon rotation of the torque input member with respect to the radially elastic member. The at least one curved elastic leaf has a proximal end non-moveably connected to the core member, a free distal end and a curved raceway portion disposed between the proximal and free distal ends of the at least one elastic leaf for bearing the at least one supporting member.

According to a second aspect of the present invention, there is provided a hydrokinetic torque-coupling device for coupling a driving shaft and a driven shaft together. The hydrokinetic torque-coupling device comprises a casing rotatable about a rotational axis and having a locking surface, a torque converter, a lock-up clutch including a locking piston axially moveable along the rotational axis to and from the locking surface of the casing, and a torsional vibration damper. The torque converter includes an impeller wheel rotatable about the rotational axis and a turbine wheel disposed in the casing coaxially with the rotational axis. The turbine wheel is disposed axially opposite to the impeller wheel and hydro-dynamically rotationally drivable by the impeller wheel. The locking piston has an engagement surface configured to selectively frictionally engage the locking surface of the casing to position the hydrokinetic torque-coupling device into and out of a lockup mode in which the locking piston is mechanically frictionally locked to the casing so as to be non-rotatable relative to the casing. The torsional vibration damper comprises a torque input member including radially oriented first and second side plates axially spaced from and non-rotatably attached to one another and at least one supporting member mounted therebetween, a unitary radially elastic member disposed between the first and second side plates and pivotable relative to and elastically coupled to the torque input member, and a first axially resilient member disposed between the radially elastic member and the first side plate for biasing the radially elastic member axially away from the first side plate. The radially elastic member includes an annular core member coaxial with the rotational axis and rotatable relative the torque input member, and at least one curved elastic leaf integral with the core member and configured to elastically and radially engage the at least one supporting member and to elastically bend in the radial direction upon rotation of the torque input member with respect to the radially elastic member. The at least one curved elastic leaf has a proximal end non-moveably connected to the core member, a free distal end and a curved raceway portion disposed between the proximal and free distal ends of the at least one elastic leaf for bearing the at least one supporting member.

According to a third aspect of the present invention, there is provided a method for assembling a torsional vibration damper of a hydrokinetic torque-coupling device. The method involves the steps of providing a radially oriented first side plate, a radially oriented second side plate and at least one supporting member, providing a unitary radially elastic member including an annular core member and at least one curved elastic leaf integral with the core member and configured to elastically bend in the radial direction, providing a first axially resilient member for biasing the radially elastic member axially away from the first side plate, placing the unitary radially elastic member and the first axially resilient member between the first and second side plates, and non-moveably securing the first and second side plates to one another so that the first axially resilient member is located between the unitary radially elastic member and the first side plate for biasing the radially elastic member axially away from the first side plate.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 28 is an enlarged view of a fragment of the torsional vibration damper shown in the rectangle "28" of FIG. 27;

FIG. 29 is a partial perspective view of the hydrokinetic torque-coupling device showing a locking piston and the torsional vibration damper in accordance with the fourth exemplary embodiment of the present invention;

FIG. 30 is a perspective view of the torsional vibration damper in accordance with the fourth exemplary embodiment of the present invention;

FIG. 31A is a perspective view of a first side plate of a torque input member of the torsional vibration damper in accordance with the fourth exemplary embodiment of the present invention;

FIG. 31B is a perspective view of a second side plate of a torque input member of the torsional vibration damper in accordance with the fourth exemplary embodiment of the present invention;

FIG. 32 is an exploded assembly view of the torsional vibration damper in accordance with the fourth exemplary embodiment of the present invention;

FIG. 33 is a fragmented half-view in axial section of a hydrokinetic torque-coupling device with a torsional vibration damper in accordance with a fifth exemplary embodiment of the present invention;

FIG. 40 is an exploded assembly view of the torsional vibration damper in accordance with the fifth exemplary embodiment of the present invention.

Figure 1:
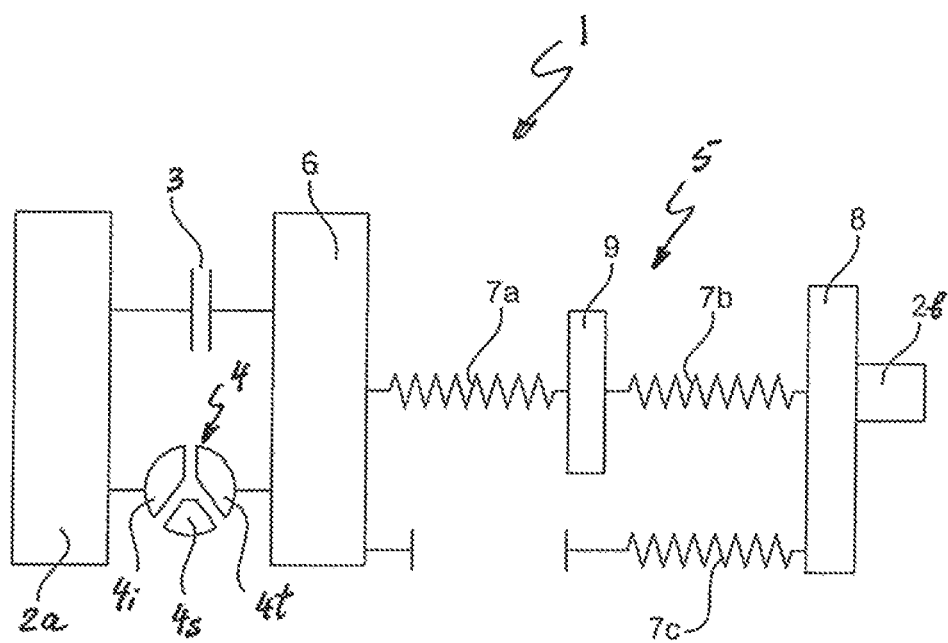
FIG. 1 is a schematic representation of a torque-coupling device of the prior art.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

Figure 2:
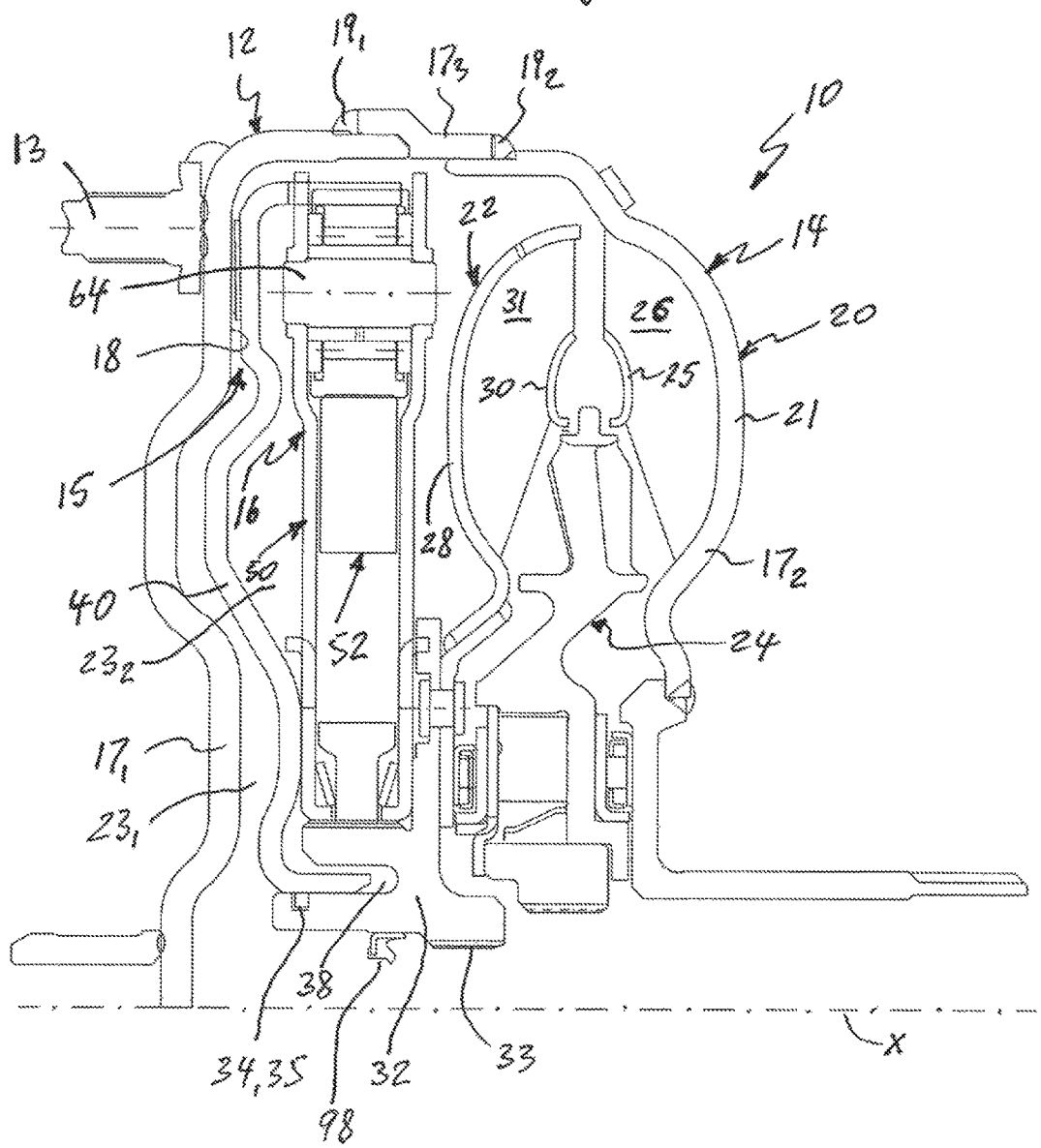
FIG. 2 is a fragmented half-view in axial section of a hydrokinetic torque-coupling device with a torsional vibration damper in accordance with a first exemplary embodiment of the present invention.

A first exemplary embodiment of a hydrokinetic torque-coupling device is generally represented in FIG. 2 by reference numeral 10. The hydrokinetic torque-coupling device 10 is intended to couple a driving shaft and a driven shaft, for example in a motor vehicle. In this case, the driving shaft is an output shaft of an internal combustion engine (ICE) of the motor vehicle and the driven shaft is a transmission input shaft of an automatic transmission of the motor vehicle.

The hydrokinetic torque-coupling device 10 comprises a sealed casing 12 filled with a fluid, such as oil or transmission fluid, and rotatable about a rotational axis X of rotation, a hydrokinetic torque converter 14 disposed in the casing 12, a lock-up clutch 15 and a torque transmitting device (or torsional vibration damper) 16 also disposed in the casing 12. The torsional vibration damper 16 of the present invention is in the form of a leaf (or blade) damper. The sealed casing 12, the torque converter 14, the lock-up clutch 15 and the torsional vibration damper 16 are all rotatable about the rotational axis X. The drawings discussed herein show half-views, that is, a cross-section of the portion or fragment of the hydrokinetic torque-coupling device 10 above the rotational axis X. As is known in the art, the torque-coupling device 10 is symmetrical about the rotational axis X. Hereinafter the axial and radial orientations are considered with respect to the rotational axis X of the torque-coupling device 10. The relative terms such as "axially," "radially," and "circumferentially" are with respect to orientations parallel to, perpendicular to, and circularly around the rotational axis X, respectively.

Figure 4:
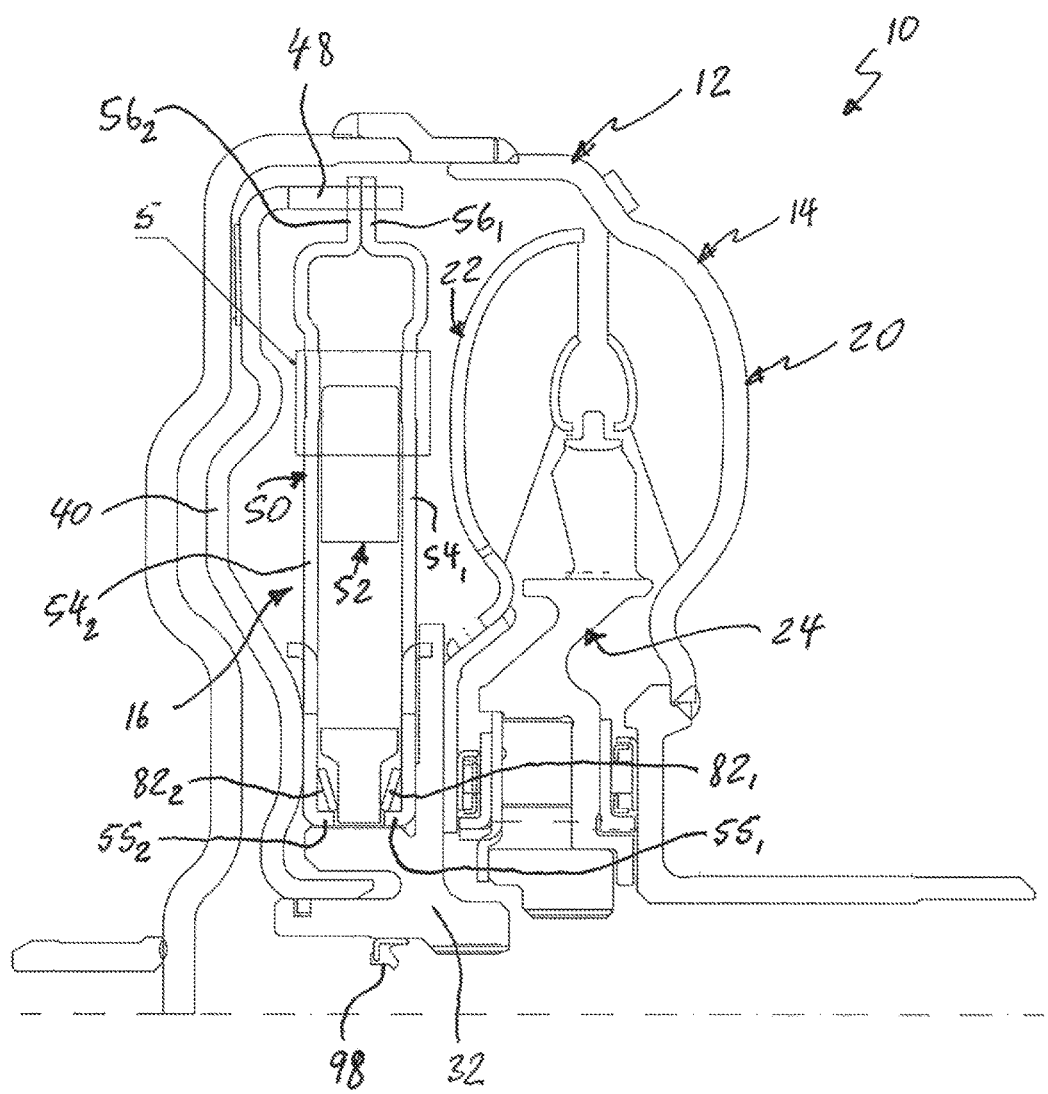
FIG. 4 is an alternative fragmented half-view in axial section of the hydrokinetic torque-coupling device with the torsional vibration damper in accordance with the first exemplary embodiment of the present invention.

The sealed casing 12 according to the exemplary embodiment as illustrated in FIGS. 2 and 4 includes a first shell (or casing shell) $17_1$, a second shell (or impeller shell) $17_2$ and an intermediate portion $17_3$ both disposed coaxially with and axially opposite to the first shell $17_1$. The first and second shells $17_1$, $17_2$ are non-movably (i.e., fixedly) interconnected by the annular intermediate portion $17_3$ and sealed together about their outer peripheries, such as by welds $19_1$ and $19_2$, as shown in FIGS. 2 and 4. The first shell $17_1$ is non-movably (i.e., fixedly) connected to the driving shaft, more typically to the output shaft of the ICE, so that the casing 12 turns at the same speed at which the engine operates for transmitting torque. Specifically, the casing 12 is rotatably driven by the ICE and is non-rotatably coupled to the driving shaft thereof, such as with a flexplate and studs 13. Typically, the studs 13 are fixedly secured, such as by welding, to the first shell $17_1$. Each of the first and second shells $17_1$, $17_2$ are integral or one-piece and may be made, for example, by press-forming one-piece metal sheets.

The torque converter 14 comprises an impeller assembly (sometimes referred to as the pump or impeller wheel) 20, a turbine assembly (sometimes referred to as the turbine wheel) 22, and a stator (sometimes referred to as the reactor) 24 interposed axially between the impeller wheel 20 and the turbine wheel 22. The impeller wheel 20, the turbine wheel 22, and the stator 24 are coaxially aligned with one another and the rotational axis X. The impeller wheel 20, the turbine wheel 22, and the stator 24 collectively form a torus. The impeller wheel 20 and the turbine wheel 22 may be fluidly coupled to one another in operation as known in the art.

The impeller wheel 20 includes a substantially annular, semi-toroidal (or concave) impeller shell 21, a substantially annular impeller core ring 25, and a plurality of impeller blades 26 fixedly (i.e., non-moveably) attached, such as by brazing, to the impeller shell 21 and the impeller core ring 25. Thus, at least a portion of the second shell $17_2$ of the casing 12 also forms and serves as the impeller shell 21 of the impeller wheel 20. Accordingly, the impeller shell 21 sometimes is referred to as part of the casing 12. The impeller wheel 20, including the impeller shell 21, the impeller core ring 25 and the impeller blades 26, are non-rotatably secured to the second shell $17_2$ and hence to the driving shaft (or flywheel) of the engine to rotate at the same speed as the engine output. The impeller shell 21, impeller core ring 25 and the impeller blades 26 are conventionally formed by stamping from steel blanks.

Figure 3:
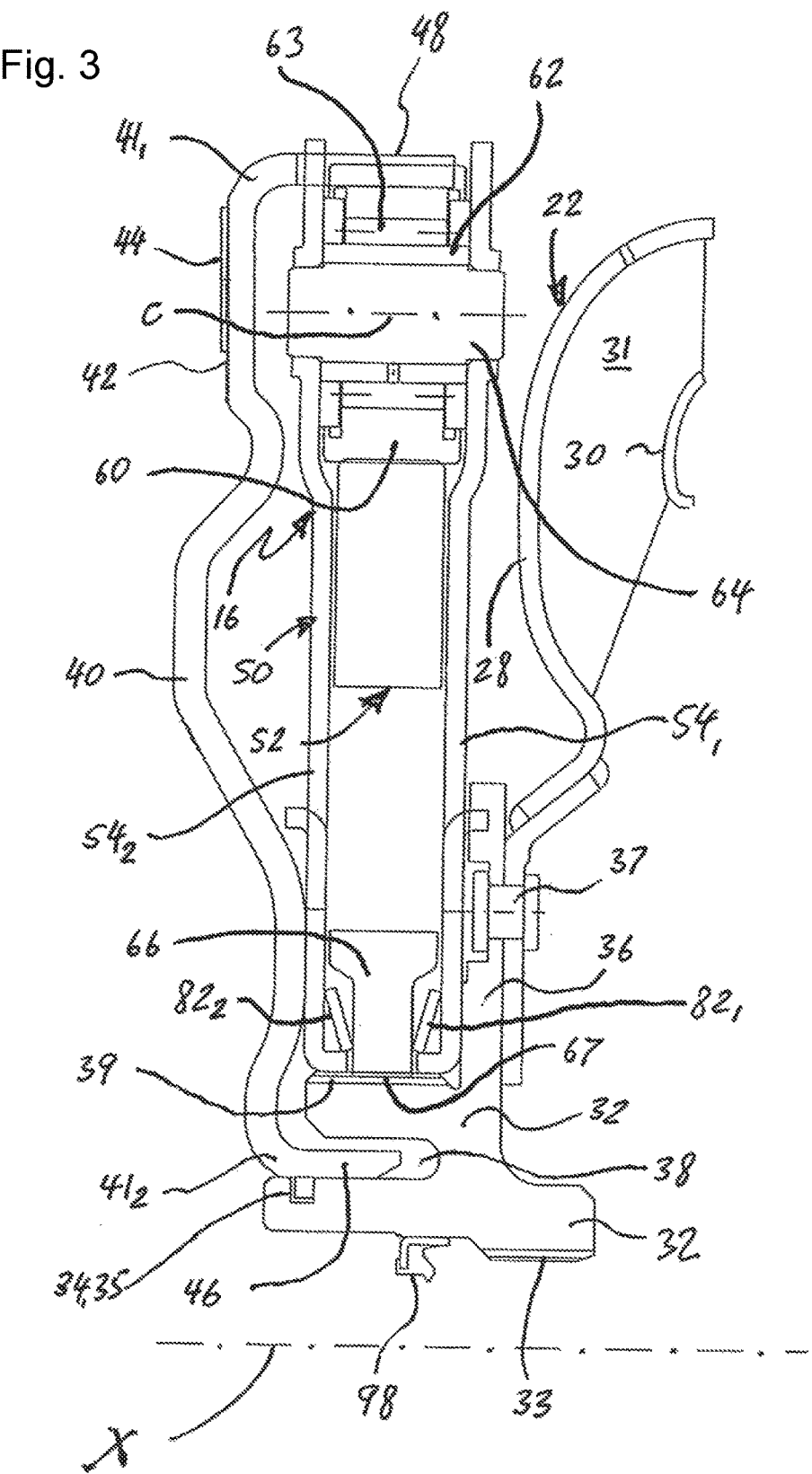
FIG. 3 is fragmented partial half-view in axial section of the hydrokinetic torque-coupling device showing a locking piston and the torsional vibration damper in accordance with the first exemplary embodiment of the present invention.

The turbine wheel 22, as best shown in FIGS. 2-4, comprises a substantially annular, semi-toroidal (or concave) turbine shell 28 rotatable about the rotational axis X, a substantially annular turbine core ring 30, and a plurality of turbine blades 31 fixedly (i.e., non-moveably) attached, such as by brazing, to the turbine shell 28 and the turbine core ring 30. The turbine shell 28, the turbine core ring 30 and the turbine blades 31 are conventionally formed by stamping from steel blanks.

The torque-coupling device 10 further includes an annular output hub (also referred to as a central hub) 32 rotatable about the rotational axis X. The output hub 32 is operatively coupled to and coaxial with the driven shaft. For example, according to the exemplary embodiment, the output hub 32 is provided with internal splines 33 for non-rotatably coupling the output hub 32 to the driven shaft, such as a transmission input shaft, provided with complementary external splines or grooves. Alternatively, a weld or other connection may be used to fix the output hub 32 to the driven shaft. A radially outer surface of the output hub 32 includes an annular slot 34 for receiving a sealing member, such as an O-ring 35. A sealing member 98, mounted to a radially inner peripheral surface of the output hub 32, creates a seal at the interface of the transmission input shaft and the output hub 32, as best shown in FIGS. 2-4.

The central hub 32 has an annular flange 36 extending radially outwardly from the central hub 32, and an annular groove 38, which axially opens opposite the impeller wheel 20 and the turbine wheel 22, as best shown in FIGS. 2-4. The turbine shell 28 of the turbine wheel 22 is non-movably (i.e., fixedly) secured to the flange 36 of the output hub 32 by any appropriate means, such as by rivets 37 (best shown in FIG. 3) or welding.

Moreover, the output hub 32 is provided with external splines 39 for operatively coupling the output hub 32 to the torsional vibration damper 16.

The lock-up clutch 15 includes a substantially annular locking piston 40 having an engagement surface 42 facing a locking surface 18 defined on the first casing shell $17_1$ of the casing 12. The locking piston 40 is axially moveable relative to the output hub 32 along the rotational axis X to and from the locking surface 18 so as to selectively engage the locking piston 40 against the locking surface 18 of the casing 12. The lock-up clutch 15 further includes an annular friction liner 44 fixedly attached to the engagement surface 42 of the locking piston 40 by appropriate means known in the art, such as by adhesive bonding. As best shown in FIGS. 2-4, the friction liner 44 is fixedly attached to the engagement surface 42 of the locking piston 40 at a radially outer peripheral end $41_1$ thereof.

The annular friction liner 44 is made of a friction material for improved frictional performance. Alternatively, an annular friction liner may be secured to the locking surface 18 of the casing 12. According to still another embodiment, a first friction ring or liner is secured to the locking surface 18 of the casing 12 and a second friction ring or liner is secured to the engagement surface 42 of the locking piston 40. It is within the scope of the invention to omit one or both of the friction rings. In other words, the annular friction liner 44 may be secured to any, all, or none of the engagement surfaces. Further with the exemplary embodiment, the engagement surface 42 of the locking piston 40 is slightly conical to improve the engagement of the lock-up clutch 15. Specifically, the engagement surface 42 of the locking piston 40 holding the annular friction liner 44 is conical, at an angle between 10° and 30°, to improve the torque capacity of the lock-up clutch 15. Alternatively, the engagement surface 42 of the locking piston 40 may be parallel to the locking surface 18 of the casing 12.

The lock-up clutch 15 is provided for locking the driving and driven shafts. The lock-up clutch 15 is usually activated after starting of the motor vehicle and after hydraulic coupling of the driving and driven shafts, in order to avoid the loss of efficiency caused in particular by slip phenomena between the turbine wheel 20 and the impeller wheel 22. The locking piston 40 is axially displaceable toward (an engaged (or lockup) position (or mode) of the lock-up clutch 15) and away (a disengaged (or non-lockup) position (or mode) of the lock-up clutch 15) from the locking surface 18 inside the casing 12. Moreover, the locking piston 40 is axially displaceable away from (the engaged (or lockup) position of the lock-up clutch 15) and toward (the disengaged (or non-lockup) position of the lock-up clutch 15) the torsional vibration damper 16.

Specifically, extending axially at a radially inner peripheral end $41_2$ of the locking piston 40 is a cylindrical rim 46 that is proximate to and coaxial with the rotational axis X, as best shown in FIGS. 2 and 3. The locking piston 40 is mounted to the output hub 32 so that the cylindrical rim 46 of the locking piston 40 is disposed in the annular groove 38 of the output hub 32. Consequently, the locking piston 40 is centered and rotatable and axially slidably displaceable relative to the output hub 32 and about a radially internal cylindrical surface of the annular groove 38 of the output hub 32.

The sealing member (e.g., the sealing ring) 35 creates a seal at the interface of the cylindrical flange 36 and the output hub 32. As discussed, the locking piston 40 is axially movably relative to the output hub 32 along this interface. The axial motion of the locking piston 40 along the output hub 32 is controlled by first and second pressure chambers $23_1$, $23_2$ positioned on axially opposite sides of the locking piston 40.

The locking piston 40 is selectively pressed against the locking surface 18 of the casing 12 so as to lock-up the torque-coupling device 10 between the driving shaft and the driven shaft to control sliding movement between the turbine wheel 22 and the impeller wheel 20. Specifically, when an appropriate hydraulic pressure in applied to the locking piston 40, the locking piston 40 moves leftward (as shown in FIG. 2) toward the locking surface 18 of the casing 12 and away from the turbine wheel 22, and clamps the friction liner 44 between itself and the locking surface 18 of the casing 12. As a result, the lock-up clutch 15, in the locked position, is mechanically frictionally coupled to the casing 12 so as to bypass the turbine wheel 22 when in the locked position of the lock-up clutch 15. Thus, the lock-up clutch 15 is provided to bypass the turbine wheel 22 when in the locked position thereof.

During operation, when the lock-up clutch 15 is in the disengaged (open) position, the engine torque is transmitted from the impeller wheel 20 by the turbine wheel 22 of the torque converter 14 to the output hub 32 and the driven shaft. When the lock-up clutch 15 is in the engaged (locked) position, the engine torque is transmitted by the casing 12 to the output hub 32 and the driven shaft through the torsional vibration damper 16.

The torsional vibration damper 16 advantageously allows the turbine wheel 22 of the torque converter 14 to be coupled, with torque damping, to the output hub 32, i.e., the input shaft of the automatic transmission. The torsional vibration damper 16 also allows damping of stresses between the driving shaft and the driven shaft that are coaxial with the rotational axis X, with torsion damping.

The torsional vibration damper 16, as best shown in FIGS. 2-4, is disposed axially between the turbine shell 28 of the turbine wheel 22 and the locking piston 40 of the lock-up clutch 15. The locking piston 40 of the lock-up clutch 15 is rotatably and axially slidably mounted to the output hub 32. The torsional vibration damper 16 is positioned on the output hub 32 in a limited, movable and centered manner.

The torsional vibration damper 16 comprises a torque input member 50 rotatable about the rotational axis X, and an integral radially elastic member 52 rotatable relative to the torque input member 50 around the rotational axis X and elastically coupling the output hub 32 to and the torque input member 50, as best shown in FIGS. 2-4.

The torque input member 50 includes two axially opposite annular, radially oriented side plates, including a first annular, radially oriented side plate $54_1$ adjacent to the turbine shell 28, and a second annular, radially oriented side plate $54_2$ adjacent to the locking piston 40. The first side plate $54_1$ is substantially parallel to and axially spaced from the second side plate $54_2$, as best shown in FIG. 3. Moreover, the first and second side plates $54_1$ and $54_2$, respectively, are non-moveably attached (i.e., fixed) to one another, such as by mechanical fasteners 57. Also, the first side plate $54_1$ is substantially identical to the second side plate $54_2$, as best shown in FIGS. 2-4 and 8.

Figure 6:
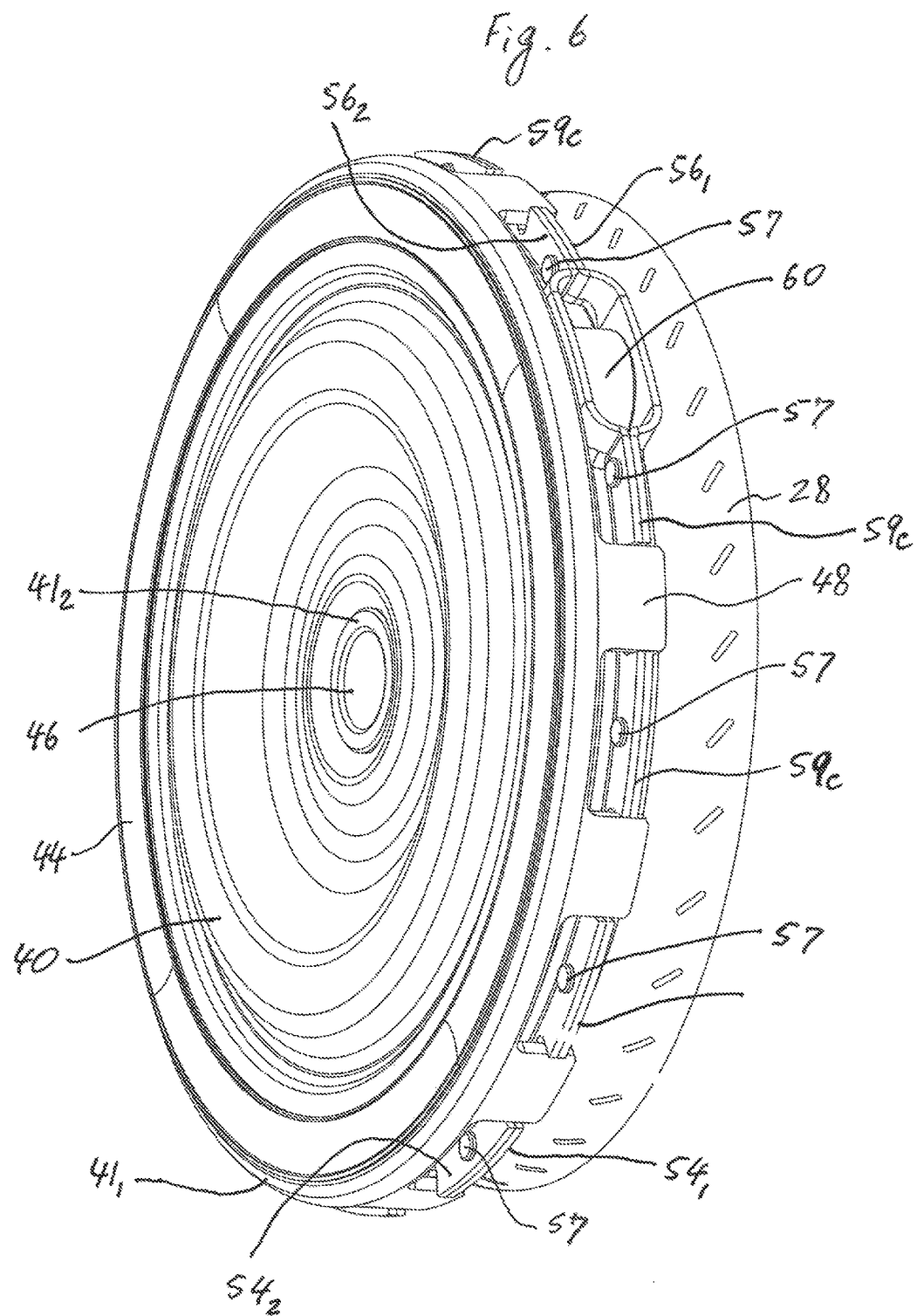
FIG. 6 is a partial perspective view of the hydrokinetic torque-coupling device showing the locking piston and the torsional vibration damper in accordance with the first exemplary embodiment of the present invention.
Figure 7:
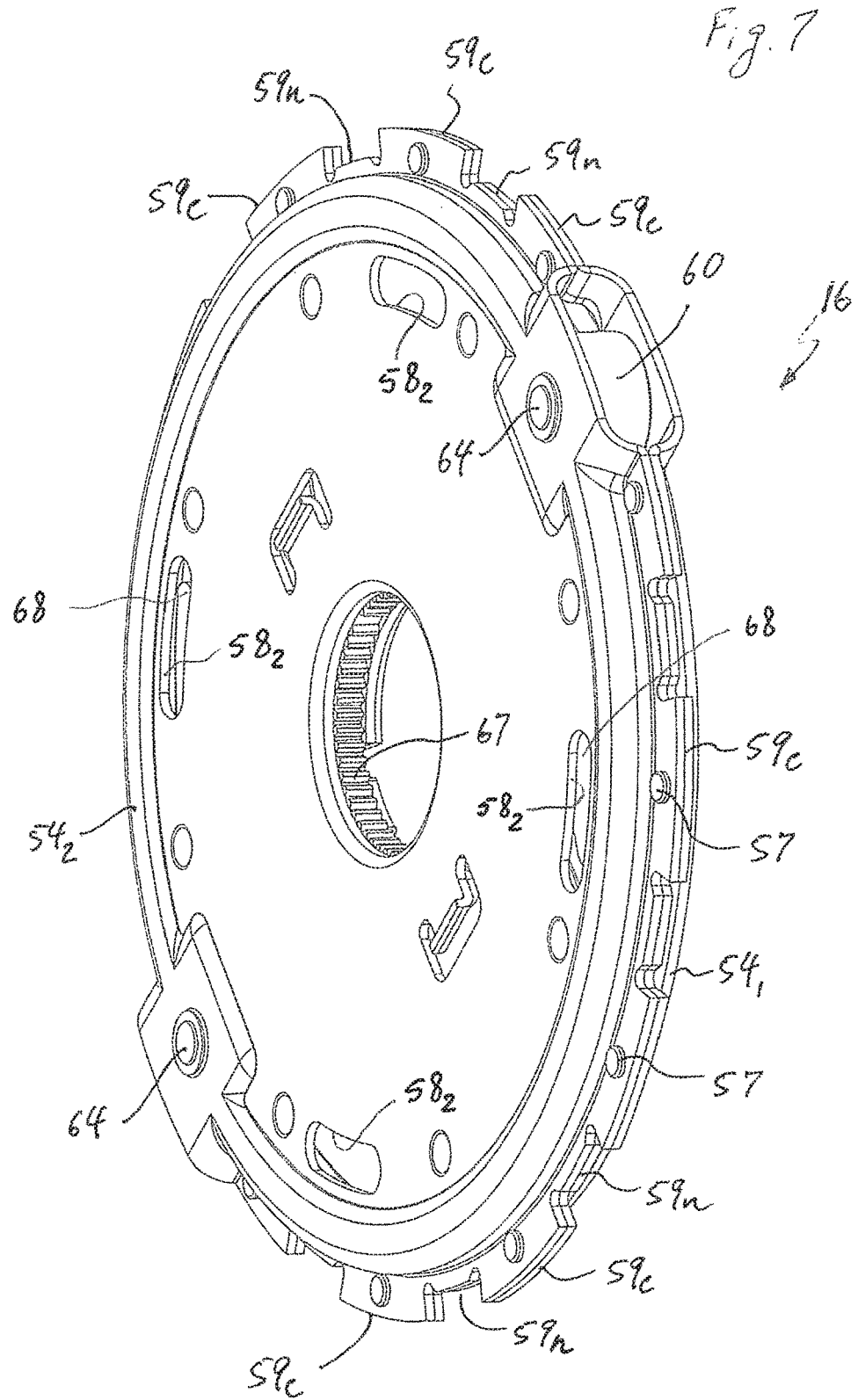
FIG. 7 is a perspective view of the torsional vibration damper in accordance with the first exemplary embodiment of the present invention.
Figure 8:
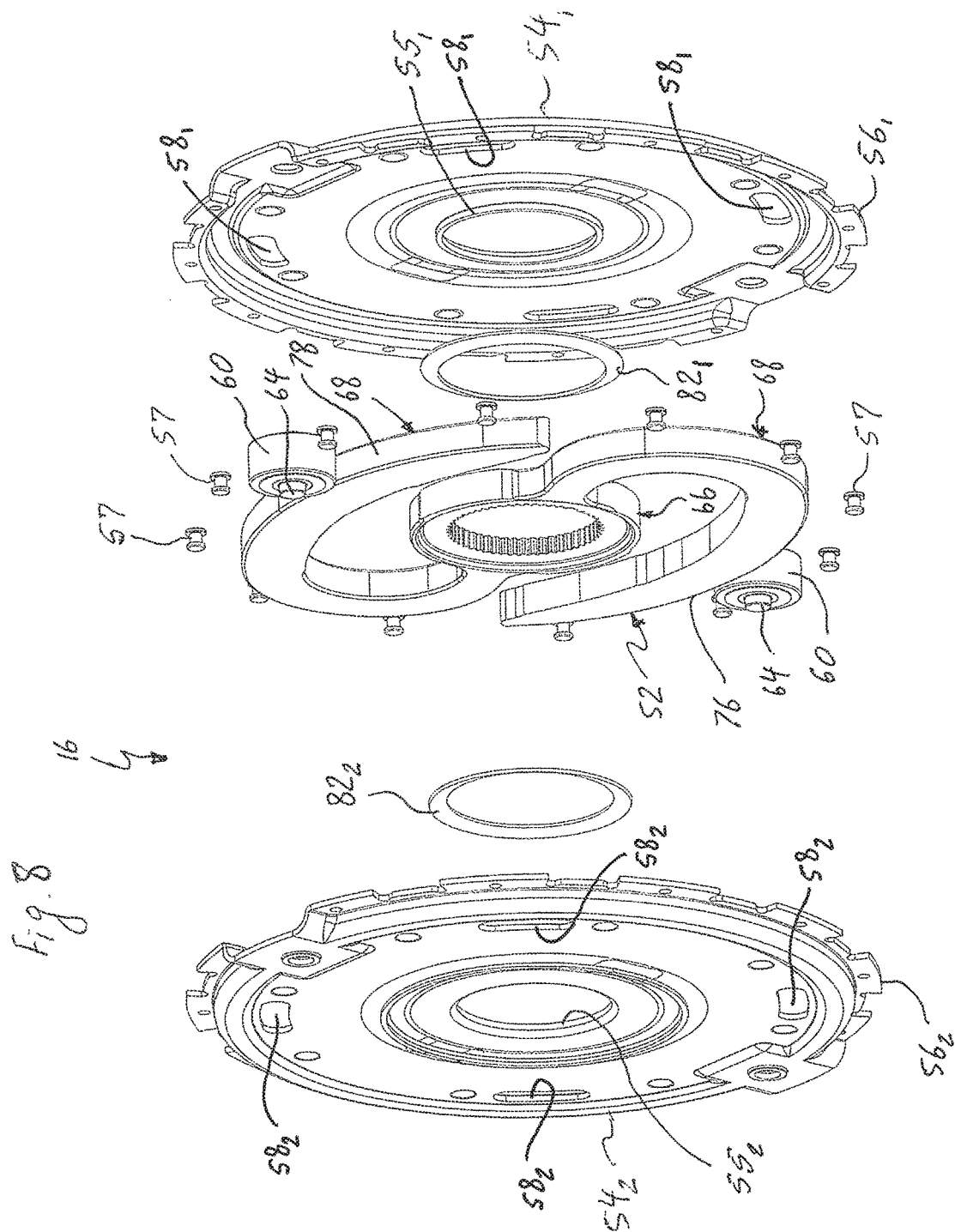
FIG. 8 is an exploded assembly view of the torsional vibration damper in accordance with the first exemplary embodiment of the present invention.
Figure 10:
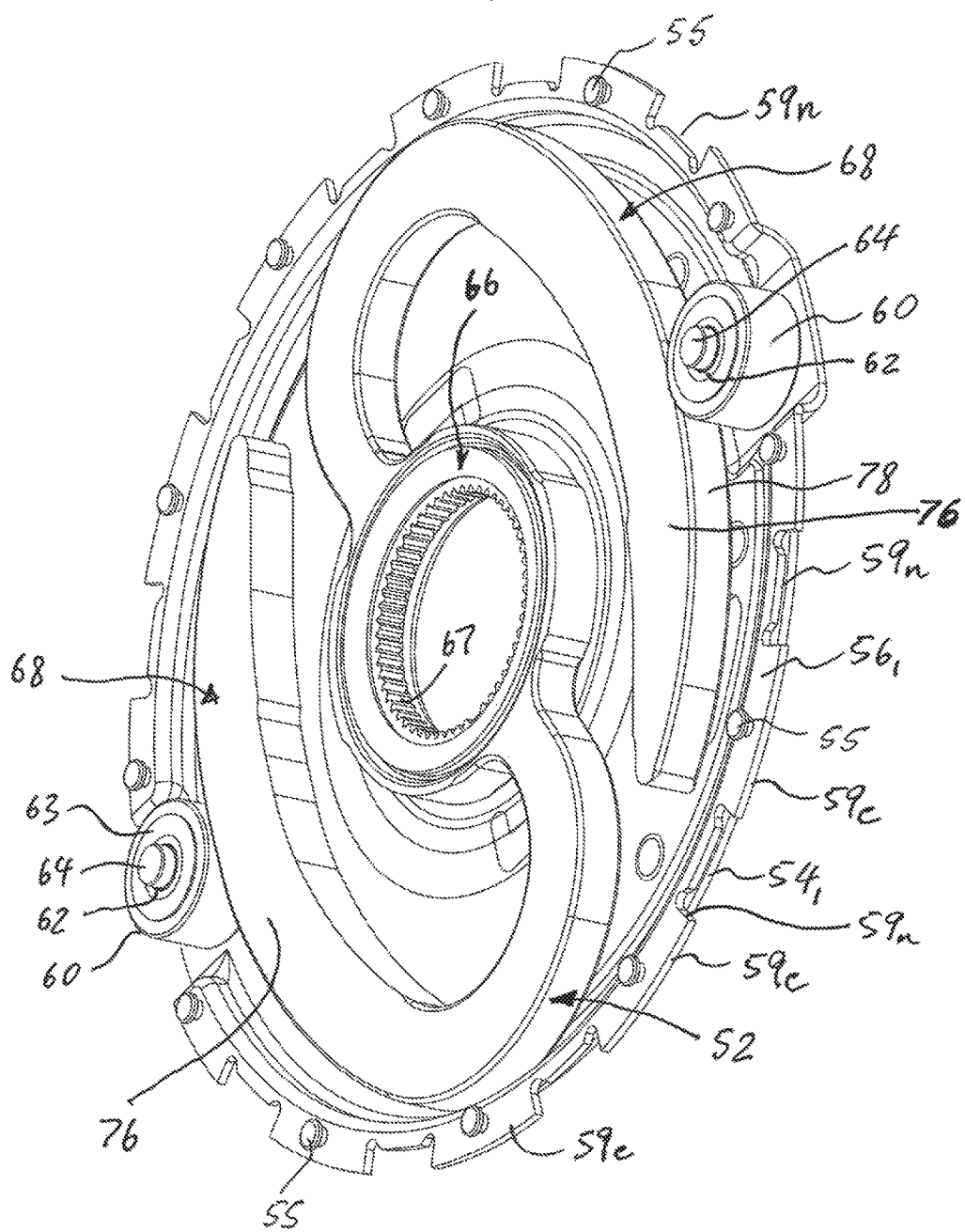
FIG. 10 is a partial perspective view of the torsional vibration damper in accordance with the first exemplary embodiment of the present invention.

According to the first exemplary embodiment of the present invention, as best illustrated in FIGS. 7, 8 and 10, the first side plate $54_1$ has a substantially annular outer mounting flange $56_1$ provided with a plurality of circumferentially spaced holes. The second side flange $56_2$, on the other hand, has a substantially annular outer mounting flange $56_2$ provided with a plurality of circumferentially spaced holes. The first and second side plates $54_1$ and $54_2$ are non-movably (i.e., fixedly) secured to one another so that the outer mounting flanges $56_1$, $56_2$ of the first and second side plates $54_1$, $54_2$, respectively, axially engage one another and are fixed by rivets 57 extending through the holes in the outer mounting flanges $56_1$, $56_2$ of the first and second damper side plates $54_1$, $54_2$, as best shown in FIGS. 4, 6 and 8. Thus, the first and second side plates $54_1$, $54_2$ are non-rotatable relative to one another, but rotatable relative to the radially elastic member 52.

As further illustrated in FIGS. 2-4 and 6, the torque input member 50 (i.e., the first and second side plates $54_1$, $54_2$) is non-rotatably coupled to the locking piston 40 of the lock-up clutch 15. The first and second side plates $54_1$, $54_2$ are arranged axially on either side of the radially elastic member 52 and are operatively connected therewith. As described above, the first and second side plates $54_1$, $54_2$ are non-movably (i.e., fixedly) secured to one another by appropriate means, such as by the mechanical fasteners 57 so as to be rotatable relative to the radially elastic member 52.

The torque input member 50 further includes at least one, preferably two, supporting members 60. In the exemplary embodiment, the supporting members 60 are in the form of annular rolling bodies, such as cylindrical rollers, rotatably mounted to a radially external periphery of the first side plate $54_1$ and the second side plate $54_2$, axially between the first and second side plates $54_1$ and $54_2$, respectively. Each of the rolling bodies 60 is rotatable around a central axis C. The central axis C of the rolling body 60 is substantially parallel to the rotational axis X, as best shown in FIGS. 2 and 3.

The rolling bodies 60 are positioned so as to be diametrically opposite to one another. More specifically, the rolling bodies 60 are rotatably mounted about hollow shafts 62, which axially extend between the first and second retainer plates $54_1$ and $54_2$. The hollow shafts 62 are mounted on support pins 64 extending axially through the hollow shafts 62, and between and through the first and second side plates $54_1$ and $54_2$, as best shown in FIGS. 2, 3 and 10. The rolling bodies 60 are rotatably mounted on the hollow shafts 62 through roller bearings, such as needle bearings 63, for instance, as best shown in FIG. 3. In other words, the rolling bodies 60 are rotatable around the central axes C thereof, while the support pins 64 are non-rotatable relative to the first and second side plates $54_1$ and $54_2$ of the torque input member 50 around the rotational axis X.

The lock-up clutch 15 is configured to non-rotatably couple the casing 12 and the torque input member 50 in the engaged (lockup) position, and configured to drivingly disengage the casing 12 and the torque input member 140 in the disengaged (non-lockup) position.

The locking piston 40 further comprises at least one, preferably a plurality, of coupling lugs 48 axially extending from a radially outer peripheral end $41_1$ toward the torque input member 50 and the turbine shell 28. The locking piston 40 with the axially extending coupling lugs 48 is preferably an integral part, e.g., made of a single or unitary (i.e., made as a single part) component, but may be made of separate components fixedly connected together. The torque input member 50, on the other hand, includes at least one, preferably a plurality, of notches (or recesses) 59n, each complementary to one of the coupling lugs 48. Specifically, the notches 59n are provided in the outer mounting flanges $56_1$, $56_2$ of the first and second retainer plates $54_1$, $54_2$, as best shown in FIGS. 7, 8 and 10. The notches 59n are separated from each other by radially outwardly extending cogs (or teeth) 59c. Each of the coupling lugs 48 positively engages one of the complementary notches 59n so as to non-rotatably couple the locking piston 40 and the torque input member 50 while allowing an axial motion of the locking piston 40 with respect to the torque input member 50, as best shown in FIGS. 4 and 6.

The cylindrical rim 46 of the locking piston 40 is mounted to the output hub 32 so as to be centered, rotatable and axially slidably displaceable relative to the output hub 32. The locking piston 40 is also axially slidably displaceable relative to the torque input member 50 of the torsional vibration damper 16. The axial displacement of the locking piston 40 along the output hub 32 is controlled by the pressure chambers $23_1$, $23_2$ positioned on axially opposite sides of the locking piston 40.

Figure 9:
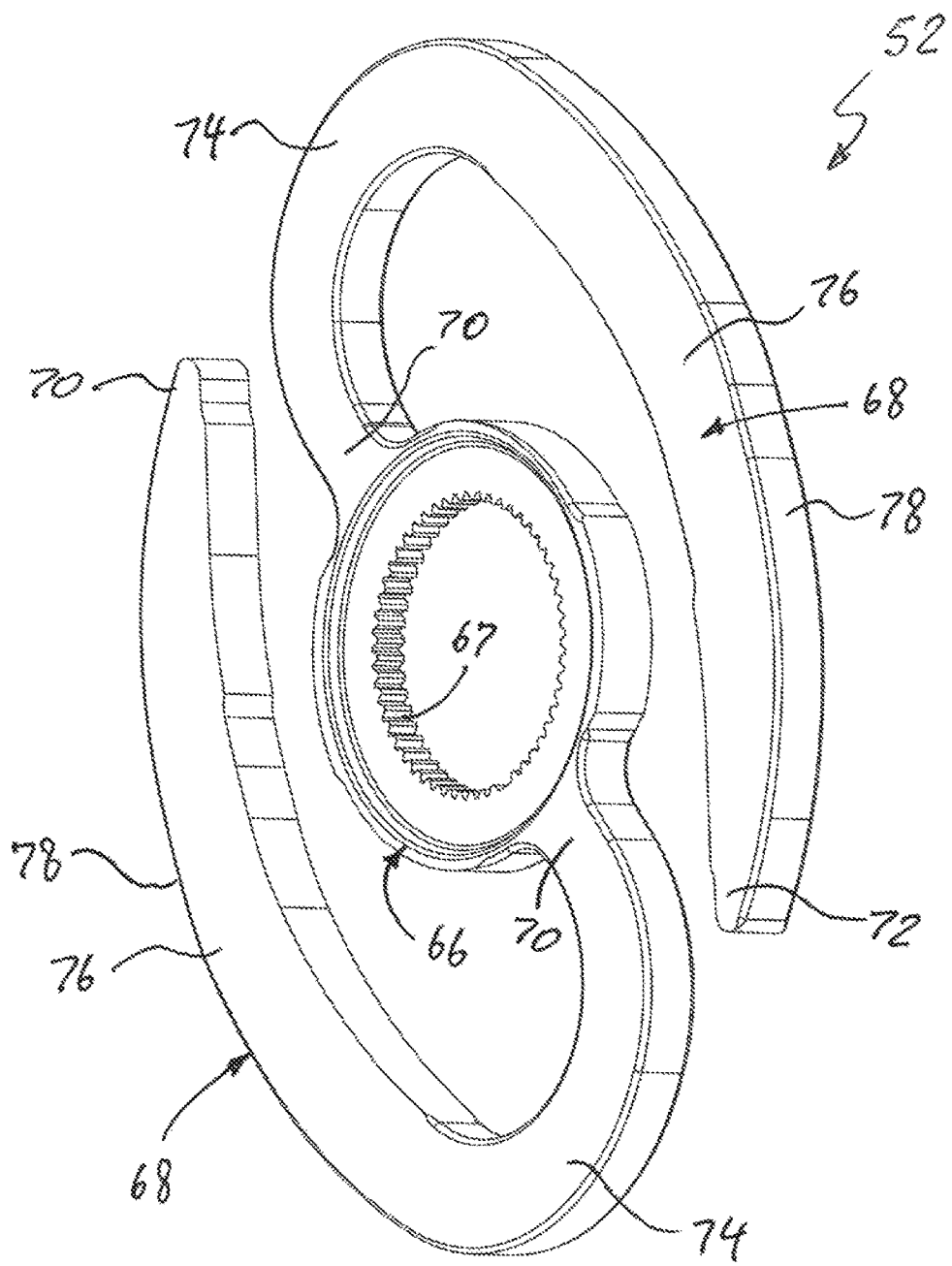
FIG. 9 is a perspective view of a radially elastic member of the torsional vibration damper in accordance with the first exemplary embodiment of the present invention.

The radially elastic member 52 includes an annular core member 66 coaxial with the rotational axis X and rotatable relative the torque input member 50, and at least one, preferably two substantially identical, radially opposite curved elastic leaves (or blades) 68 integral (or unitary) with the core member 66, as best shown in FIG. 9.

The radially elastic member 52 is configured to be elastically and radially supported by the rolling bodies 60 and to elastically bend (or deform) in the radial direction upon rotation of the torque input member 50 with respect to the radially elastic member 52. A radially inner surface of the core member 66 includes internal splines 67 for directly and non-rotatably engaging complementary external splines 39 of the output hub 32. At the same time, the core member 66 of the radially elastic member 52 is axially moveable relative to the output hub 32 due to a splined connection therebetween. Accordingly, the radially elastic member 52 is non-rotatably coupled to and axially moveable relative to the output hub 32.

As best shown in FIG. 9, each of the curved elastic leaves 68 is symmetrical with respect to the rotational axis X. Moreover, each of the curved elastic leaves 68 has a proximal end 70 unitary with (i.e., non-moveably connected or fixed to) the core member 66, a free distal end 72, a bent portion 74 adjacent to the proximal end 70, and a curved raceway portion 76 disposed between the bent portion 74 and the free distal end 72 of the elastic leaf 68 for bearing one of the rolling bodies 60. Also, the curved raceway portion 76 is connected to the core member 66 by the bent portion 74. The radially elastic member 52 with the core member 66 and the elastic leaves 68 is an integral (or unitary) component, e.g., made of a single part, but may be separate components fixedly connected together. Preferably, the radially elastic member 52 is made of steel as a single-piece part by fine stamping and appropriate heat treatment.

Each of the curved elastic leaves 68 is radially elastically deformable relative to the core member 66 due to the elasticity of each of the bent portions 74. The bent portion 74 subtends an angle of approximately 180°. A radially external surface of the curved raceway portion 76 of each of the curved elastic leaves 68 defines a radially outer raceway 78 configured as a surface that is in a rolling contact with one of the rollers 60, so that each of the rolling bodies 60 is positioned radially outside of the elastic leaf 68, as illustrated in FIGS. 2, 3, 8 and 10. The raceways 78 of the curved raceway portions 76 of the curved elastic leaf 68 extend on a circumference with an angle ranging from about 120° to about 180°. The raceway 78 of each of the curved raceway portions 76 has a generally convex shape, as best shown in FIGS. 8-10. Moreover, as the torque input member 40 is axially moveable along the rotational axis X relative to the turbine assembly 22 and the turbine assembly 22, the rolling bodies 50 are axially displaceable relative to the raceways 66 of the curved raceway portions 64 of the curved elastic leaves 56.

At least one, preferably both the first and second side plates $54_1$ and $54_2$ of the torsional vibration damper 16 are formed with at least one, preferably a plurality of viewing windows $58_1$ and $58_2$ therethrough, as best shown in FIGS. 7 and 8. In the first exemplary embodiment of the present invention, the first side plate $54_1$ of the torsional vibration damper 16 is formed with four (4) viewing windows $58_1$ therethrough, which are circumferentially spaced from each other around the rotational axis X, as best shown in FIG. 8. Similarly, the second side plate $54_2$ of the torsional vibration damper 16 is formed with four (4) viewing windows $58_2$ therethrough, which are circumferentially spaced from each other around the rotational axis X, as best shown in FIGS. 7 and 8. As best shown in FIG. 7, the viewing windows $58_1$ and $58_2$ allow an interior space between the first and second side plates $54_1$ and $54_2$ of the torsional vibration damper 16 to be observed.

The lock-up clutch 15 is configured to non-rotatably couple the casing 12 and the torque input member 50 in the engaged (lockup) position, and configured to drivingly disengage the casing 12 and the torque input member 50 in the disengaged (non-lockup) position.

In operation, when the rolling body 60 moves along the raceway 78 of the curved raceway portion 76 of the curved elastic leaf 68, the rolling body 60 presses the curved raceway portion 76 of the curved elastic leaf 68 radially inward, thus enabling a contact of the rolling body 60 with the curved raceway portion 76 of the curved elastic leaf 68, as best illustrated in FIG. 10. Radial forces make it possible for the curved elastic leaf 68 to bend (or deform) and forces tangential to the raceway 78 of the curved elastic leaf 68 make it possible for the rolling body 60 to move (roll) on the raceway 78 of the curved elastic leaf 68 and to transmit torque from the torque input member 50 to the core member 66 of the radially elastic member 52, and then to the output hub 32. Thus, the core member 66 of the radially elastic member 52, which is splined directly with the output hub 32, forms an output part of the torsional vibration damper 16 and a driven side of the torque-coupling device 10. The locking piston 40, on the other hand, forms an input part of the torsional vibration damper 16. The torque from the driving shaft (or crankshaft) is transmitted to the casing 12 through the studs 13, as best shown in FIG. 2.

In the disengaged position of the lock-up clutch 15, the torque goes through the torque converter 14, i.e. the impeller wheel 20 and then the turbine wheel 22 fixed to the output hub 32. The torque is then transmitted to the driven shaft (transmission input shaft) splined directly to the output hub 32.

In the engaged position of the lock-up clutch 15, the torque from the casing 12 is transmitted to the torque input member 50 (i.e., the first and second side plates $54_1$ and $54_2$, and the rolling bodies 60) through the locking piston 40. Then, the torque from the torque input member 50 is transmitted to the output hub 32 through the radially elastic member 52 formed by the core member 66 and the elastic leaves 68. Specifically, the torque is transmitted from the core member 66 of the radially elastic member 52 to the output hub 32. Next, the torque is transmitted from the output hub 32 to the driven shaft (transmission input shaft) splined directly to the output hub 32. Moreover, when the torque transmitted between the casing 12 and the o output hub 32 varies, the radial stresses exerted between each of the elastic leaves 68 and the corresponding rolling body 60 vary and the bending of the elastic leaves 68 is modified. The modification in the bending of the elastic leaves 68 arise due to motion of the rolling body 60 along the corresponding raceway 78 of the curved elastic leaf 68 due to peripheral stresses.

The raceway 78 has a profile so arranged that, when the transmitted torque increases, the rolling body 60 exerts a bending force on the corresponding curved elastic leaf 68, which causes the free distal end 72 of the curved elastic leaf 68 to move radially towards the rotational axis X and produces a relative rotation between the casing 12 and the output hub 44 of the elastic output member 42, such that both the casing 12 and the output hub 32 move away from their relative rest positions. A rest position is that position of the torque input member 50 relative to the radially elastic member 52 wherein no torque is transmitted between the casing 12 and the output hub 32 through the rolling bodies 60.

The profiles of the raceways 78 are such that the rolling bodies 60 exert bending forces (pressure) having radial and circumferential components onto the curved elastic leaves 68. Specifically, the elastic leaves 68 are configured so that in a relative angular position between the torque input member 50 and the elastic member 52 different from the rest position, each of the rolling bodies 60 exerts a bending force on the corresponding elastic leaf 68, thus causing a reaction force of the elastic leaf 68 acting on the rolling body 60, with the reaction force having a radial component which tends to maintain the elastic leaf 68 in contact with the rolling body 60.

In turn, each of the elastic leaves 68 exerts onto the corresponding rolling body 60 a back-moving force having a circumferential component which tends to rotate the rolling bodies 60 in a reverse direction of rotation, and thus to move the torque input member 50 and the output hub 32 back towards their relative rest positions, and a radial component directed radially outwardly, which tends to maintain each of the raceways 78 in direct contact with the corresponding rolling body 60.

When the casing 12 and the elastic member 52 are in the rest position, the elastic leaves 68 are preferably radially pre-stressed toward the rotational axis X so as to exert a reaction force directed radially outwards, to thus maintain the curved elastic leaves 68 supported by the associated rolling bodies 60.

Moreover, the profiles of the raceways 78 are so arranged that a characteristic transmission curve of the torque according to the angular displacement of the rolling body 60 relative to the raceway 78 is configured to be symmetrical or asymmetrical relative to the rest position. According to the exemplary embodiment, the angular displacement of the rolling body 60 relative to the raceway 78 is greater in a direct direction of rotation than in a reverse (i.e., opposite to the direct) direction of rotation.

According to the exemplary embodiment, the angular displacement of the casing 12 relative to the radially elastic member 52 in the locked position of the lock-up clutch 15 is greater than 20°, preferably greater than 40°. The curved elastic leaves 68 are regularly distributed around the rotational axis X and are symmetrical relative to the rotational axis X so as to ensure the balance of the torque converter 14.

Figure 5:
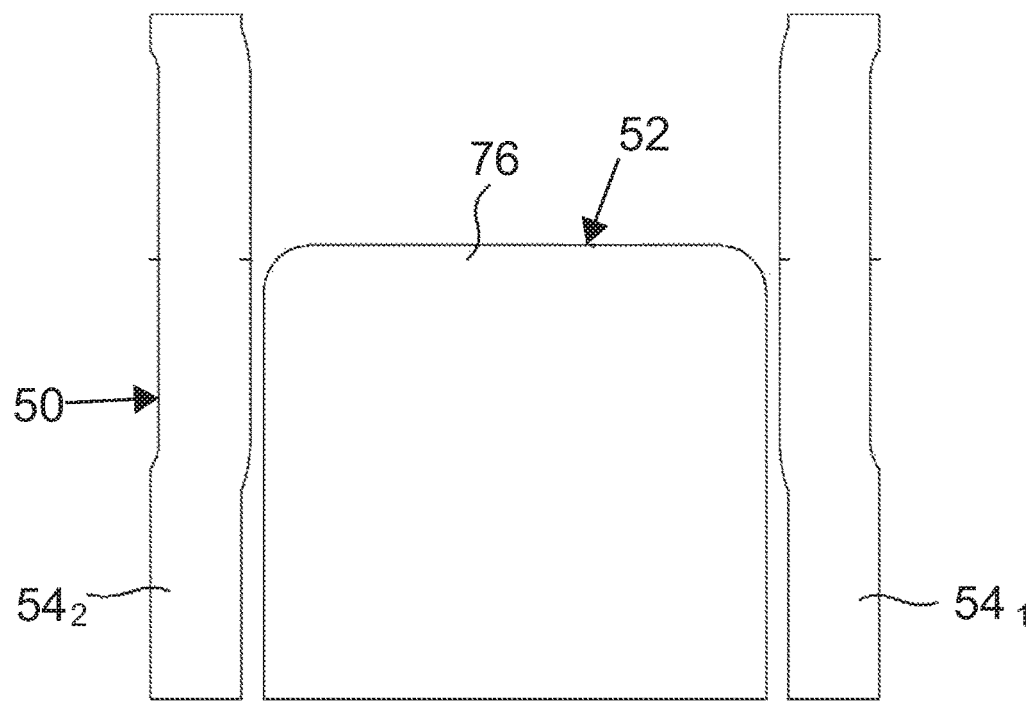
FIG. 5 is an enlarged view of a fragment of the torsional vibration damper shown in the rectangle "5" of FIG. 4.

The torsional vibration damper 16 according to the first exemplary embodiment, further comprises first and second axially resilient (or elastic) members $82_1$ and $82_2$, respectively. As best shown in FIGS. 3 and 4, the first resilient member $82_1$ is disposed and compressed axially between the first side plate $54_1$ and the core member 66 of the radially elastic member 52 for biasing the radially elastic member 52 away from one of the first side plate $54_1$. The second axially resilient member $82_2$ is disposed and compressed axially between the second side plate $54_2$ and the core member 66 of the radially elastic member 52 for biasing the radially elastic member 52 away from one of the second side plate $54_2$. In other words, the radially elastic member 52 is elastically clamped in axial direction between two resilient members $82_1$ and $82_2$. As a result, as best shown in FIG. 5, the radially elastic member 52 is disposed centrally (i.e., in the middle) between the first and second side plates $54_1$ and $54_2$ of the torque input member 50, such that axially opposite outer surfaces of the radially elastic member 52 are axially equidistantly spaced from the first and second side plates $54_1$ and $54_2$ of the torque input member 50.

The first and second axially resilient members $82_1$ and $82_2$, which disposed between the first and second side plates $54_1$ and $54_2$ of the torque input member 50 on axially opposite sides of the core member 66 of the radially elastic member 52, prevent or significantly reduce axial vibration of the radially elastic member 52 during torque transmitting in the lockup position of the lock-up clutch 15.

According to the first exemplary embodiment of the present invention, each of the first and second axially resilient members $82_1$ and $82_2$ is an annular axially resilient spring formed separate from the first and second side plates $54_1$ and $54_2$ of the torque input member 50 and the radially elastic member 52. Preferably, each of the first and second axially resilient springs $82_1$ and $82_2$ is in the form of a Belleville spring, as best shown in FIGS. 3, 4 and 8. As further illustrated in FIGS. 3 and 4, the first and second Belleville springs $82_1$ and $82_2$ are disposed on axially opposite sides of the core member 66 of the radially elastic member 52, and are mounted on first and second radially innermost flanges $55_1$ and $55_2$ of the first and second side plates $54_1$ and $54_2$, respectively. The first and second radially innermost flanges $55_1$ and $55_2$ of the first and second side plates $54_1$ and $54_2$ extend axially inwardly toward the core member 66 of the radially elastic member 52, as best shown in FIGS. 3, 4 and 8. Therefore, the radially elastic member 52 is elastically clamped in axial direction between the two Belleville springs $82_1$ and $82_2$.

A method for assembling the hydrokinetic torque-coupling device 10 is as follows. It should be understood that this exemplary method may be practiced in connection with the other embodiments described herein. This exemplary method is not the exclusive method for assembling the turbine assembly described herein. While the methods for assembling the hydrokinetic torque-coupling device 10 may be practiced by sequentially performing the steps as set forth below, it should be understood that the methods may involve performing the steps in different sequences.

First, the impeller wheel 20, the turbine wheel 22, the stator 24, and the damper assembly 16 may each be preassembled. The impeller wheel 20 and the turbine wheel 22 are formed by stamping from steel blanks or by injection molding of a polymeric material. The stator 24 is made by casting from aluminum or injection molding of a polymeric material. The impeller wheel 20, the turbine wheel 22 and the stator 24 subassemblies are assembled together so as to form the torque converter 14. Next, the turbine shell 28 of the turbine wheel 22 is non-movably (i.e., fixedly) secured to the flange 36 of the output hub 32 by the rivets 37 (best shown in FIG. 3) or by any other appropriate means, such as welding.

The torsional vibration damper 16 is then added. The torsional vibration damper 16 is assembled by placing the radially elastic member 52 between the first and second side plates $54_1$ and $54_2$ of the torque input member 50 and the first and second Belleville springs $82_1$ and $82_2$ on axially opposite sides of the core member 66 of the radially elastic member 52. Specifically, the first Belleville spring $82_1$ is mounted on the first radially innermost flange $55_1$ of the first side plates $54_1$ axially between the first side plate $54_1$ and the core member 66 of the radially elastic member 52, while the second Belleville spring $82_2$ is mounted on the second radially innermost flange $55_2$ of the second side plates $54_2$ axially between the second side plate $54_2$ and the core member 66 of the radially elastic member 52. Then, the first and second side plates $54_1$ and $54_2$ are non-movably (i.e., fixedly) secured (connected) to one another so that the outer mounting flanges $56_1$, $56_2$ of the first and second side plates $54_1$, $54_2$ axially engage one another and are fixed by the rivets 57 extending through holes in the outer mounting flanges $56_1$, $56_2$ of the first and second side plates $54_1$, $54_2$, as best shown in FIGS. 4, 7 and 8.

Next, the torsional vibration damper 16 is slidably mounted to the output hub 32 by axially sliding the splines 67 of the core member 66 of the radially elastic member 52 over the complementary splines 39 of the output hub 32 for directly and non-rotatably engaging the output hub 32 with the radially elastic member 52 of the torsional vibration damper 16.

Then, the locking piston 40 of the lock-up clutch 15 is provided as an integral part with the axially extending coupling lugs 48, made of a single or unitary (i.e., made as a single part) component, but may be made of separate components fixedly connected together. Next, the locking piston 40 is axially displaced toward the torque input member 50 of the torsional vibration damper 16 such that each of the coupling lugs 48 positively engages one of the notches 59n of the torque input member 50 so as to non-rotatably couple the locking piston 40 and the torque input member 50 while allowing an axial motion of the locking piston 40 with respect to the torque input member 50, as best shown in FIGS. 2-4 and 6. At the same time, the locking piston 40 is mounted to the output hub 32 so that the cylindrical rim 46 of the locking piston 40 is disposed in the annular groove 38 of the output hub 32, as shown in FIGS. 2-4.

Next, the first shell $17_1$ is non-moveably and sealingly secured to the second shell $17_2$ of the casing 12 through the intermediate portion $17_3$ and sealed together about their outer peripheries, such as by welds $19_1$ and $19_2$, as shown in FIGS. 2 and 4. After that, the hydrokinetic torque-coupling device 10 is mounted to the transmission input shaft so that the output hub 32 is splined directly to the transmission input shaft.

Various modifications, changes, and alterations may be practiced with the above-described embodiment, including but not limited to the additional embodiments shown in FIGS. 11-26. In the interest of brevity, reference characters in FIGS. 11-26 that are discussed above in connection with Figs. FIGS. 2-10 are not further elaborated upon below, except to the extent necessary or useful to explain the additional embodiments of FIGS. 11-26. Modified components and parts are indicated by the addition of a hundred digits to the reference numerals of the components or parts.

In a hydrokinetic torque-coupling device 110 of a second exemplary embodiment illustrated in FIGS. 11-17, the torsional vibration damper 16 is replaced by a torsional vibration damper 116. The hydrokinetic torque-coupling device 110 of FIGS. 11-17 corresponds substantially to the hydrokinetic torque-coupling device 10 of FIGS. 2-10, and the torsional vibration damper 116, which primarily differs, will therefore be explained in detail below.

The torsional vibration damper 116, as best shown in FIGS. 11-17, is interposed axially between the turbine shell 28 and the locking piston 40. The torsional vibration damper 116 comprises a torque input member 150 rotatable about the rotational axis X, and an integral radially elastic member 52 elastically coupled to and rotatable relative to the torque input member 150 around the rotational axis X, as best shown in FIGS. 11-13 and 17.

Figure 12:
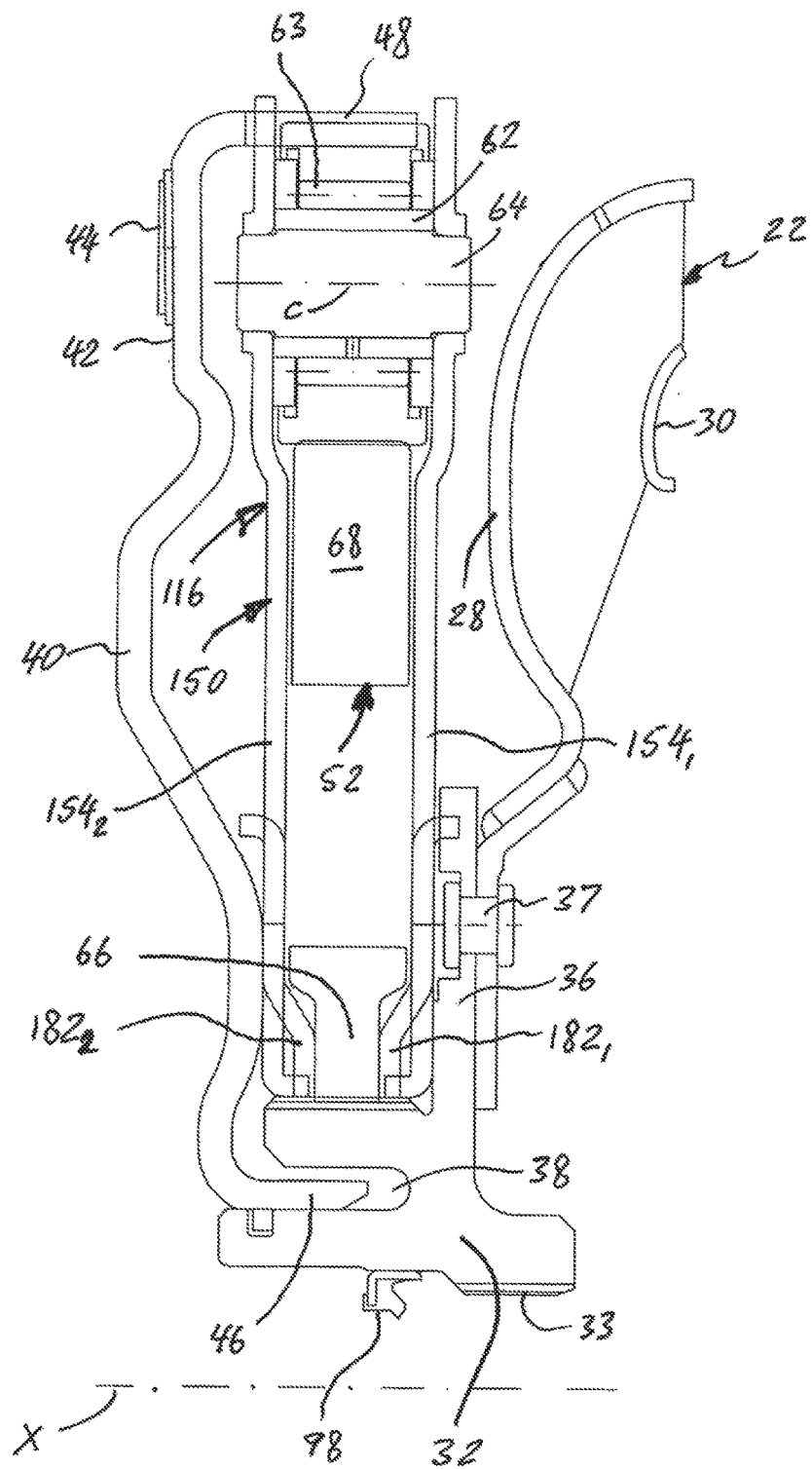
FIG. 12 is fragmented partial half-view in axial section of the hydrokinetic torque-coupling device showing a locking piston and the torsional vibration damper in accordance with the second exemplary embodiment of the present invention.

The torque input member 150 includes two axially opposite annular, radially oriented side plates, including a first annular, radially oriented side plate $154_1$ adjacent to the turbine shell 28, and a second annular, radially oriented side plate $154_2$ adjacent to the locking piston 40. The first side plate $154_1$ is substantially parallel to and axially spaced from the second side plate $154_2$, as best shown in FIG. 12. Moreover, the first and second side plates $154_1$ and $154_2$, respectively, are non-moveably attached (i.e., fixed) to one another, such as by fasteners 57. Also, the first side plate $154_1$ is substantially identical to the second side plate $154_2$, as best shown in FIGS. 12 and 17.

Figure 13:
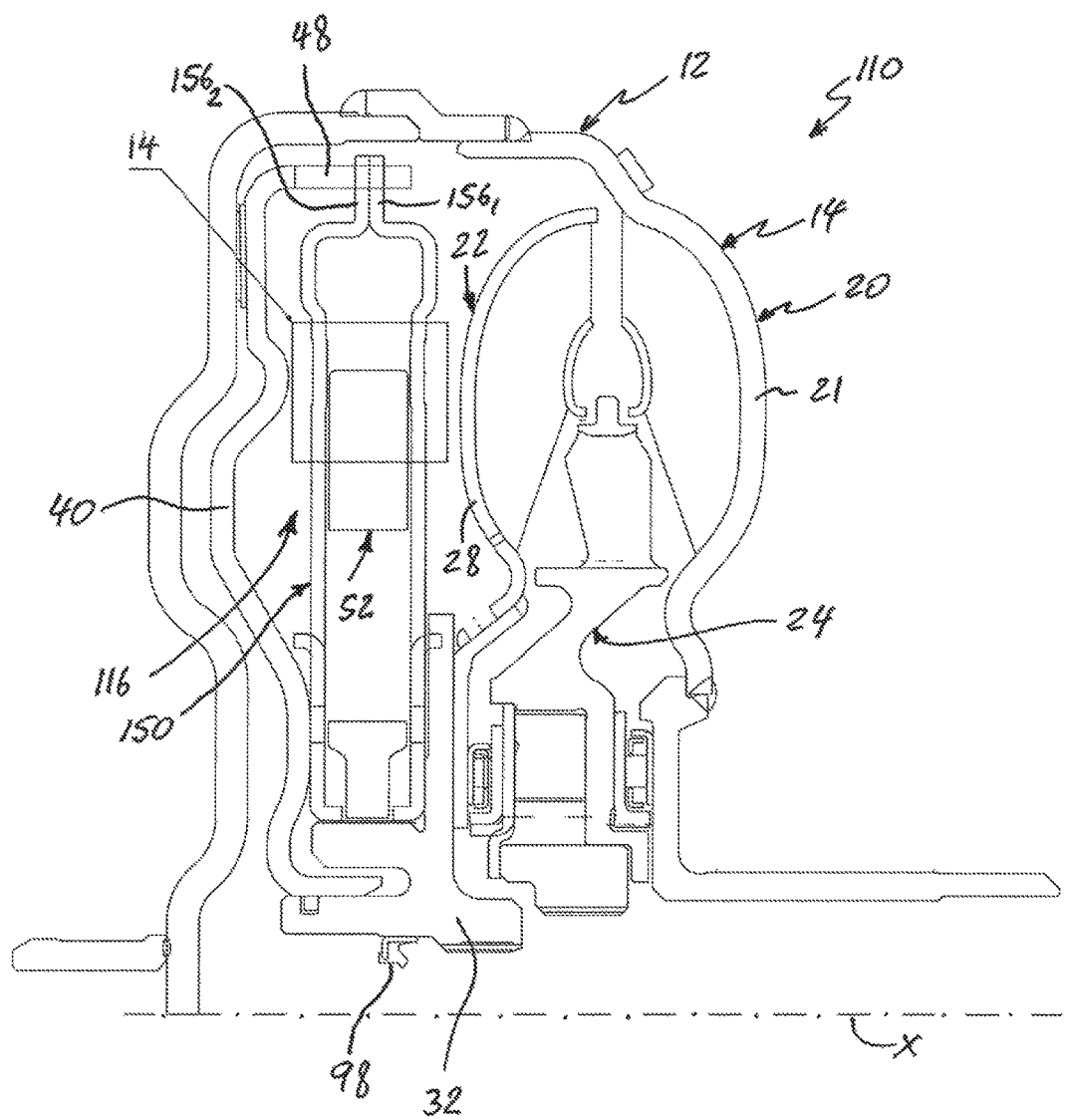
FIG. 13 is an alternative fragmented half-view in axial section of the hydrokinetic torque-coupling device with the torsional vibration damper in accordance with the second exemplary embodiment of the present invention.
Figure 14:
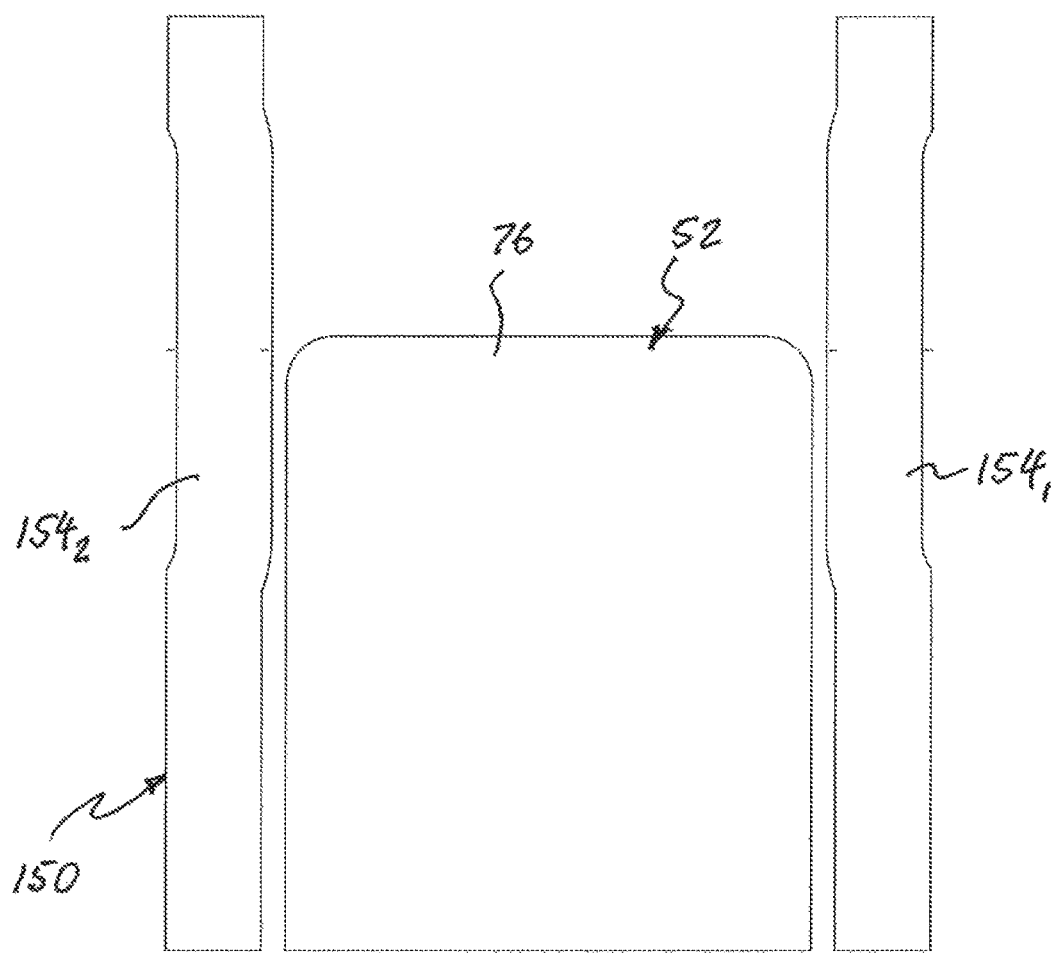
FIG. 14 is an enlarged view of a fragment of the torsional vibration damper shown in the rectangle "14" of FIG. 13.
Figure 15:
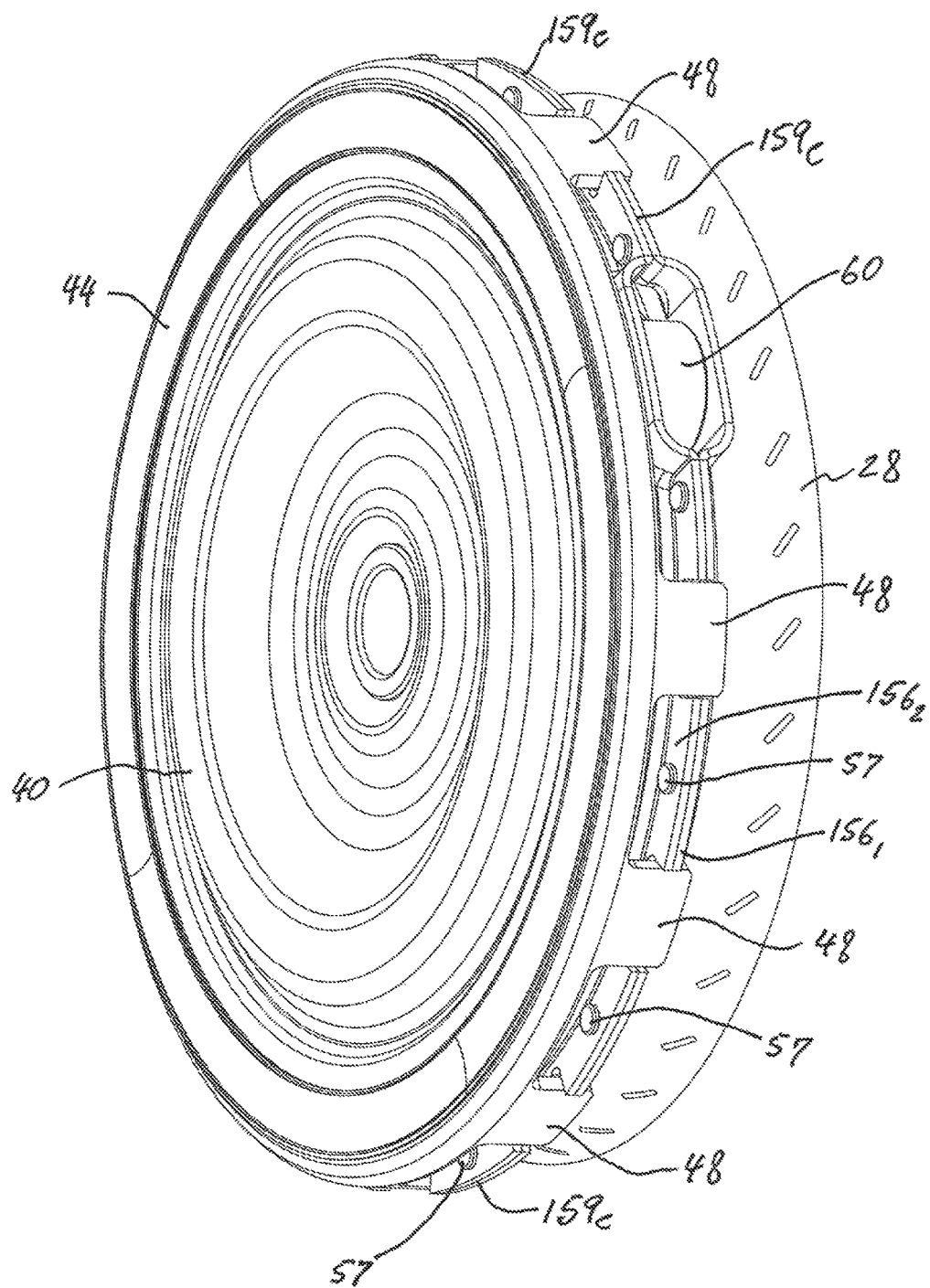
FIG. 15 is a partial perspective view of the hydrokinetic torque-coupling device showing the locking piston and the torsional vibration damper in accordance with the second exemplary embodiment of the present invention.
Figure 16:
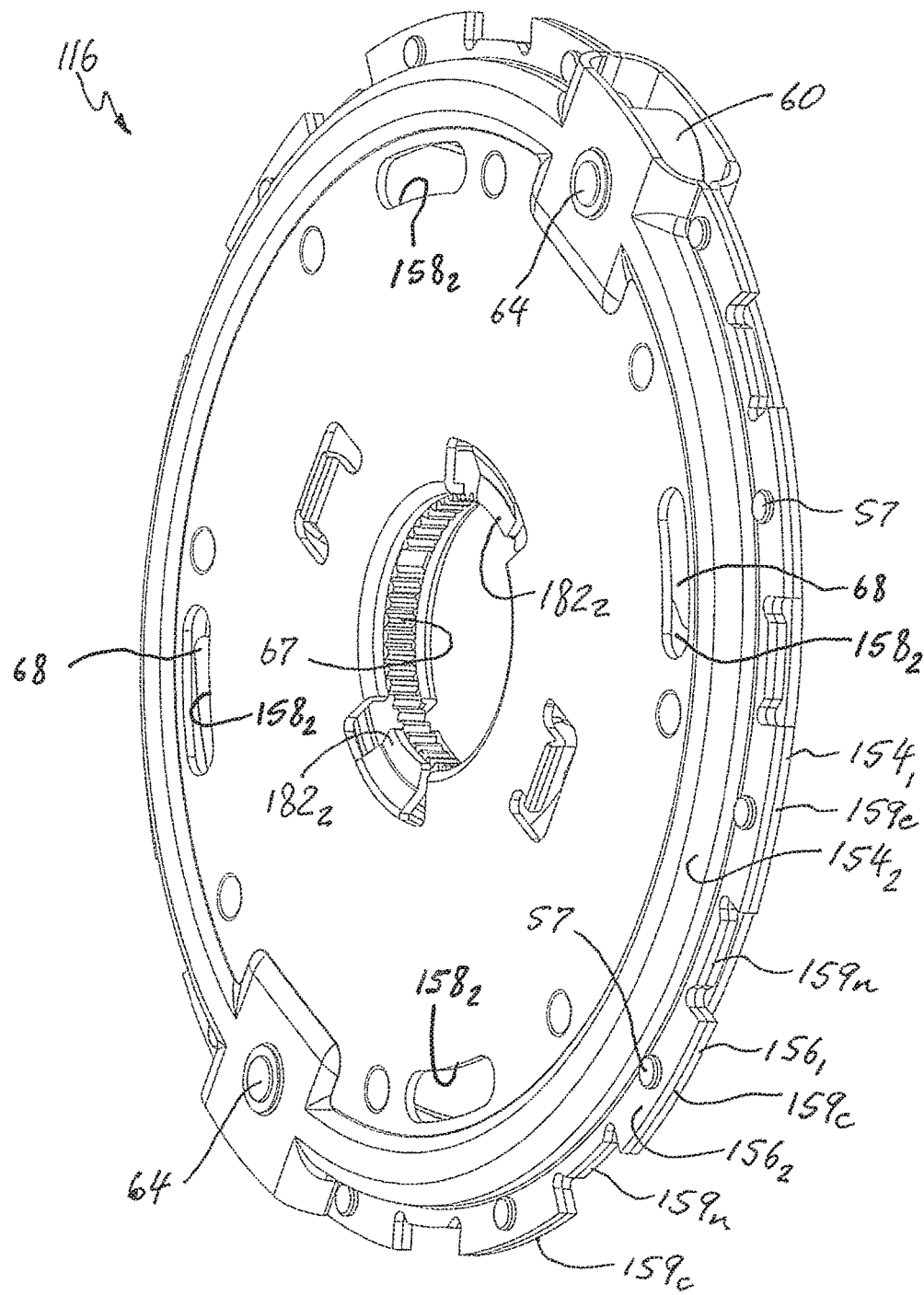
FIG. 16 is a perspective view of the torsional vibration damper in accordance with the second exemplary embodiment of the present invention.

According to the second exemplary embodiment of the present invention as best illustrated in FIGS. 11-17, the first side plate $154_1$ has a substantially annular outer mounting flange $156_1$ provided with a plurality of circumferentially spaced holes. The second side plate $154_2$, on the other hand, has a substantially annular outer mounting flange $156_2$ provided with a plurality of circumferentially spaced holes. The first and second side plates $154_1$ and $154_2$ are non-movably (i.e., fixedly) secured to one another so that the outer mounting flanges $156_1$, $156_2$ of the first and second side plates $154_1$, $154_2$ axially engage one another and are fixed by rivets 57 extending through the holes in the outer mounting flanges $156_1$, $156_2$ of the first and second damper side plates $154_1$, $154_2$, as best shown in FIGS. 15 and 16. Thus, the first and second side plates $154_1$, $154_2$ are non-rotatable relative to one another, but rotatable relative to the radially elastic output member 42.

The torsional vibration damper 116 according to the second exemplary embodiment, further comprises at least one first axially resilient (or resiliently deformable) member $182_1$ and at least second axially resilient (or resiliently deformable) $182_2$, respectively. Specifically, the first side plate $154_1$ includes at least one, preferably two first axially resilient members $182_1$ extending axially inwardly toward the radially elastic member 52 and the axially opposite second side plate $154_2$. Similarly, the second side plate $154_2$ includes at least one, preferably two second axially resilient members $182_2$ extending axially inwardly toward the radially elastic member 52 and the axially opposite first side plate $154_1$. The first side plate $154_1$ with the first resilient members $182_1$ is preferably an integral part or a unitary component (e.g., made as a single part), but may be made of separate components fixedly connected together, as best shown in FIG. 17. Similarly, the second side plate $154_2$ with the second resilient members $182_2$ is preferably an integral part or a unitary component (e.g., made as a single part), but may be made of separate components fixedly connected together, as best shown in FIG. 17. Each of the two first resilient members $182_1$ is diametrically opposite to one another, and integrally formed with the first side plate $154_1$. Similarly, each of the two second axially resilient members $182_2$ is diametrically opposite to one another and integrally formed with the second side plate $154_2$.

Figure 17:
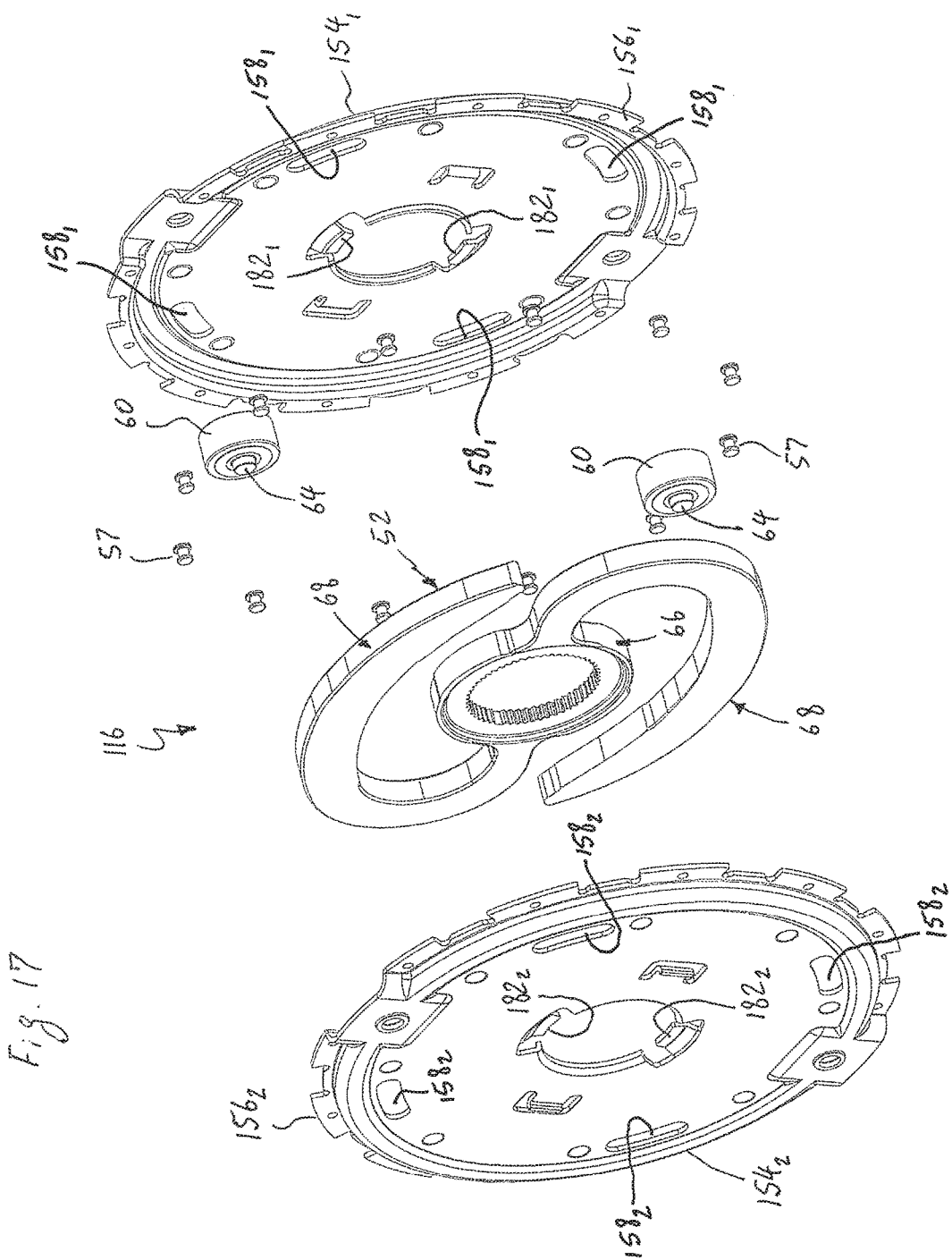
FIG. 17 is an exploded assembly view of the torsional vibration damper in accordance with the second exemplary embodiment of the present invention.

As best shown in FIGS. 12 and 17, each of the first resilient members $182_1$ is disposed and compressed axially between the first side plate $154_1$ and the core member 66 of the radially elastic member 52 for biasing the radially elastic member 52 away from one of the first side plate $154_1$. Similarly, each of the second axially resilient members $182_2$ is disposed and compressed axially between the second side plate $154_2$ and the core member 66 of the radially elastic member 52 for biasing the radially elastic member 52 away from one of the second side plate $154_2$. In other words, the radially elastic member 52 is elastically clamped in axial direction between at least two axially resilient members $182_1$ and $182_2$. As a result, as best shown in FIG. 14, the radially elastic member 52 is disposed centrally (i.e., in the middle) between the first and second side plates $154_1$ and $154_2$ of the torque input member 150, such that axially opposite outer surfaces of the radially elastic member 52 are axially equidistantly spaced from the first and second side plates $154_1$ and $154_2$ of the torque input member 150.

The first and second axially resilient members $182_1$ and $182_2$, which are disposed between the first and second side plates $154_1$ and $154_2$ of the torque input member 50 on axially opposite sides of the core member 66 of the radially elastic member 52, prevent or significantly reduce axial vibration of the radially elastic member 52 during torque transmitting in the lockup position of the lock-up clutch 15.

According to the second exemplary embodiment of the present invention, as best shown in FIGS. 12 and 17, each of the first and second axially resilient members $182_1$ and $182_2$ is in the form of an axially resilient tongue extending both radially and axially from the first and second side plates $154_1$, $154_2$. As further illustrated in FIGS. 11 and 12, the first and second axially resilient tongues $182_1$ and $182_2$ are disposed on axially opposite sides of the core member 66 of the radially elastic member 52, and are formed unitary with the first and second side plates $154_1$ and $154_2$, respectively. Therefore, the radially elastic member 52 is elastically clamped in axial direction between the two pairs of the axially resilient tongues $182_1$ and $182_2$.

At least one, preferably both the first and second side plates $154_1$ and $154_2$ of the torsional vibration damper 116 are formed with at least one, preferably a plurality of viewing windows $158_1$ and $158_2$ therethrough, as best shown in FIGS. 16 and 17. In the second exemplary embodiment of the present invention, the first side plate $154_1$ of the torsional vibration damper 116 is formed with four (4) viewing windows $158_1$ therethrough, which are circumferentially spaced from each other around the rotational axis X, as best shown in FIG. 17. Similarly, the second side plate $154_2$ of the torsional vibration damper 116 is formed with four (4) viewing windows $158_2$ therethrough, which are circumferentially spaced from each other around the rotational axis X, as best shown in FIGS. 16 and 17. As best shown in FIG. 16, the viewing windows $158_1$ and $158_2$ allow an interior space between the first and second side plates $154_1$ and $154_2$ of the torsional vibration damper 116 to be observed.

As further illustrated in FIGS. 11-13 and 15, the lock-up clutch 15 is configured to non-rotatably couple the casing 12 and the torque input member 150 in the engaged (locked) position, and configured to drivingly disengage the casing 12 and the torque input member 150 in the disengaged (open) position. The locking piston 40 comprises at least one, preferably a plurality of coupling lugs 48 axially extending from a radially outer peripheral end $41_1$ thereof toward the torque input member 150 and the turbine shell 28. The locking piston 40 with the axially extending coupling lugs 48 is preferably an integral part, e.g., made of a single or unitary (i.e., made as a single part) component, but may be made of separate components fixedly connected together.

The torque input member 150, on the other hand, includes at least one, and preferably a plurality of notches (or recesses) 159n each complementary to one of the coupling lugs 48. Specifically, the notches 159n are provided in the outer mounting flanges $156_1$, $156_2$ of the first and second side plates $154_1$, $154_2$, as best shown in FIGS. 15 and 16. The notches 159n are separated from each other by radially outwardly extending cogs (or teeth) 159c. Each of the coupling lugs 48 of the locking piston 40 positively engages one of the notches 159n so as to non-rotatably couple the locking piston 40 and the torque input member 150 while allowing axial motion of the locking piston 40 with respect to the torque input member 150, as best shown in FIG. 15.

The cylindrical flange 46 of the locking piston 40 is mounted to the output hub 32 so as to be centered, rotatable and axially slidably displaceable relative to the output hub 32. The locking piston 40 is also axially slidably displaceable relative to the torque input member 150 of the torsional vibration damper 116. The axial displacement of the locking piston 40 along the output hub 32 is controlled by the pressure chambers $23_1$, $23_2$ positioned on axially opposite sides of the locking piston 40.

In operation, when the lock-up clutch 15 is in the disengaged position (non-lockup mode), the engine torque is transmitted from the impeller wheel 20 to the output hub 32 by the turbine wheel 22 of the torque converter 14, thus bypassing the torsional vibration damper 116. When the lock-up clutch 15 is in the engaged (locked) position (i.e., when the locking piston 40 is engaged (or locked) against the locking surface 18 of the casing 12 by action of the hydraulic pressure), the engine torque is transmitted by the casing 12 to the output hub 32 through the torsional vibration damper 116. Specifically, the engine torque is transmitted from the casing 12 to the locking piston 40, then from the locking piston 40 to the torque input member 150, next from the torque input member 150 to the output hub 32 through the elastic output member 52, and then from the output hub 32 directly to the driven shaft.

A method for assembling the hydrokinetic torque-coupling device 110 is as follows. It should be understood that this exemplary method may be practiced in connection with the other embodiments described herein. This exemplary method is not the exclusive method for assembling the turbine assembly described herein. While the methods for assembling the hydrokinetic torque-coupling device 110 may be practiced by sequentially performing the steps as set forth below, it should be understood that the methods may involve performing the steps in different sequences.

First, the impeller wheel 20, the turbine wheel 22, the stator 24, and the damper assembly 16 may each be preassembled. The impeller wheel 20 and the turbine wheel 22 are formed by stamping from steel blanks or by injection molding of a polymeric material. The stator 24 is made by casting from aluminum or injection molding of a polymeric material. The impeller wheel 20, the turbine wheel 22 and the stator 24 subassemblies are assembled together so as to form the torque converter 14. Next, the turbine shell 28 of the turbine wheel 22 is non-movably (i.e., fixedly) secured to the flange 36 of the output hub 32 by the rivets 37 (best shown in FIG. 3) or by any other appropriate means, such as welding.

The torsional vibration damper 116 is then added. First, each of the first and second side plates 154$_1$ and 154$_2$ of the torque input member 150 is provided with at least one, preferably two first and second axially resilient members 182$_1$ and 182$_2$, respectively. Preferably, the first and second axially resilient members 182$_1$ and 182$_2$ are formed unitary (i.e., made as a single part) with the first and second side plates 154$_1$ and 154$_2$, respectively. The torsional vibration damper 116 is assembled by placing the radially elastic member 52 between the first and second side plates 154$_1$ and 154$_2$ of the torque input member 150. Specifically, the first axially resilient members 182$_1$ resiliently engage the core member 66 of the radially elastic member 52 so as to bias the radially elastic member 52 in the direction away from one of the first side plate 154$_1$, while the second axially resilient members 182$_2$ resiliently engage the core member 66 of the radially elastic member 52 so as to bias the radially elastic member 52 in the direction away from one of the second side plate 154$_2$. In other words, the first and second axially resilient members 182$_1$ and 182$_2$ engage axially opposite sides of the core member 66 of the radially elastic member 52.

Next, the first and second side plates 154$_1$ and 154$_2$ are non-movably (i.e., fixedly) secured to one another so that the outer mounting flanges 156$_1$, 156$_2$ of the first and second side plates 154$_1$, 154$_2$ axially engage one another and are fixed by the rivets 57 extending through holes in the outer mounting flanges 156$_1$, 156$_2$ of the first and second side plates 154$_1$, 154$_2$, as best shown in FIGS. 15-17. Then, the torsional vibration damper 116 is slidably mounted to the output hub 32 by axially sliding the splines 67 of the core member 66 of the radially elastic member 52 over the complementary splines 39 of the output hub 32 for directly and non-rotatably engaging the output hub 32 with the radially elastic member 52 of the torsional vibration damper 116.

Figure 11:
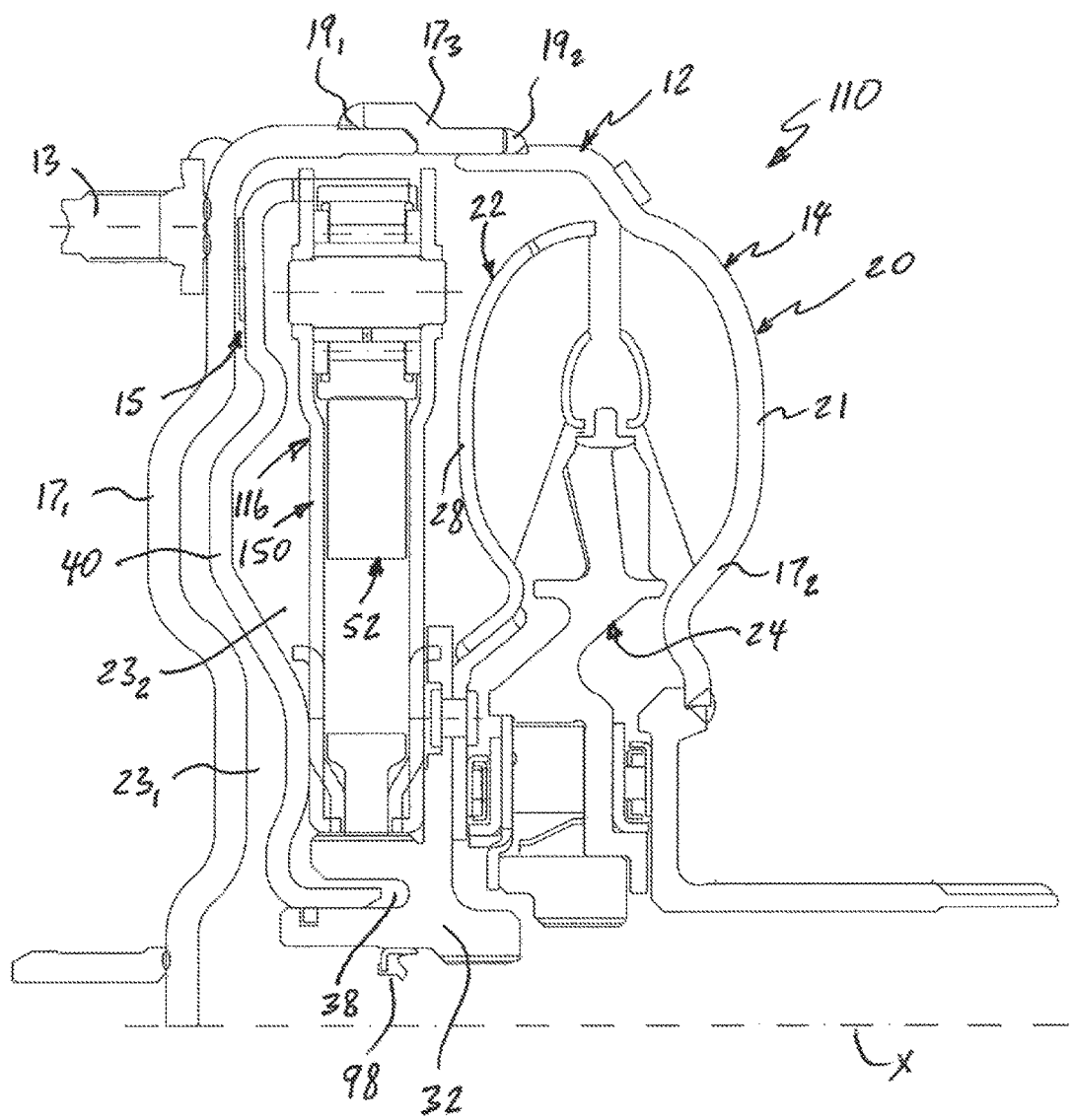
FIG. 11 is a fragmented half-view in axial section of a hydrokinetic torque-coupling device with a torsional vibration damper in accordance with a second exemplary embodiment of the present invention.

Then, the locking piston 40 of the lock-up clutch 15 is provided as an integral part with the axially extending coupling lugs 48, made of a single or unitary (i.e., made as a single part) component, but may be made of separate components fixedly connected together. Next, the locking piston 40 is axially displaced toward the torque input member 150 of the torsional vibration damper 116 such that each of the coupling lugs 48 positively engages one of the notches 159*n* of the torque input member 150 so as to non-rotatably couple the locking piston 40 and the torque input member 150 while allowing an axial motion of the locking piston 40 with respect to the torque input member 150, as best shown in FIGS. 11-13 and 15. At the same time, the locking piston 40 is mounted to the output hub 32 so that the cylindrical rim 46 of the locking piston 40 is disposed in the annular groove 38 of the output hub 32, as shown in FIGS. 11-13.

Next, the first shell 17$_1$ is non-moveably and sealingly secured to the second shell 17$_2$ of the casing 12 through the intermediate portion 17$_3$ and sealed together about their outer peripheries, such as by welds 19$_1$ and 19$_2$, as shown in FIGS. 11 and 13. After that, the hydrokinetic torque-coupling device 110 is mounted to the transmission input shaft so that the output hub 32 is splined directly to the transmission input shaft.

In a hydrokinetic torque-coupling device 210 of a third exemplary embodiment illustrated in FIGS. 18-24, the torsional vibration damper 16 is replaced by a torsional vibration damper 216. The hydrokinetic torque-coupling device 210 of FIGS. 18-24 corresponds substantially to the hydrokinetic torque-coupling device 10 of FIGS. 2-10, and the torsional vibration damper 216, which primarily differs, will therefore be explained in detail below.

Figure 18:
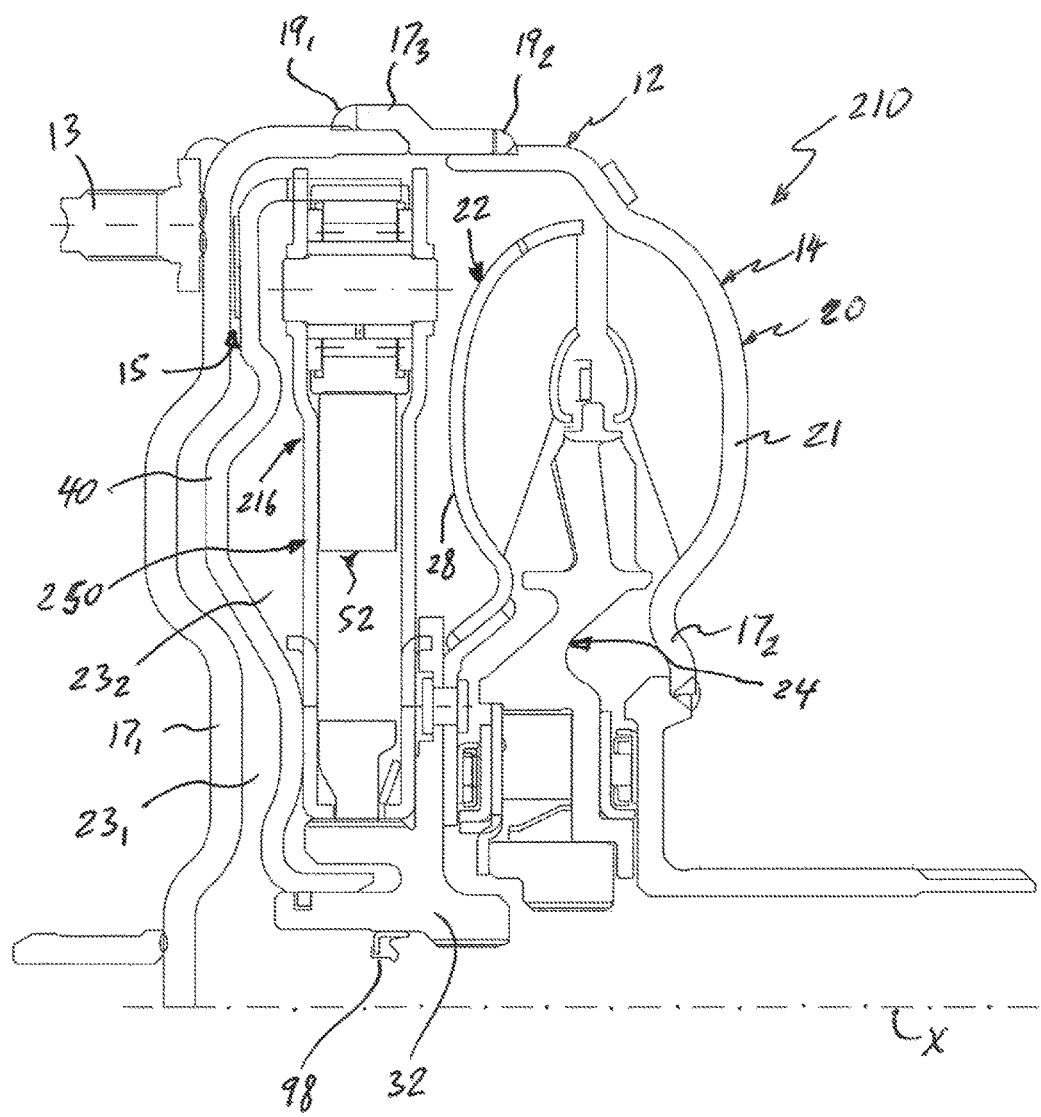
FIG. 18 is a fragmented half-view in axial section of a hydrokinetic torque-coupling device with a torsional vibration damper in accordance with a third exemplary embodiment of the present invention.
Figure 19:
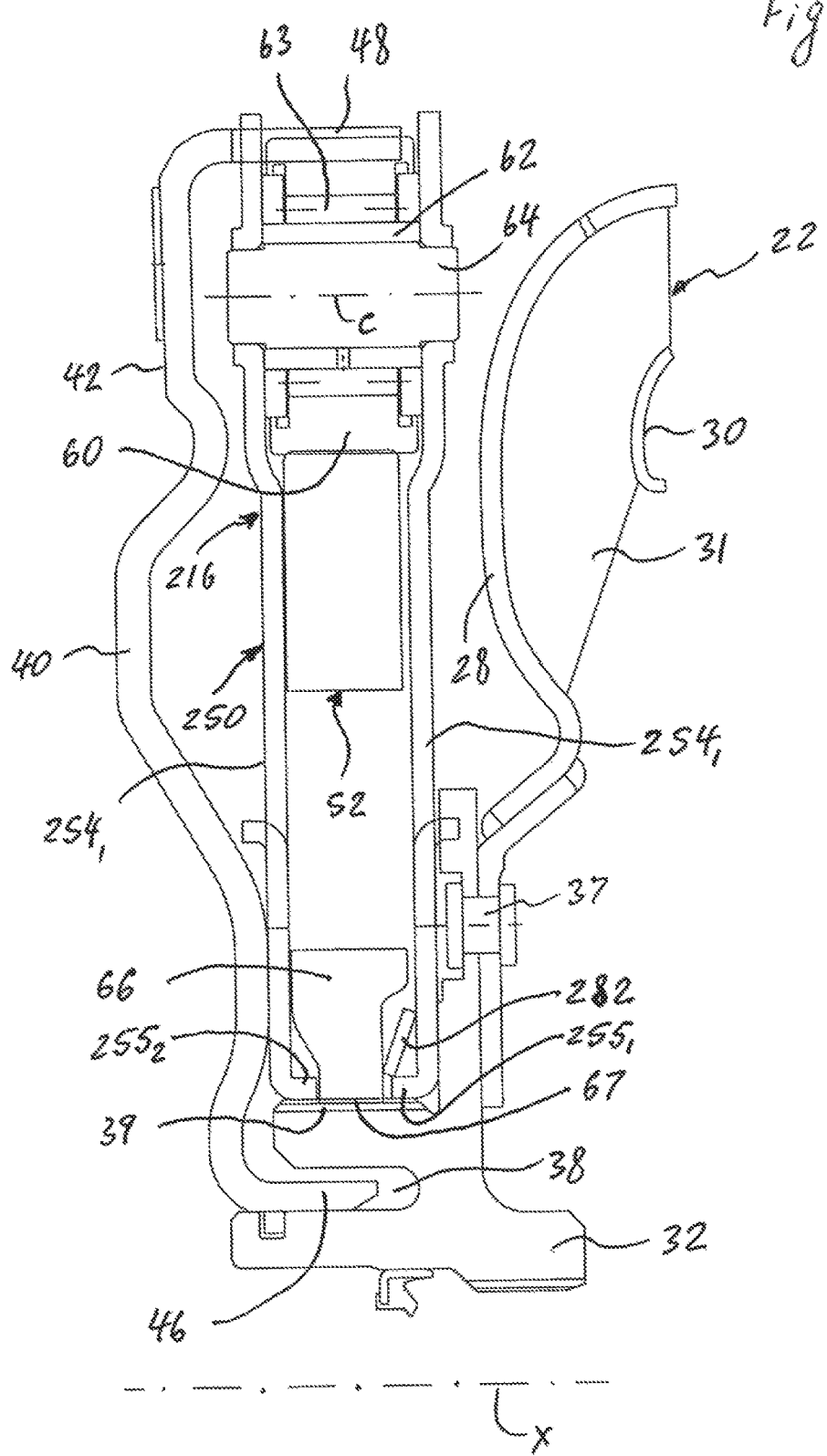
FIG. 19 is fragmented partial half-view in axial section of the hydrokinetic torque-coupling device showing a locking piston and the torsional vibration damper in accordance with the second exemplary embodiment of the present invention.
Figure 21:
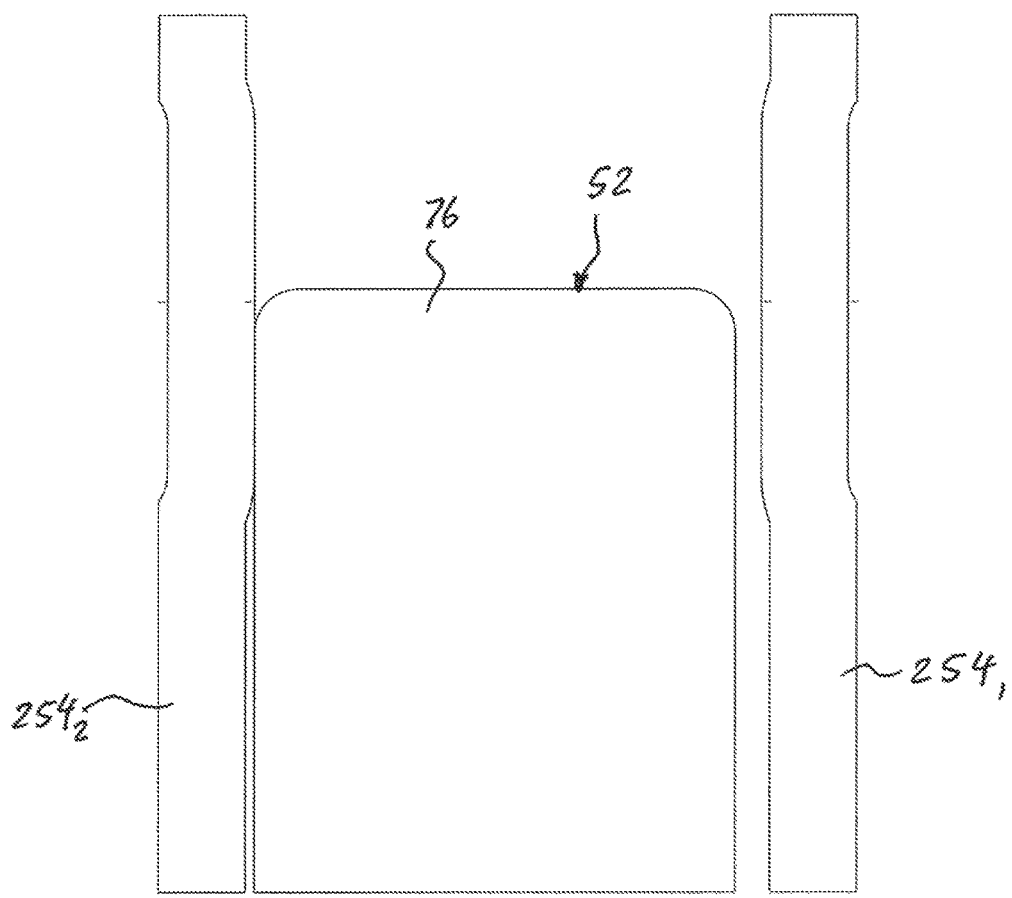
FIG. 21 is an enlarged view of a fragment of the torsional vibration damper shown in the rectangle "21" of FIG. 20.
Figure 22:
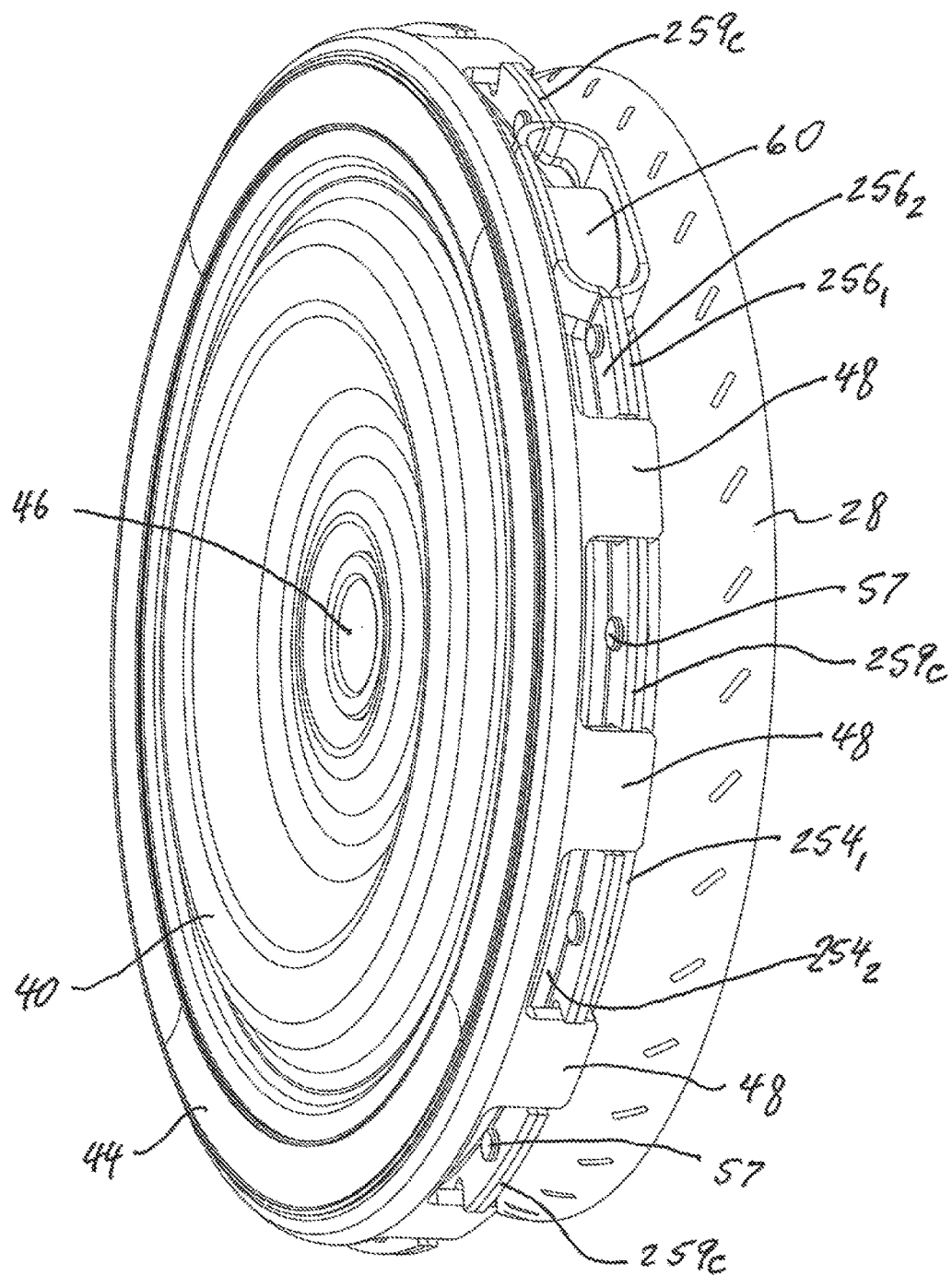
FIG. 22 is a partial perspective view of the hydrokinetic torque-coupling device showing the locking piston and the torsional vibration damper in accordance with the third exemplary embodiment of the present invention.
Figure 23:
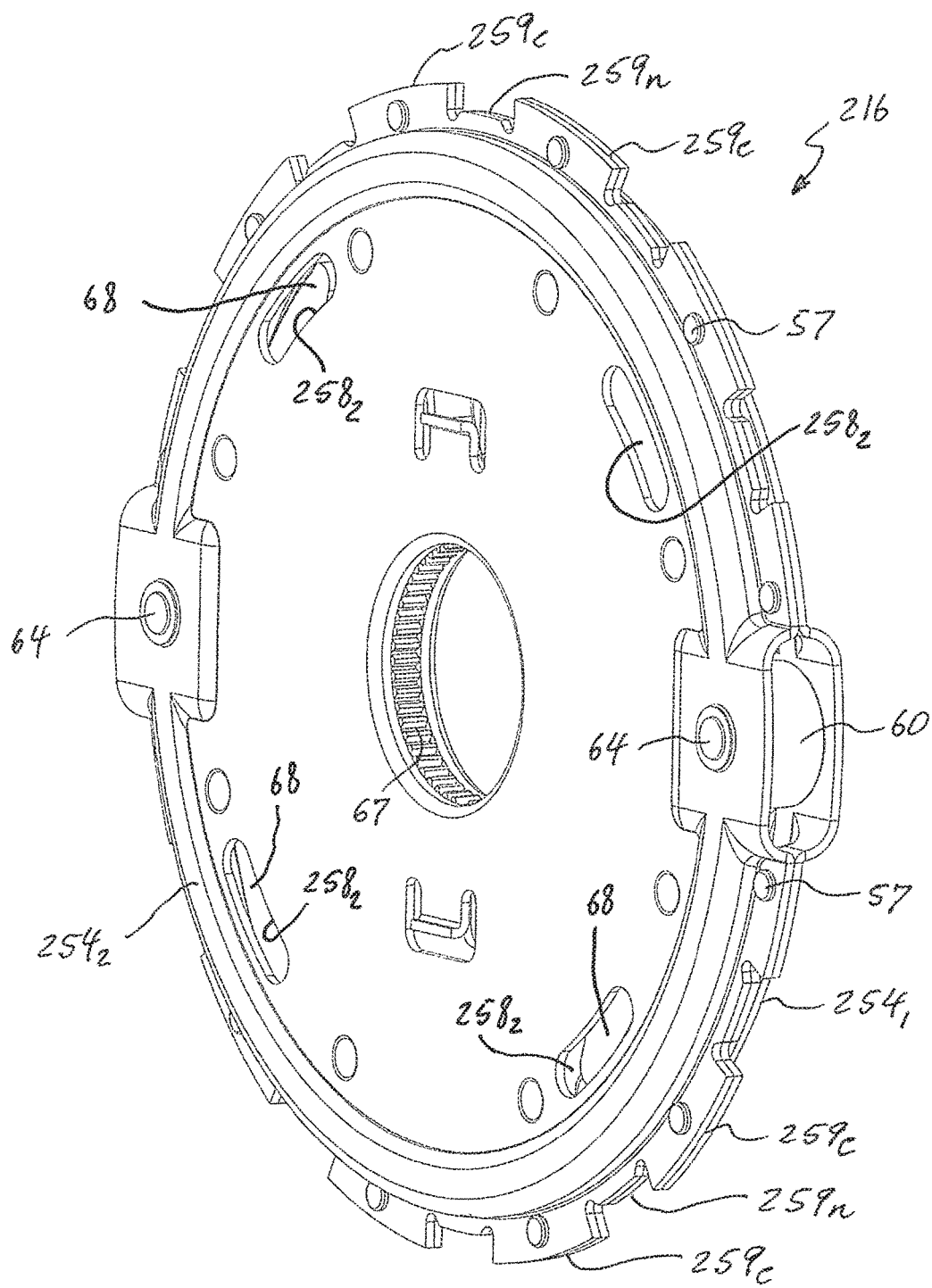
FIG. 23 is a perspective view of the torsional vibration damper in accordance with the third exemplary embodiment of the present invention.
Figure 24:
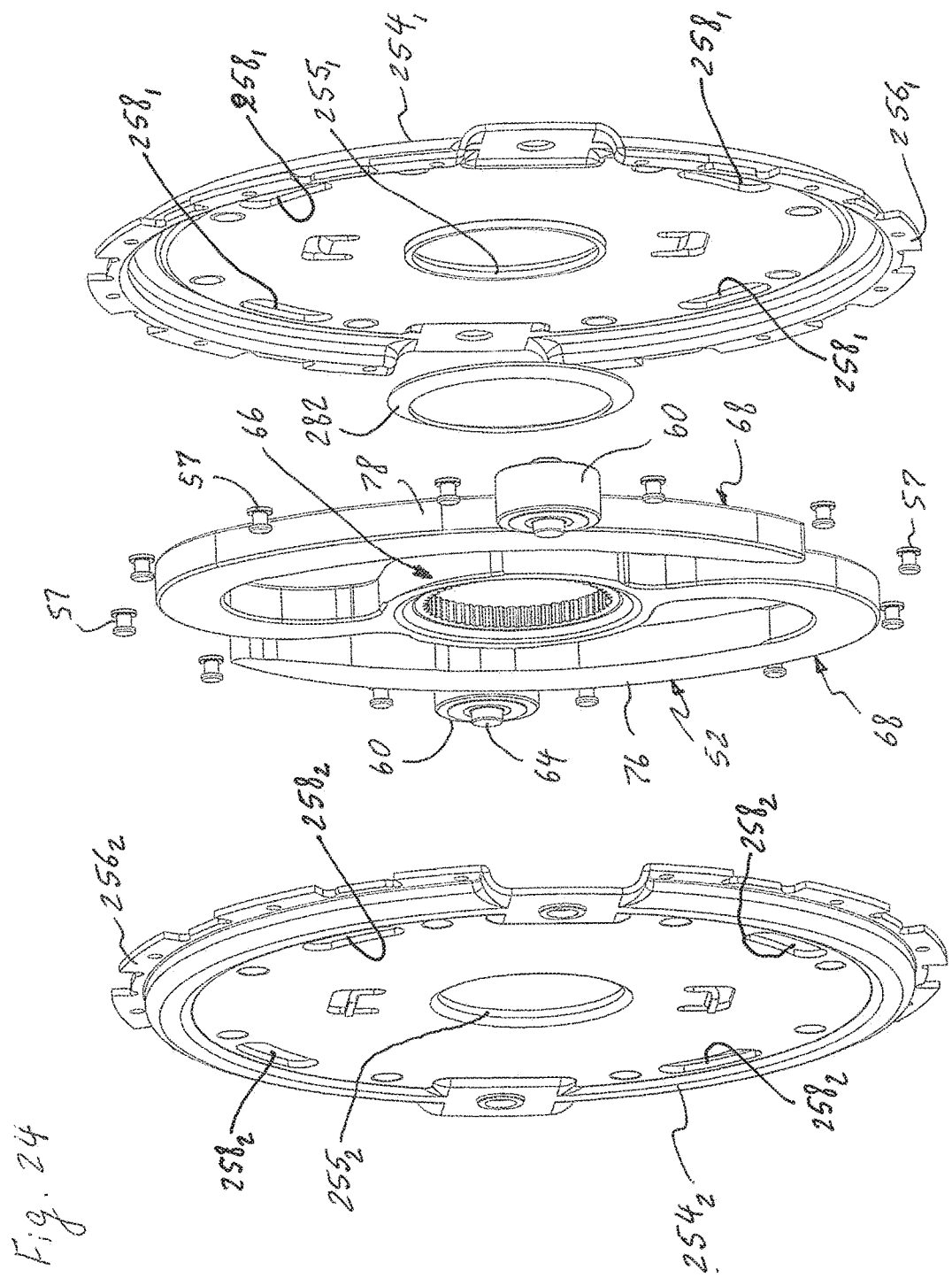
FIG. 24 is an exploded assembly view of the torsional vibration damper in accordance with the third exemplary embodiment of the present invention.

The torsional vibration damper 216, as best shown in FIGS. 18-24, is interposed axially between the turbine shell 28 and the locking piston 40. The torsional vibration damper 216 comprises a torque input member 250 rotatable about the rotational axis X, and an integral radially elastic member 52 elastically coupled to and rotatable relative to the torque input member 250 around the rotational axis X, as best shown in FIGS. 18-20 and 24. The torque input member 250 is substantially similar to the torque input member 50 according to the first exemplary embodiment and includes two axially opposite annular, radially oriented side plates, including a first annular, radially oriented side plate 254$_1$ adjacent to the turbine shell 28, and a second annular, radially oriented side plate 254$_2$ adjacent to the locking piston 40. The first side plate 254$_1$ is substantially parallel to and axially spaced from the second side plate 254$_2$, as best shown in FIG. 19. Moreover, the first and second side plates 254$_1$ and 254$_2$, respectively, are non-moveably attached (i.e., fixed) to one another, such as by mechanical fasteners 57, extending through holes in outer mounting flanges 256$_1$, 256$_2$ of the first and second damper side plates 254$_1$, 254$_2$, respectively, as best shown in FIGS. 23 and 24. Also, the first side plate 254$_1$ is substantially identical to the second side plate 254$_2$, as best shown in FIGS. 19 and 24. First and second radially innermost flanges 255$_1$ and 255$_2$ of the first and second side plates 254$_1$ and 254$_2$ extend axially inwardly toward the core member 66 of the radially elastic member 52, as best shown in FIGS. 19 and 24.

At least one, preferably both the first and second side plates 254$_1$ and 254$_2$ of the torsional vibration damper 216 are formed with at least one, preferably a plurality of viewing windows 258$_1$ and 258$_2$ therethrough, as best shown in FIGS. 23 and 24. In the third exemplary embodiment of the present invention, the first side plate 254$_1$ of the torsional vibration damper 216 is formed with four (4) viewing windows 258$_1$ therethrough, which are circumferentially spaced from each other around the rotational axis X, as best shown in FIG. 24. Similarly, the second side plate 254$_2$ of the torsional vibration damper 216 is formed with four (4) viewing windows 258$_2$ therethrough, which are circumferentially spaced from each other around the rotational axis X, as best shown in FIGS. 23 and 24. As best shown in FIG. 23, the viewing windows 258$_1$ and 258$_2$ allow an interior space between the first and second side plates 254$_1$ and 254$_2$ of the torsional vibration damper 216 to be observed.

As further illustrated in FIGS. 18-20 and 22, the torque input member 250 (i.e., the first and second side plates 254$_1$, 254$_2$) is non-rotatably coupled to the locking piston 40 of the lock-up clutch 15. The first and second side plates 254$_1$, 254$_2$ are arranged axially on either side of the radially elastic member 52 and are operatively connected therewith. As described above, the first and second side plates 254$_1$, 254$_2$ are non-movably (i.e., fixedly) secured to one another by appropriate means, such as by the fasteners 57 so as to be rotatable relative to the radially elastic member 52.

The torque input member 250 further includes at least one, preferably two supporting members 60. In the exemplary embodiment, the supporting members 60 are in the form of annular rolling bodies, such as cylindrical rollers, rotatably mounted to a radially external periphery of the first side plate $254_1$ and the second side plate $254_2$, axially between the first and second side plates $254_1$ and $254_2$, respectively. Each of the rolling bodies 60 is rotatable around a central axis C. The central axis C of each rolling body 60 is substantially parallel to the rotational axis X, as best shown in FIGS. 18 and 19.

The rolling bodies 60 are positioned so as to be diametrically opposite to one another. More specifically, the rolling bodies 60 are rotatably mounted about hollow shafts 62, which axially extend between the first and second retainer plates $254_1$ and $254_2$. The hollow shafts 62 are mounted on support pins 64 extending axially through the hollow shafts 62, and between and through the first and second side plates $254_1$ and $254_2$, as best shown in FIGS. 18, 19 and 23. The rolling bodies 60 are rotatably mounted on the hollow shafts 62 through rolling bearings, such as needle bearings 63. In other words, the rolling bodies 60 are rotatable around the central axes C thereof, while the support pins 64 are non-rotatable relative to the first and second side plates $254_1$ and $254_2$ of the torque input member 250 around the rotational axis X.

The torsional vibration damper 216 according to the third exemplary embodiment, further comprises a single, axially resilient (or elastic) member 282. As best shown in FIGS. 19 and 24, the resilient member 282 is disposed and compressed axially between the first side plate $254_1$ and the core member 66 of the radially elastic member 52 for biasing the radially elastic member 52 away from the first side plate $254_1$ toward the second side plate $254_2$. In other words, the radially elastic member 52 is elastically clamped in axial direction between the second side plate $254_2$ and the resilient member 282. As a result, as best shown in FIG. 21, the radially elastic member 52 is axially spaced from the first side plate $254_1$ and directly engages (i.e., is in direct contact with) the second side plate $254_2$ of the torque input member 250.

The axially resilient member 282 disposed axially between the first side plate $254_1$ of the torque input member 250 and the core member 66 of the radially elastic member 52, prevents or significantly reduces axial vibration of the radially elastic member 52 during torque transmitting in the lockup position of the lock-up clutch 15.

According to the third exemplary embodiment of the present invention, the axially resilient member 282 is an annular axially resilient spring formed separate from both the first side plate $254_1$ of the torque input member 250 and the radially elastic member 52. Preferably, the axially resilient spring 282 is in the form of a Belleville spring, as best shown in FIGS. 19 and 24. As further illustrated in FIGS. 19 and 24, the Belleville spring 282 is disposed on an axial side of the core member 66 of the radially elastic member 52 facing the first side plate $254_1$, and is mounted on the first radially innermost flange $255_1$ of the first side plate $254_1$. Therefore, the radially elastic member 52 is elastically clamped in axial direction between the Belleville spring 282 and the second side plate $254_2$.

As further illustrated in FIGS. 18-20 and 22, the lock-up clutch 15 is configured to non-rotatably couple the casing 12 and the torque input member 250 in the engaged (locked) position, and configured to drivingly disengage the casing 12 and the torque input member 250 in the disengaged (open) position. The locking piston 40 comprises at least one, preferably a plurality of coupling lugs 48 axially extending from a radially outer peripheral end $41_1$ thereof toward the torque input member 150 and the turbine shell 28. The locking piston 40 with the axially extending coupling lugs 48 is preferably an integral part, e.g., made of a single or unitary (i.e., made as a single part) component, but may be made of separate components fixedly connected together.

The torque input member 250, on the other hand, includes at least one, and preferably a plurality of notches (or recesses) 259n each complementary to one of the coupling lugs 48. Specifically, the notches 259n are provided in the outer mounting flanges $256_1$, $256_2$ of the first and second side plates $254_1$, $254_2$, as best shown in FIGS. 22 and 23. The notches 259n are separated from each other by radially outwardly extending cogs (or teeth) 259c. Each of the coupling lugs 48 of the locking piston 40 positively engages one of the notches 259n so as to non-rotatably couple the locking piston 40 and the torque input member 250 while allowing axial motion of the locking piston 40 with respect to the torque input member 250, as best shown in FIG. 22.

A method for assembling the hydrokinetic torque-coupling device 210 is as follows. It should be understood that this exemplary method may be practiced in connection with the other embodiments described herein. This exemplary method is not the exclusive method for assembling the turbine assembly described herein. While the methods for assembling the hydrokinetic torque-coupling device 210 may be practiced by sequentially performing the steps as set forth below, it should be understood that the methods may involve performing the steps in different sequences.

First, the impeller wheel 20, the turbine wheel 22, the stator 24, and the damper assembly 16 may each be preassembled. The impeller wheel 20 and the turbine wheel 22 are formed by stamping from steel blanks or by injection molding of a polymeric material. The stator 24 is made by casting from aluminum or injection molding of a polymeric material. The impeller wheel 20, the turbine wheel 22 and the stator 24 subassemblies are assembled together so as to form the torque converter 14. Next, the turbine shell 28 of the turbine wheel 22 is non-movably (i.e., fixedly) secured to the flange 36 of the output hub 32 by the rivets 37 (best shown in FIG. 3) or by any other appropriate means, such as welding.

The torsional vibration damper 216 is then added. The torsional vibration damper 216 is assembled by placing the radially elastic member 52 between the first and second side plates $254_1$ and $254_2$ of the torque input member 250. Specifically, the radially elastic member 52 is placed between the first side plate $254_1$ and the Belleville spring 282 so that the Belleville spring 282 engages one of an axially opposite side of the core member 66 of the radially elastic member 52. Moreover, the Belleville spring 282 is mounted on the first radially innermost flange $255_1$ of the first side plates $254_1$ axially between the first side plate $254_1$ and the core member 66 of the radially elastic member 52. Then, the first and second side plates $254_1$ and $254_2$ are non-movably (i.e., fixedly) secured to one another so that the outer mounting flanges $256_1$, $256_2$ of the first and second side plates $254_1$, $254_2$ axially engage one another and are fixed by the rivets 57 extending through holes in the outer mounting flanges $256_1$, $256_2$ of the first and second side plates $254_1$, $254_2$, as best shown in FIGS. 22-24.

Next, the torsional vibration damper 216 is slidably mounted to the output hub 32 by axially sliding the splines 67 of the core member 66 of the radially elastic member 52 over the complementary splines 39 of the output hub 32 for directly and non-rotatably engaging the output hub 32 with the radially elastic member 52 of the torsional vibration damper 16.

The locking piston 40 of the lock-up clutch 15 is provided as an integral part with the axially extending coupling lugs 48, made of a single or unitary (i.e., made as a single part) component, but may be made of separate components fixedly connected together. Next, the locking piston 40 is axially displaced toward the torque input member 250 of the torsional vibration damper 216 such that each of the coupling lugs 48 positively engages one of the notches 259n of the torque input member 250 so as to non-rotatably couple the locking piston 40 and the torque input member 250 while allowing an axial motion of the locking piston 40 with respect to the torque input member 250, as best shown in FIGS. 2-4 and 6. At the same time, the locking piston 40 is mounted to the output hub 32 so that the cylindrical rim 46 of the locking piston 40 is disposed in the annular groove 38 of the output hub 32, as shown in FIGS. 18-20.

Figure 20:
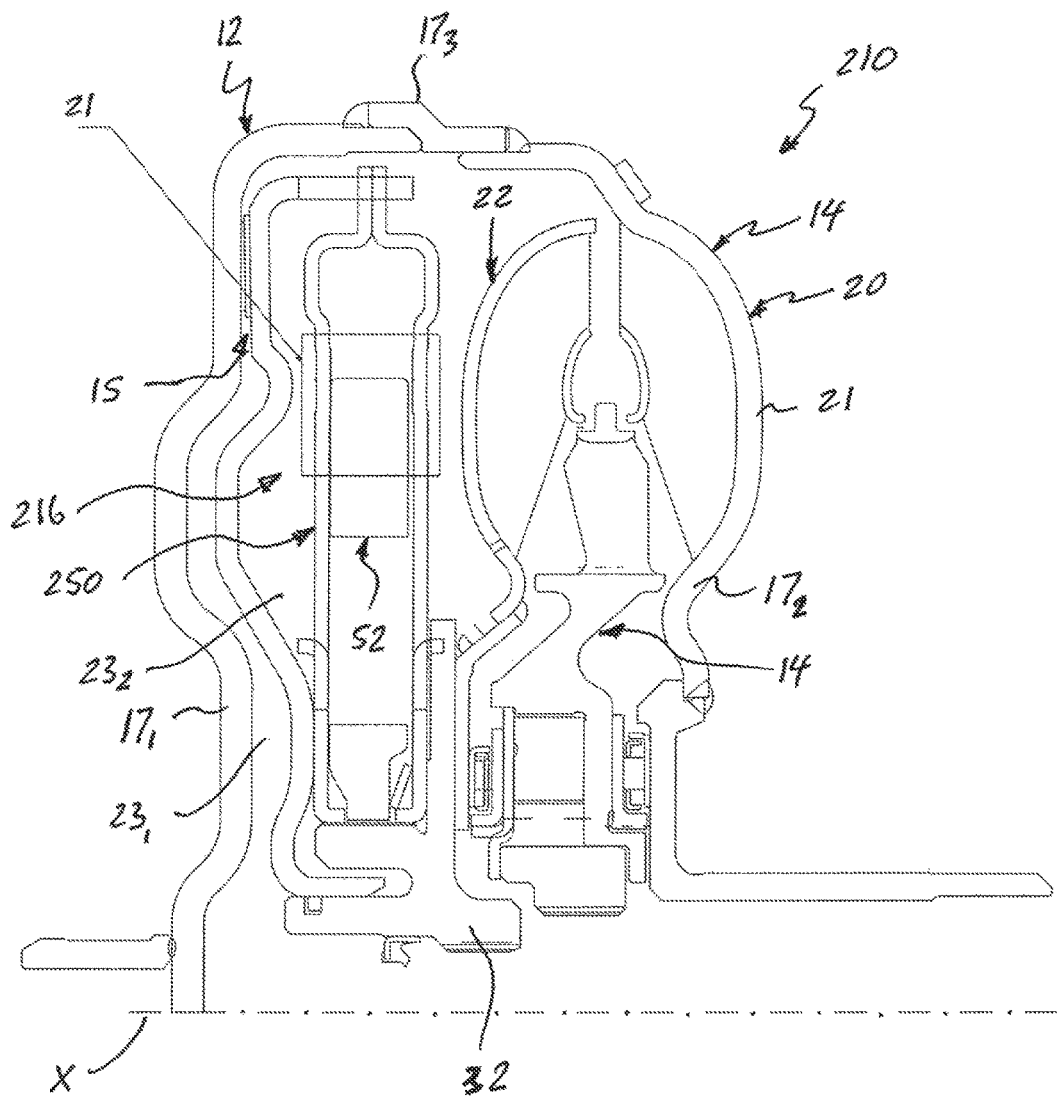
FIG. 20 is an alternative fragmented half-view in axial section of the hydrokinetic torque-coupling device with the torsional vibration damper in accordance with the third exemplary embodiment of the present invention.

Next, the first shell $17_1$ is non-moveably and sealingly secured to the second shell $17_2$ of the casing 12 through the intermediate portion $17_3$ and sealed together about their outer peripheries, such as by welds $19_1$ and $19_2$, as shown in FIGS. 18 and 20. After that, the hydrokinetic torque-coupling device 210 is mounted to the transmission input shaft so that the output hub 32 is splined directly to the transmission input shaft.

Figure 25:
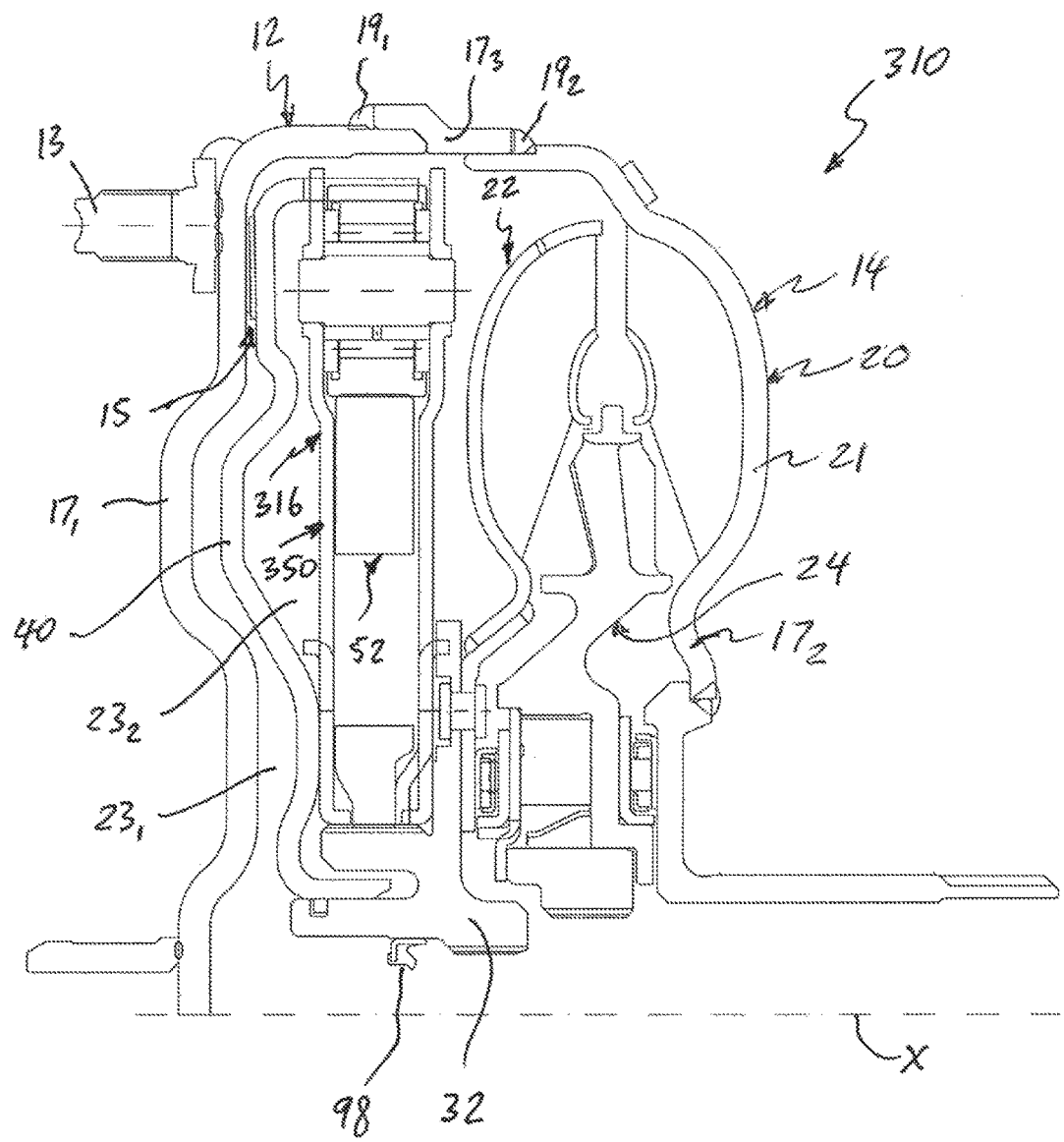
FIG. 25 is a fragmented half-view in axial section of a hydrokinetic torque-coupling device with a torsional vibration damper in accordance with a fourth exemplary embodiment of the present invention.
Figure 26:
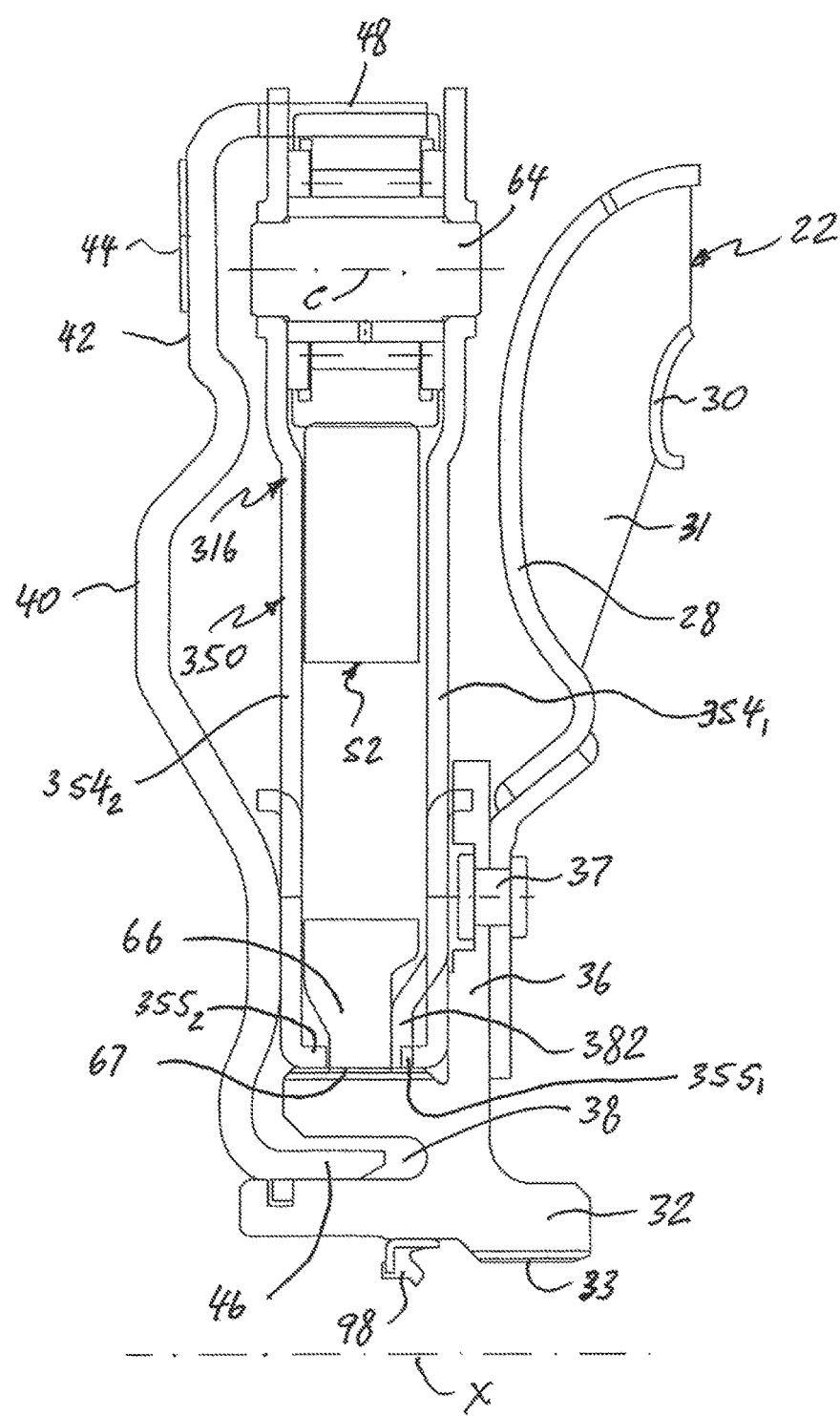
FIG. 26 is fragmented partial half-view in axial section of the hydrokinetic torque-coupling device showing the lock-up clutch and the torsional vibration damper in accordance with the fourth exemplary embodiment of the present invention.

In a hydrokinetic torque-coupling device 310 of a fourth exemplary embodiment illustrated in FIGS. 25-32, the torsional vibration damper 116 is replaced by a torsional vibration damper 316. The hydrokinetic torque-coupling device 310 of FIGS. 25-32 corresponds substantially to the hydrokinetic torque-coupling device 110 of FIGS. 11-17, and the torsional vibration damper 316, which primarily differs, will therefore be explained in detail below. The torsional vibration damper 316, as best shown in FIGS. 25-32, is interposed axially between the turbine shell 28 and the locking piston 40. The torsional vibration damper 316 comprises a torque input member 350 rotatable about the rotational axis X, and an integral radially elastic member 52 elastically coupled to and rotatable relative to the torque input member 350 around the rotational axis X, as best shown in FIGS. 25-27 and 32. The torque input member 350 is substantially similar to the torque input member 150 according to the second exemplary embodiment of FIGS. 11-17 and includes two axially opposite annular, radially oriented side plates, including a first annular, radially oriented side plate $354_1$ adjacent to the turbine shell 28, and a second annular, radially oriented side plate $354_2$ adjacent to the locking piston 40. The first side plate $354_1$ is substantially parallel to and axially spaced from the second side plate $354_2$, as best shown in FIG. 26. Moreover, the first and second side plates $354_1$ and $354_2$, respectively, are non-moveably attached (i.e., fixed) to one another, such as by fasteners 57, extending through holes in outer mounting flanges $356_1$, $356_2$ of the first and second side plates $354_1$, $354_2$, respectively, as best shown in FIGS. 29 and 30. Also, the first side plate $354_1$ is substantially identical to the first side plate $154_1$ according to the second exemplary embodiment, while the second side plate $354_2$ substantially identical to the second side plate $54_2$ according to the first exemplary embodiment of the present invention, as best shown in FIGS. 31A and 31B. First and second radially innermost flanges $355_1$ and $355_2$ of the first and second side plates $354_1$ and $354_2$ extend axially inwardly toward the core member 66 of the radially elastic member 52, as best shown in FIG. 26.

The torsional vibration damper 316 according to the fourth exemplary embodiment, further comprises at least one first axially resilient (or resiliently deformable) member 382. Specifically, the first side plate $354_1$ includes at least one, preferably two first axially resilient members 382 extending axially inwardly toward the radially elastic member 52 and the axially opposite second side plate $354_2$. The first side plate $354_1$ with the first resilient members 382 is preferably an integral part, i.e. a unitary component (i.e., made as a single part), but may be made of separate components fixedly connected together, as best shown in FIGS. 26, 31A and 32. Each of the two first resilient members 382 is diametrically opposite to one another.

As best shown in FIGS. 26 and 32, each of the first resilient members 382 is disposed and compressed axially between the first side plate $354_1$ and the core member 66 of the radially elastic member 52 for biasing the radially elastic member 52 away from one of the first side plate $354_1$. In other words, the radially elastic member 52 is elastically clamped in axial direction between the second side plate $354_2$ and the first axially resilient members 382. As a result, as best shown in FIG. 28, the radially elastic member 52 is axially spaced from the first side plate $354_1$ and directly engages (i.e., is in direct contact with) the second side plate $354_2$ of the torque input member 350.

The axially resilient member 382 disposed axially between the first side plate $354_1$ of the torque input member 350 and the core member 66 of the radially elastic member 52, prevents or significantly reduces axial vibration of the radially elastic member 52 during torque transmitting in the lockup position of the lock-up clutch 15. According to the fourth exemplary embodiment of the present invention, as best shown in FIGS. 26, 31A and 32, each of the first axially resilient members 382 is in the form of an axially resilient tongue extending both radially and axially from the first side plate $354_1$. As further illustrated in FIGS. 26, 31A and 32, the first axially resilient tongues 382 are formed unitary with the first side plates $354_1$. Therefore, the radially elastic member 52 is elastically clamped in axial direction between the axially resilient tongues 382 and the second side plate $354_2$.

At least one, preferably both the first and second side plates $354_1$ and $354_2$ of the torsional vibration damper 316 are formed with at least one, preferably a plurality of viewing windows $358_1$ and $358_2$ therethrough, as best shown in FIGS. 31A, 31B and 32. In the fourth exemplary embodiment of the present invention, the first side plate $354_1$ of the torsional vibration damper 316 is formed with four (4) viewing windows $358_1$ therethrough, which are circumferentially spaced from each other around the rotational axis X, as best shown in FIG. 31A. Similarly, the second side plate $354_2$ of the torsional vibration damper 316 is formed with four (4) viewing windows $358_2$ therethrough, which are circumferentially spaced from each other around the rotational axis X, as best shown in FIG. 31B. As best shown in FIGS. 30 and 32, the viewing windows $358_1$ and $358_2$ allow an interior space between the first and second side plates $354_1$ and $354_2$ of the torsional vibration damper 316 to be observed.

A method for assembling the hydrokinetic torque-coupling device 310 is as follows. First, the impeller wheel 20, the turbine wheel 22, the stator 24, and the damper assembly 16 may each be preassembled. The impeller wheel 20, the turbine wheel 22 and the stator 24 subassemblies are assembled together so as to form the torque converter 14. Next, the turbine shell 28 of the turbine wheel 22 is non-movably (i.e., fixedly) secured to the flange 36 of the output hub 32 by the rivets 37 (best shown in FIG. 26) or by any other appropriate means, such as welding.

The torsional vibration damper 316 is then added. First, the first side plate $354_1$ of the torque input member 350 is provided with at least one, preferably two first and second axially resilient members 382. Preferably, the first axially resilient members 382 are formed unitary (i.e., made as a single part) with the first side plate $354_1$. The torsional vibration damper 316 is assembled by placing the radially elastic member 52 between the first and second side plates $354_1$ and $354_2$ of the torque input member 350. Specifically, the first axially resilient members 382 resiliently engage the core member 66 of the radially elastic member 52 so as to bias the radially elastic member 52 in the direction away from one of the first side plate $354_1$ and toward the second side plate $354_2$. In other words, the first axially resilient members 382 engage axially opposite sides of the core member 66 of the radially elastic member 52.

Next, the first and second side plates $354_1$ and $354_2$ are non-movably (i.e., fixedly) secured to one another so that the outer mounting flanges $356_1$, $356_2$ of the first and second side plates $354_1$, $354_2$ axially engage one another and are fixed by the rivets 57 extending through holes in the outer mounting flanges $356_1$, $356_2$ of the first and second side plates $354_1$, $354_2$, as best shown in FIG. 30. Then, the torsional vibration damper 316 is slidably mounted to the output hub 32 by axially sliding the splines 67 of the core member 66 of the radially elastic member 52 over the complementary splines 39 of the output hub 32 for directly and non-rotatably engaging the output hub 32 with the radially elastic member 52 of the torsional vibration damper 316.

Then, the locking piston 40 of the lock-up clutch 15 is provided as an integral part with the axially extending coupling lugs 48, made of a single or unitary (i.e., made as a single part) component, but may be made of separate components fixedly connected together. Next, the locking piston 40 is axially displaced toward the torque input member 350 of the torsional vibration damper 316 such that each of the coupling lugs 48 positively engages one of notches 359n of the torque input member 350 so as to non-rotatably couple the locking piston 40 and the torque input member 350 while allowing an axial motion of the locking piston 40 with respect to the torque input member 350, as best shown in FIG. 29. At the same time, the locking piston 40 is mounted to the output hub 32 so that the cylindrical rim 46 of the locking piston 40 is disposed in the annular groove 38 of the output hub 32, as shown in FIGS. 25-27.

Figure 27:
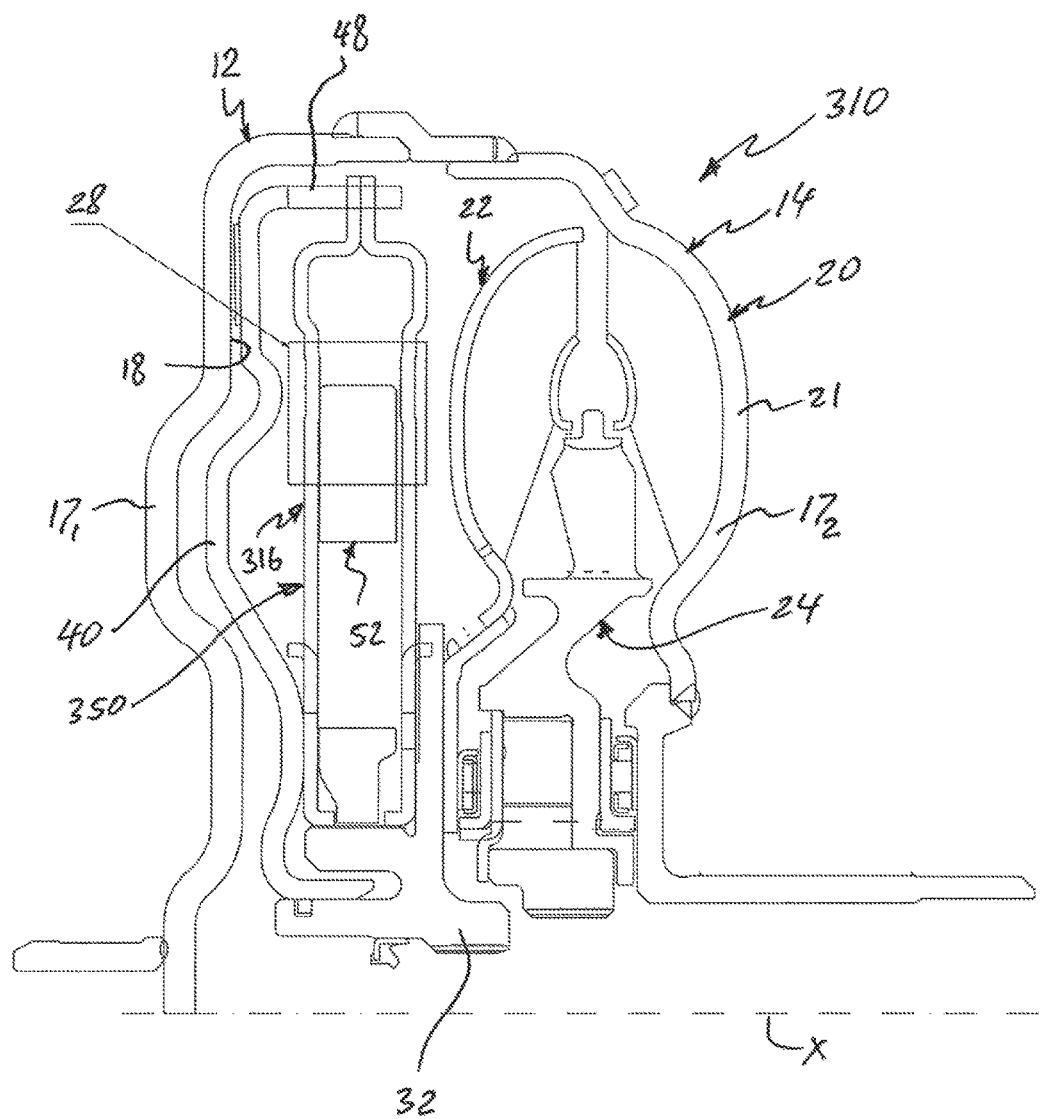
FIG. 27 is an alternative fragmented half-view in axial section of the hydrokinetic torque-coupling device with the torsional vibration damper in accordance with the fourth exemplary embodiment of the present invention.

Next, the first shell $17_1$ is non-moveably and sealingly secured to the second shell $17_2$ of the casing 12 through the intermediate portion $17_3$ and sealed together about their outer peripheries, such as by welds $19_1$ and $19_2$, as shown in FIGS. 25 and 27. After that, the hydrokinetic torque-coupling device 310 is mounted to the transmission input shaft so that the output hub 32 is splined directly to the transmission input shaft.

In a hydrokinetic torque-coupling device 410 of a fifth exemplary embodiment illustrated in FIGS. 33-40, the torsional vibration damper 316 is replaced by a torsional vibration damper 416. The hydrokinetic torque-coupling device 410 of FIGS. 33-40 corresponds substantially to the hydrokinetic torque-coupling device 310 of FIGS. 25-32, and the torsional vibration damper 416, which primarily differs, will therefore be explained in detail below. The torsional vibration damper 416, as best shown in FIGS. 33-40, is interposed axially between the turbine shell 28 and the locking piston 40.

Figure 34:
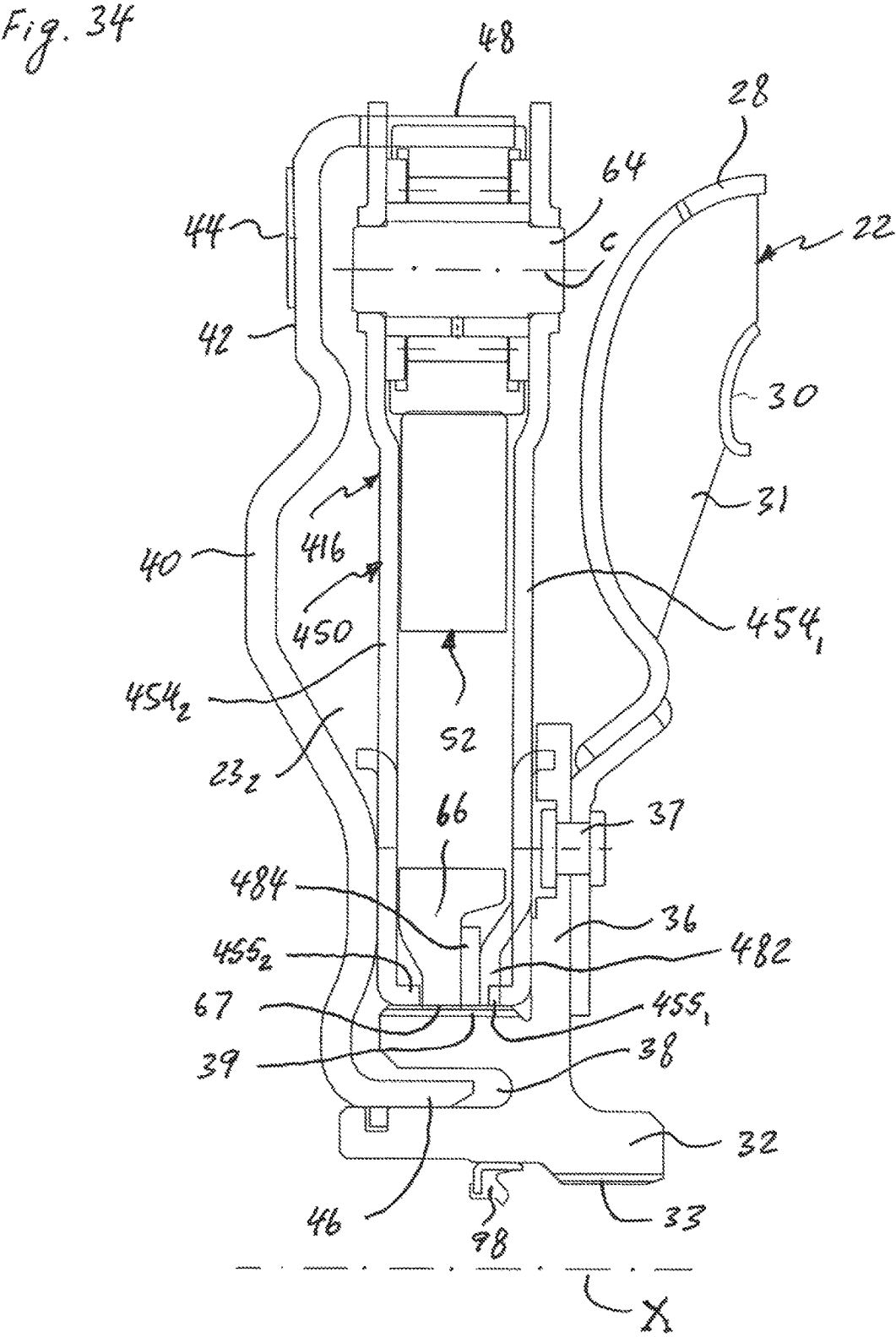
FIG. 34 is fragmented partial half-view in axial section of the hydrokinetic torque-coupling device showing the lock-up clutch and the torsional vibration damper in accordance with the fifth exemplary embodiment of the present invention.
Figure 37:
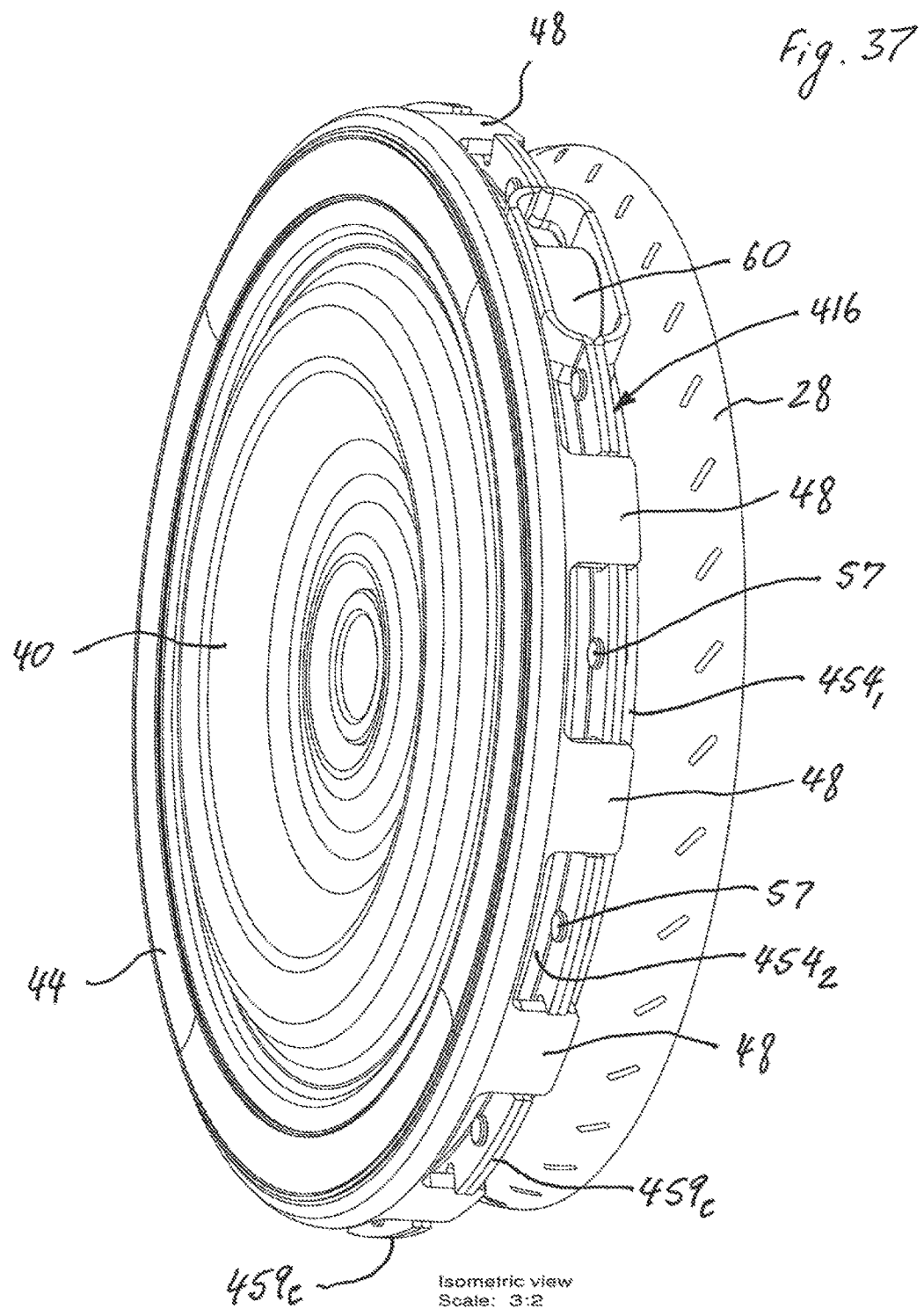
FIG. 37 is a partial perspective view of the hydrokinetic torque-coupling device showing a locking piston and the torsional vibration damper in accordance with the fifth exemplary embodiment of the present invention.
Figure 38:
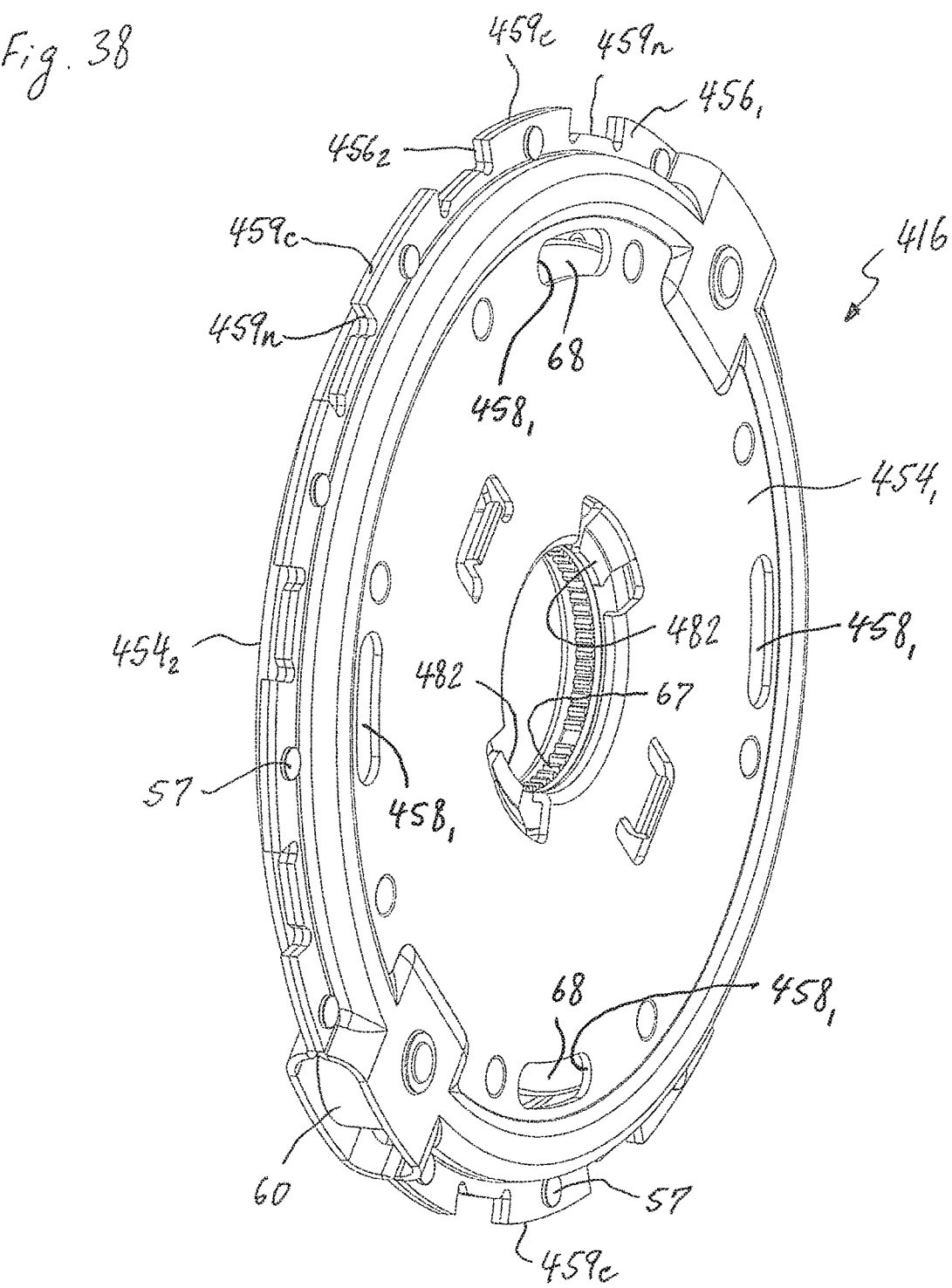
FIG. 38 is a perspective view of the torsional vibration damper in accordance with the fifth exemplary embodiment of the present invention.
Figure 39A:
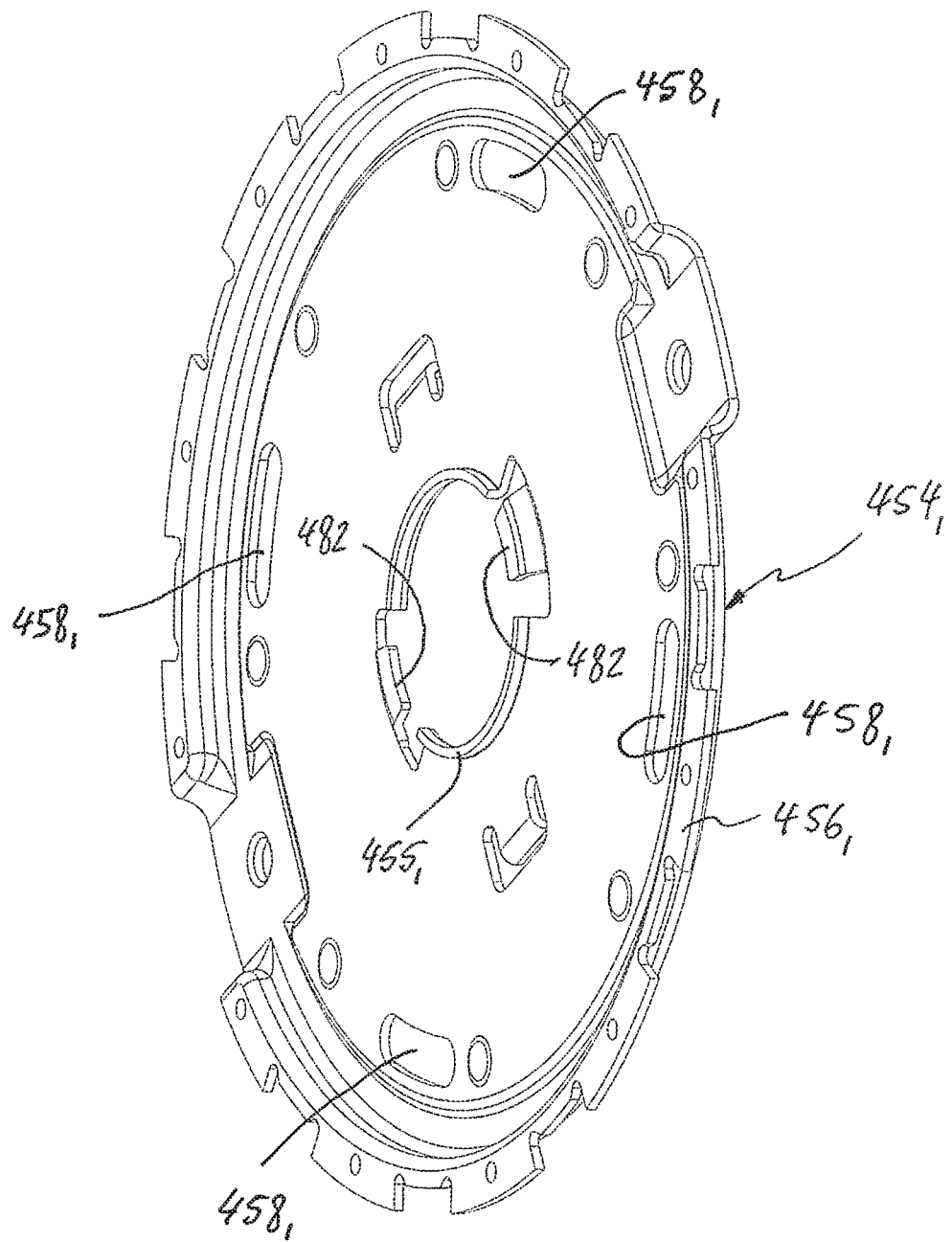
FIG. 39A is a perspective view of a first side plate of a torque input member of the torsional vibration damper in accordance with the fifth exemplary embodiment of the present invention.
Figure 39B:
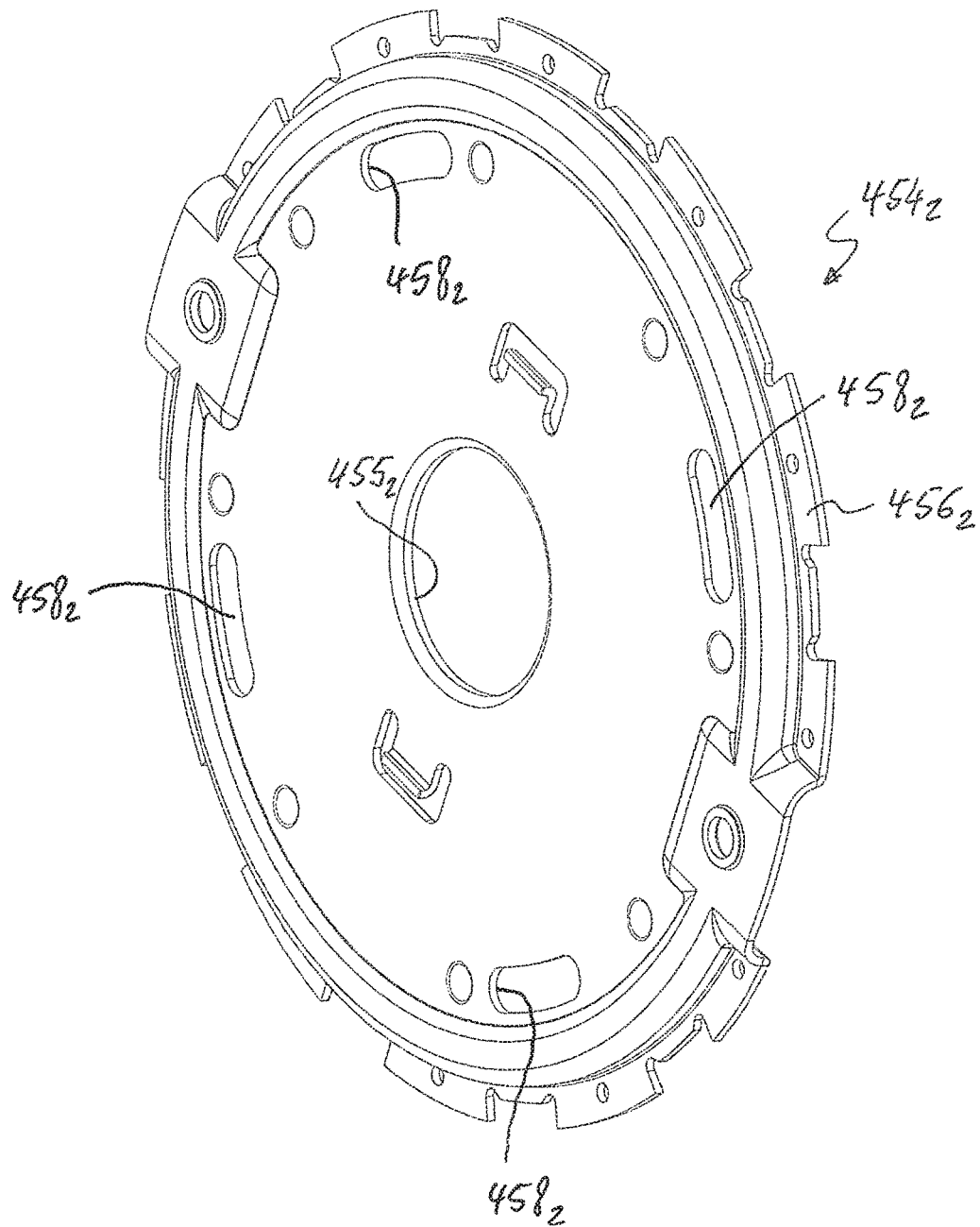
FIG. 39B is a perspective view of a second side plate of a torque input member of the torsional vibration damper in accordance with the fifth exemplary embodiment of the present invention.

The torsional vibration damper 416 comprises a torque input member 450 rotatable about the rotational axis X, and an integral radially elastic member 52 elastically coupled to and rotatable relative to the torque input member 450 around the rotational axis X, as best shown in FIGS. 33-35 and 40. The torque input member 450 is substantially similar to the torque input member 350 according to the fourth exemplary embodiment of FIGS. 25-32 and includes two axially opposite annular, radially oriented side plates, including a first annular, radially oriented side plate $454_1$ adjacent to the turbine shell 28, and a second annular, radially oriented side plate $454_2$ adjacent to the locking piston 40. The first side plate $454_1$ is substantially parallel to and axially spaced from the second side plate $454_2$, as best shown in FIG. 34. Moreover, the first and second side plates $454_1$ and $454_2$, respectively, are non-moveably attached (i.e., fixed) to one another, such as by fasteners 57, extending through holes in outer mounting flanges $456_1$, $456_2$ of the first and second damper side plates $454_1$, $454_2$, respectively, as best shown in FIGS. 37 and 38. Also, the first side plate $454_1$ is substantially identical to the first side plate $354_1$ according to the fourth exemplary embodiment, while the second side plate $454_2$ substantially identical to the second side plate $354_2$ according to the fourth exemplary embodiment of the present invention, as best shown in FIGS. 39A and 39B. First and second radially innermost flanges $455_1$ and $455_2$ of the first and second side plates $454_1$ and $454_2$ extend axially inwardly toward the core member 66 of the radially elastic member 52, as best shown in FIG. 34.

At least one, preferably both the first and second side plates $454_1$ and $454_2$ of the torsional vibration damper 416 are formed with at least one, preferably a plurality of viewing windows $458_1$ and $458_2$ therethrough, as best shown in FIGS. 39A, 39B and 40. In the fifth exemplary embodiment of the present invention, the first side plate $454_1$ of the torsional vibration damper 416 is formed with four (4) viewing windows $458_1$ therethrough, which are circumferentially spaced from each other around the rotational axis X, as best shown in FIG. 39A. Similarly, the second side plate $454_2$ of the torsional vibration damper 416 is formed with four (4) viewing windows $458_2$ therethrough, which are circumferentially spaced from each other around the rotational axis X, as best shown in FIG. 39B. As best shown in FIGS. 38 and 40, the viewing windows $458_1$ and $458_2$ allow an interior space between the first and second side plates $454_1$ and $454_2$ of the torsional vibration damper 416 to be observed.

The torsional vibration damper 416 according to the fifth exemplary embodiment, further comprises at least one first axially resilient (or resiliently deformable) member 482 and a hysteresis washer 484. Specifically, the first side plate $454_1$ includes at least one, preferably two first axially resilient members 482 extending axially inwardly toward the radially elastic member 52 and the axially opposite second side plate $454_2$. The first side plate $454_1$ with the first resilient members 482 is preferably an integral part, or a unitary component (such as, for example, made as a single part), but may be made of separate components fixedly connected together, as best shown in FIGS. 34, 39A and 40. Each of the two first resilient members 482 is diametrically opposite to one another.

The hysteresis washer 484, best shown in FIGS. 34 and 40, is an annular, planar (i.e., flat) washer formed separately from the first side plates $454_1$ of the torque input member 450 and the radially elastic member 52. The hysteresis washer 484 is disposed between and in direct contact with the core member 66 of the radially elastic member 52 and the first resilient members 482 of the first side plate $454_1$. The hysteresis washer 484 is arranged to be rotatable relative to the core member 66 of the radially elastic member 52. The hysteresis washer 484 functions when the torque fluctuation cannot be absorbed by the radially elastic member 52 of the torsional vibration damper 416 so as to decrease the torque fluctuation. Specifically, the hysteresis washer 484 frictionally directly engages an axial end of the core member 66 of the radially elastic member 52.

The hysteresis washer [Is there anything special/important about the washer, such as its material of construction, thickness, etc?] 484 provides a high frictional hysteresis (dissipative energy losses) due to friction between the hysteresis washer 484 and the core member 66 of the radially elastic member 52. The hysteresis losses provided by the hysteresis washer 484 are advantageous in the torsional vibration damper 416 because of the added damping and dissipation of vibration energy. In this case, a frictional force from the hysteresis washer 484 that reduces the rotation force of the core member 66 of the radially elastic member 52 is generated by the biasing force from the first resilient members 482 between the hysteresis washer 484 and the first side plate $454_1$. In other words, the first resilient members 482 apply a biasing force to the hysteresis washer 484 so that the hysteresis washer 484 presses the core member 66 of the radially elastic member 52. As a result, the sliding speed of the hysteresis washer 484 relative to the radially elastic member 52 is lowered by the frictional force generated between the hysteresis washer 484 and the core member 66 of the radially elastic member 52. In other words, the torque fluctuation transmitted to torsional vibration damper 416 is absorbed by the hysteresis washer 484.

Figure 36:
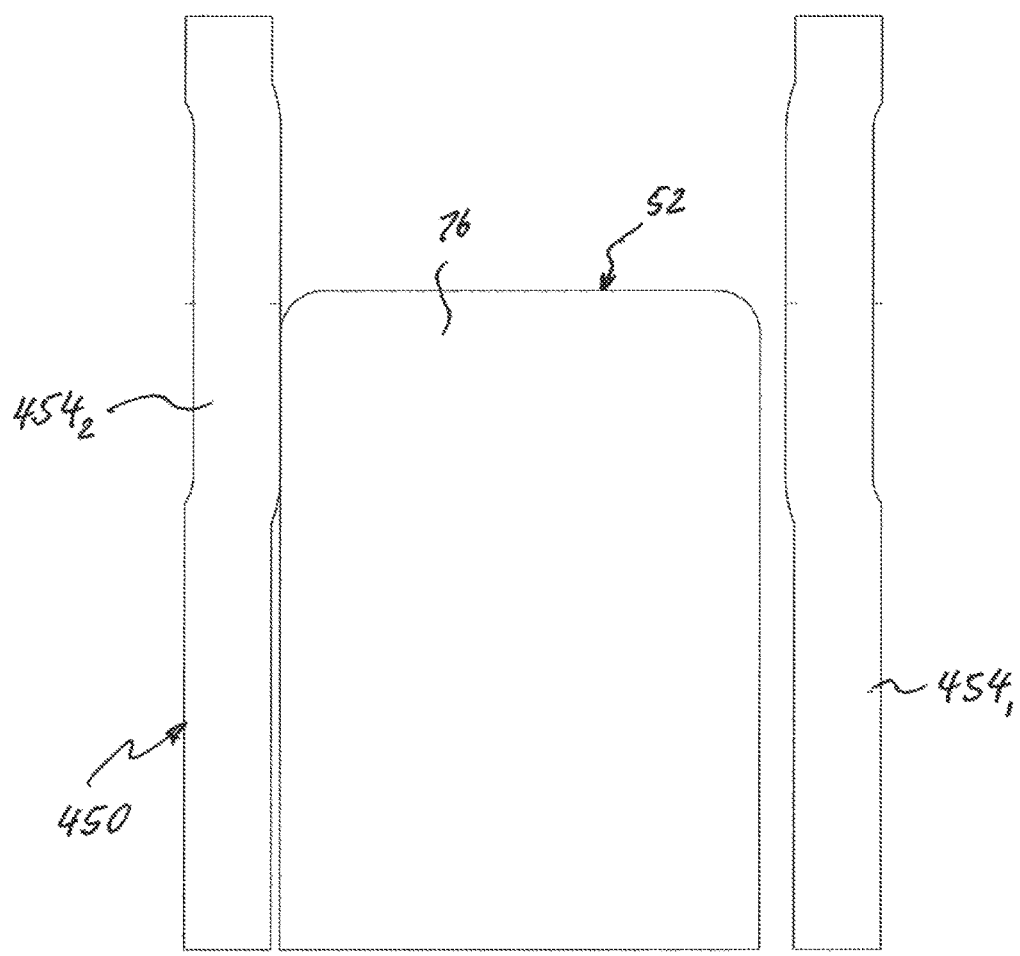
FIG. 36 is an enlarged view of a fragment of the torsional vibration damper shown in the rectangle "36" of FIG. 35.

As best shown in FIGS. 34 and 40, each of the first resilient members 482 is disposed and compressed axially between the first side plate $454_1$ and the core member 66 of the radially elastic member 52 for biasing the radially elastic member 52 away from one of the first side plate $454_1$. In other words, the radially elastic member 52 is elastically clamped in axial direction between the second side plate $454_2$ and the first axially resilient members 482. Thus, the radially elastic member 52 is compressed only by one first side plate $454_1$ with the integral first resilient members 482, and in between the radially elastic member 52 and the first side plate $454_1$ there is the hysteresis washer 484. As a result, as best shown in FIG. 36, the radially elastic member 52 is axially spaced from the first side plate $454_1$ and directly engages (i.e., is in direct contact with) the second side plate $454_2$ of the torque input member 450.

The first axially resilient member 482 and the hysteresis washer 484 disposed axially between the first side plate $454_1$ of the torque input member 450 and the core member 66 of the radially elastic member 52, prevent or significantly reduces axial vibration of the radially elastic member 52 during torque transmitting in the lockup position of the lock-up clutch 15. According to the fifth exemplary embodiment of the present invention, as best shown in FIGS. 34, 39A and 40, each of the first axially resilient members 482 is in the form of an axially resilient tongue extending both radially and axially from the first side plate $454_1$. As further illustrated in FIGS. 26, 31A and 32, the first axially resilient tongues 482 are formed unitary with the first side plates $354_1$. Therefore, the radially elastic member 52 is elastically clamped in axial direction by the first axially resilient tongues 482 between the hysteresis washer 484 and the second side plate $454_2$.

A method for assembling the hydrokinetic torque-coupling device 410 is as follows. First, the impeller wheel 20, the turbine wheel 22, the stator 24, and the damper assembly 16 may each be preassembled. The impeller wheel 20, the turbine wheel 22 and the stator 24 subassemblies are assembled together so as to form the torque converter 14. Next, the turbine shell 28 of the turbine wheel 22 is non-movably (i.e., fixedly) secured to the flange 36 of the output hub 32 by the rivets 37 (best shown in FIG. 26) or by any other appropriate means, such as welding.

The torsional vibration damper 416 is then added. First, the first side plate $454_1$ of the torque input member 450 is provided with at least one, preferably two first and second axially resilient members 482. Preferably, the first axially resilient members 482 are formed unitary (i.e., made as a single part) with the first side plate $454_1$. The torsional vibration damper 416 is assembled by placing the radially elastic member 52 and the annular, planar (i.e., flat) hysteresis washer 484 between the first and second side plates $454_1$ and $454_2$ of the torque input member 450. Specifically, the first axially resilient members 482 resiliently engage the core member 66 of the radially elastic member 52 through the hysteresis washer 484 so as to bias the radially elastic member 52 in the direction away from one of the first side plate $454_1$ and toward the second side plate $454_2$. In other words, the first axially resilient members 482 engage axially opposite sides of the core member 66 of the radially elastic member 52 through the hysteresis washer 484, which is in direct contact with the core member 66 of the radially elastic member 52.

Next, the first and second side plates $454_1$ and $454_2$ are non-movably (i.e., fixedly) secured to one another so that the outer mounting flanges $456_1$, $456_2$ of the first and second side plates $454_1$, $454_2$ axially engage one another and are fixed by the rivets 57 extending through holes in the outer mounting flanges $456_1$, $456_2$ of the first and second side plates $454_1$, $454_2$, as best shown in FIG. 38. Then, the torsional vibration damper 416 is slidably mounted to the output hub 32 by axially sliding the splines 67 of the core member 66 of the radially elastic member 52 over the complementary splines 39 of the output hub 32 for directly and non-rotatably engaging the output hub 32 with the radially elastic member 52 of the torsional vibration damper 416.

Then, the locking piston 40 of the lock-up clutch 15 is provided as an integral part with the axially extending coupling lugs 48, made of a single or unitary (i.e., made as a single part) component, but may be made of separate components fixedly connected together. Next, the locking piston 40 is axially displaced toward the torque input member 450 of the torsional vibration damper 416 such that each of the coupling lugs 48 positively engages one of notches 459n of the torque input member 450 so as to non-rotatably couple the locking piston 40 and the torque input member 450 while allowing an axial motion of the locking piston 40 with respect to the torque input member 450, as best shown in FIG. 37. At the same time, the locking piston 40 is mounted to the output hub 32 so that the cylindrical rim 46 of the locking piston 40 is disposed in the annular groove 38 of the output hub 32, as shown in FIGS. 33-35.

Figure 35:
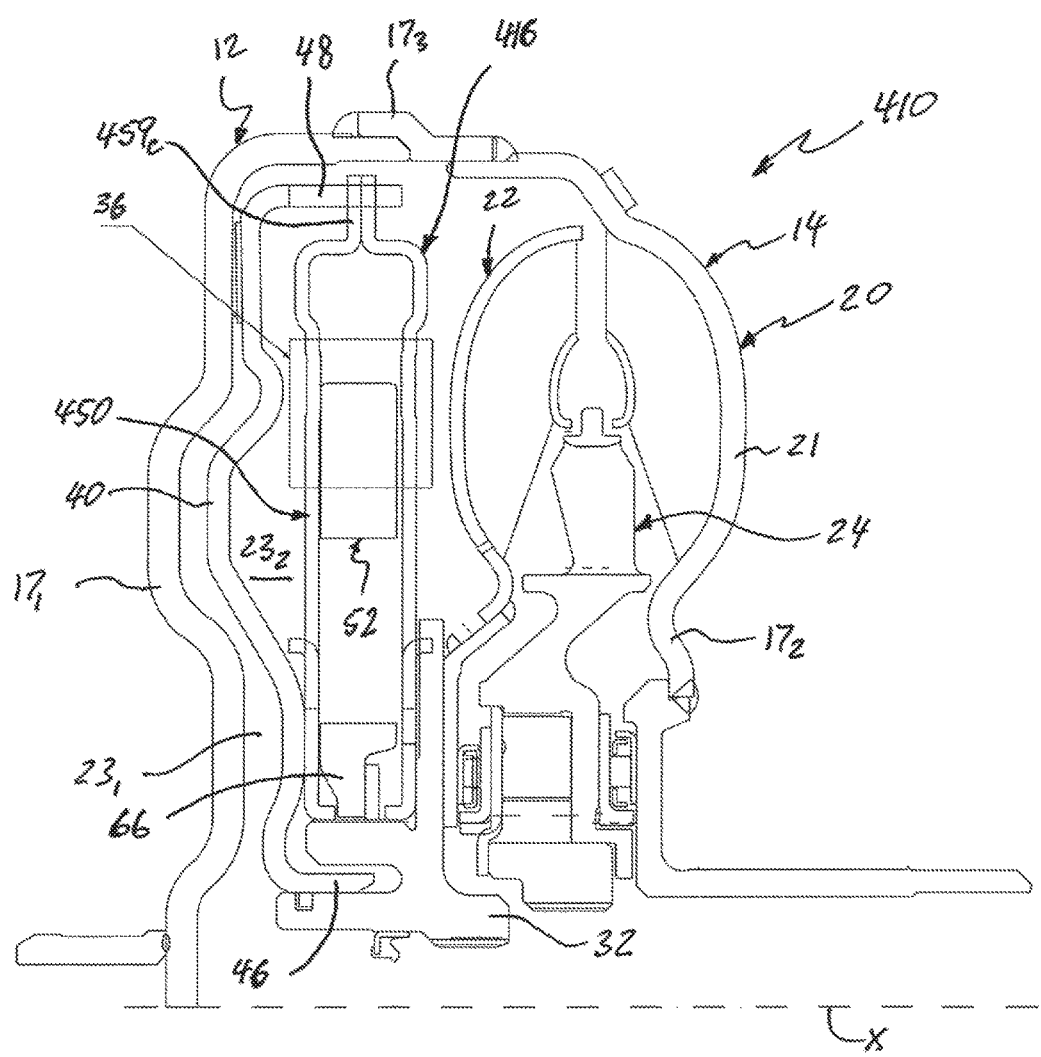
FIG. 35 is an alternative fragmented half-view in axial section of the hydrokinetic torque-coupling device with the torsional vibration damper in accordance with the fifth exemplary embodiment of the present invention.

Next, the first shell $17_1$ is non-moveably and sealingly secured to the second shell $17_2$ of the casing 12 through the intermediate portion $17_3$ and sealed together about their outer peripheries, such as by welds 19₁ and 19₂, as shown in FIGS. 33 and 35. After that, the hydrokinetic torque-coupling device 410 is mounted to the transmission input shaft so that the output hub 32 is splined directly to the transmission input shaft.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A torsional vibration damper of a hydrokinetic torque-coupling device for coupling a driving shaft and a driven shaft together, comprising:
    a torque input member rotatable about a rotational axis and including radially oriented first and second side plates axially spaced from and non-rotatably attached to one another, and at least one supporting member mounted therebetween;
    a unitary radially elastic member disposed between the first and second side plates and pivotable relative to and elastically coupled to the torque input member; and
    a first axially resilient member disposed between the radially elastic member and the first side plate for biasing the radially elastic member axially away from the first side plate;
    the radially elastic member including an annular core member coaxial with the rotational axis and rotatable relative the torque input member, and at least one curved elastic leaf integral with the core member and configured to elastically and radially engage the at least one supporting member and to elastically bend in the radial direction upon rotation of the torque input member with respect to the radially elastic member;
    the at least one curved elastic leaf having a proximal end non-moveably connected to the core member, a free distal end and a curved raceway portion disposed between the proximal and free distal ends of the at least one elastic leaf for bearing the at least one supporting member.

2. The torsional vibration damper as defined in claim 1, wherein the first axially resilient member is disposed between the core member of the radially elastic member and the first side plate.

3. The torsional vibration damper as defined in claim 1, further comprising a second axially resilient member disposed between the radially elastic member and the second side plate for biasing the radially elastic member away from the second side plate.

4. The torsional vibration damper as defined in claim 3, wherein the second axially resilient member is disposed between the core member of the radially elastic member and the second side plate.

5. The torsional vibration damper as defined in claim 1, wherein the first axially resilient member is an annular axially resilient spring separate from the first side plate of the torque input member and the radially elastic member.

6. The torsional vibration damper as defined in claim 5, wherein the first axially resilient member is a Belleville spring.

7. The torsional vibration damper as defined in claim 1, wherein the first axially resilient member is integrally formed with the first side plate.

8. The torsional vibration damper as defined in claim 7, wherein the first side plate includes two diametrically opposite first axially resilient members integrally formed with the first side plate.

9. The torsional vibration damper as defined in claim 1, further comprising a hysteresis washer disposed between the radially elastic member and the first axially resilient member.

10. The torsional vibration damper as defined in claim 1, wherein the at least one supporting member is an annular rolling body.

11. The torsional vibration damper as defined in claim 1, wherein at least one of the first and second side plates of the torque input member of the torsional vibration damper has at least one viewing window therethrough.

12. A hydrokinetic torque-coupling device for coupling a driving shaft and a driven shaft together, comprising:
    a casing rotatable about a rotational axis and having a locking surface;
    a torque converter including an impeller wheel rotatable about the rotational axis and a turbine wheel disposed in the casing coaxially with the rotational axis, the turbine wheel disposed axially opposite to the impeller wheel and hydro-dynamically rotationally drivable by the impeller wheel;
    a lock-up clutch including a locking piston axially moveable along the rotational axis to and from the locking surface of the casing, the locking piston having an engagement surface configured to selectively frictionally engage the locking surface of the casing to position the hydrokinetic torque-coupling device into and out of a lockup mode in which the locking piston is mechanically frictionally locked to the casing so as to be non-rotatable relative to the casing; and
    a torsional vibration damper comprising
        a torque input member including radially oriented first and second side plates axially spaced from and non-rotatably attached to one another, and at least one supporting member mounted therebetween;
        a unitary radially elastic member disposed between the first and second side plates and pivotable relative to and elastically coupled to the torque input member; and
        a first axially resilient member disposed between the radially elastic member and the first side plate for biasing the radially elastic member axially away from the first side plate;
        the radially elastic member including an annular core member coaxial with the rotational axis and rotatable relative the torque input member, and at least one curved elastic leaf integral with the core member and configured to elastically and radially engage the at least one supporting member and to elastically bend in the radial direction upon rotation of the torque input member with respect to the radially elastic member;

the at least one curved elastic leaf having a proximal end non-moveably connected to the core member, a free distal end and a curved raceway portion disposed between the proximal and free distal ends of the at least one elastic leaf for bearing the at least one supporting member.

13. The hydrokinetic torque-coupling device as defined in claim 12, wherein the first axially resilient member is disposed between the core member of the radially elastic member and the first side plate.

14. The hydrokinetic torque-coupling device as defined in claim 12, further comprising a second axially resilient member disposed between the radially elastic member and the second side plate for biasing the radially elastic member away from the second side plate.

15. The hydrokinetic torque-coupling device as defined in claim 14, wherein the second axially resilient member is disposed between the core member of the radially elastic member and the second side plate.

16. The hydrokinetic torque-coupling device as defined in claim 12, wherein the first axially resilient member is an annular axially resilient spring separate from the first side plate of the torque input member and the radially elastic member.

17. The hydrokinetic torque-coupling device as defined in claim 16, wherein the first axially resilient member is a Belleville spring.

18. The hydrokinetic torque-coupling device as defined in claim 12, wherein the first axially resilient member is integrally formed with the first side plate.

19. The hydrokinetic torque-coupling device as defined in claim 18, wherein the first side plate includes two diametrically opposite first axially resilient members integrally formed with the first side plate.

20. The hydrokinetic torque-coupling device as defined in claim 12, further comprising a hysteresis washer disposed between the radially elastic member and the first axially resilient member.

21. The hydrokinetic torque-coupling device as defined in claim 12, wherein the at least one supporting member is in the form of an annular rolling body.

22. The hydrokinetic torque-coupling device as defined in claim 12, further comprising an output hub rotatable about the rotational axis, wherein the output hub is elastically coupled to the locking piston via the torsional vibration damper and non-rotatably coupled to the core member of the radially elastic member.

23. The hydrokinetic torque-coupling device as defined in claim 22, wherein the output hub is non-rotatably connected to the turbine wheel of the torque converter.

24. The hydrokinetic torque-coupling device as defined in claim 22, wherein the core member of the radially elastic member has splines configured to engage splines of the output hub.

25. The hydrokinetic torque-coupling device as defined in claim 12, wherein the locking piston is non-rotatably coupled to and axially moveable relative to the torque input member of the torsional vibration damper.

26. The hydrokinetic torque-coupling device as defined in claim 12, wherein at least one of the first and second side plates of the torque input member of the torsional vibration damper has at least one viewing window therethrough.

27. A method for assembling a torsional vibration damper of a hydrokinetic torque-coupling device, the method comprising the steps of:

providing a radially oriented first side plate, a radially oriented second side plate and at least one supporting member;

providing a unitary radially elastic member including an annular core member and at least one curved elastic leaf integral with the core member and configured to elastically bend in the radial direction;

providing a first axially resilient member for biasing the radially elastic member axially away from the first side plate;

placing the unitary radially elastic member and the first axially resilient member between the first and second side plates; and non-moveably securing the first and second side plates to one another so that the first axially resilient member is located between the unitary radially elastic member and the first side plate for biasing the radially elastic member axially away from the first side plate.

* * * * *